US012264523B2

(12) United States Patent
Bruckelmyer

(10) Patent No.: US 12,264,523 B2
(45) Date of Patent: Apr. 1, 2025

(54) OVERHEAD GARAGE DOOR SYSTEM WITH SEALING FEATURE

(71) Applicant: Daryl W. Bruckelmyer, Duluth, MN (US)

(72) Inventor: Daryl W. Bruckelmyer, Duluth, MN (US)

( * ) Notice: Subject to any disclaimer, the term of this patent is extended or adjusted under 35 U.S.C. 154(b) by 487 days.

(21) Appl. No.: 17/538,718

(22) Filed: Nov. 30, 2021

(65) Prior Publication Data

US 2022/0170304 A1 Jun. 2, 2022

Related U.S. Application Data

(60) Provisional application No. 63/198,985, filed on Nov. 30, 2020.

(51) Int. Cl.
*E05D 15/38* (2006.01)
*E05D 15/44* (2006.01)

(52) U.S. Cl.
CPC ........... *E05D 15/38* (2013.01); *E05D 15/445* (2013.01); *E05Y 2201/484* (2013.01); *E05Y 2201/626* (2013.01); *E05Y 2201/686* (2013.01)

(58) Field of Classification Search
CPC ......... E05Y 2201/484; E05Y 2201/626; E05Y 2201/686; E05D 15/38; E05D 15/445
See application file for complete search history.

(56) References Cited

U.S. PATENT DOCUMENTS

| | | | | | |
|---|---|---|---|---|---|
| 618,013 | A * | 1/1899 | Roeder | E06B 7/205 49/304 |
| 938,469 | A * | 11/1909 | French | E06B 1/524 49/365 |
| 1,840,879 | A * | 1/1932 | Barringer | E06B 1/70 49/470 |
| 1,873,143 | A * | 8/1932 | Nelson | E06B 1/70 49/470 |
| 1,908,623 | A * | 5/1933 | Barringer | E06B 7/22 49/470 |
| 1,948,770 | A * | 2/1934 | Rowe | E05D 15/24 160/209 |
| 1,990,870 | A | 2/1935 | Kelly | |
| 2,010,609 | A * | 8/1935 | Shogren | E06B 1/70 49/470 |
| 2,744,301 | A * | 5/1956 | Viola, Jr. | E06B 3/4636 49/408 |
| 2,807,836 | A * | 10/1957 | Knowles | E05D 15/1021 49/212 |
| 2,827,114 | A | 3/1958 | Stroup | |
| 2,871,932 | A | 2/1959 | Stroup | |
| 3,079,653 | A * | 3/1963 | Cornell | E06B 7/2316 49/493.1 |

(Continued)

*Primary Examiner* — Johnnie A. Shablack
(74) *Attorney, Agent, or Firm* — HONIGMAN LLP

(57) ABSTRACT

A threshold sealing system for a door panel assembly includes a threshold biasing element and an anchor. The threshold biasing element including a base configured to attach to a floor surface and a biasing surface extending at an oblique angle relative to the base. The anchor is configured to secure the base of the threshold biasing element to the floor. The anchor and the threshold biasing element may be integrally formed and include the same materials. The oblique angle of the biasing surface ranges from 70 degrees to 80 degrees and has a height of at least 1.5 inches.

9 Claims, 42 Drawing Sheets

(56) References Cited

U.S. PATENT DOCUMENTS

| | | | | | |
|---|---|---|---|---|---|
| 3,378,958 | A * | 4/1968 | Parks | E06B 7/231 | 49/495.1 |
| 3,802,480 | A * | 4/1974 | Daggy | E06B 7/18 | 160/40 |
| 4,680,828 | A * | 7/1987 | Cook | E05D 15/1021 | 16/102 |
| 5,353,473 | A | 10/1994 | Sherick | | |
| 6,082,430 | A | 7/2000 | Mock | | |
| 6,729,380 | B2 | 5/2004 | Whitley et al. | | |
| 6,763,639 | B2 * | 7/2004 | Bennett | E06B 3/9632 | 49/504 |
| 6,792,998 | B2 | 9/2004 | David | | |
| 7,011,347 | B2 | 3/2006 | Finardi | | |
| 7,861,762 | B2 | 1/2011 | Meichtry | | |
| 8,181,405 | B2 * | 5/2012 | Nash | E04F 11/1851 | 52/800.18 |
| 8,869,868 | B1 * | 10/2014 | Schmidt | E05D 15/165 | 160/209 |
| 8,893,764 | B2 | 11/2014 | Mascari et al. | | |
| 9,097,062 | B2 * | 8/2015 | Letonje | E06B 9/15 | |
| 10,876,339 | B2 * | 12/2020 | Bruckelmyer | E05B 17/0025 | |
| 11,118,395 | B2 * | 9/2021 | Dintheer | E06B 3/46 | |
| 11,920,394 | B2 * | 3/2024 | Janick | E05D 15/246 | |
| 2007/0256798 | A1 | 11/2007 | Aquilina | | |
| 2008/0000594 | A1 | 1/2008 | Paulson | | |
| 2008/0099163 | A1 | 5/2008 | Bachiu | | |
| 2008/0163552 | A1 | 7/2008 | Lussier | | |
| 2011/0061303 | A1 | 3/2011 | Peterson | | |
| 2012/0047804 | A1 | 3/2012 | Talboys | | |
| 2014/0290878 | A1 | 10/2014 | Balay et al. | | |
| 2017/0183897 | A1 * | 6/2017 | Bruckelmyer | E05D 15/242 | |
| 2022/0170304 | A1 * | 6/2022 | Bruckelmyer | E05D 15/22 | |
| 2023/0265711 | A1 * | 8/2023 | Cooper | E06B 9/04 | 160/24 |

* cited by examiner

OVERHEAD GARAGE DOOR SYSTEM WITH SEALING FEATURE

CROSS REFERENCE TO RELATED APPLICATION

The present application claims the filing benefits of U.S. provisional application Ser. No. 63/198,985, filed Nov. 30, 2020, which is hereby incorporated herein by reference in its entirety.

TECHNICAL FIELD

The present disclosure relates generally to the field of both residential and commercial overhead garage doors.

BACKGROUND

It is generally known within the building, architectural and construction industries to incorporate and provide multi-panel overhead doors to the residential garage and commercial building industries. For example a very common type of overhead garage door involves a series of generally rectangular and horizontally oriented door panels connected together by hinges such that the door can be both raised and lowered to alternately expose or open and again cover or close and secure a door opening to provide protection from the outside elements, as well as provide privacy and security. These types of overhead garage doors commonly include sets of wheels or rollers attached to the lateral sides of the respective movable door panels. The wheels or rollers generally provide support and location control for each of the door panels as the wheels themselves are generally supported and guided within sets of both vertical and horizontal tracks. Typically, sets of door tracks are attached and secured to and supported at the interior wall structure of the building adjacent to the right and left sides and top of the structural framework of the door opening.

This particular style of overhead garage door is popular from the design standpoint in that it provides efficient use of space and relative ease of operation including minimal and efficient panel movement and swing clearances. The basic overhead roll-up design further offers resulting mechanical safety advantages when the door is rolled or moved vertically upward and to the open position where the door assembly is efficiently and effectively temporarily stored or parked overhead and out of the way from the doorway access opening. The operating location, mechanical movement and closed position of these types of overhead garage doors is largely determined by the respective right and left side door tracks, door panel track wheels and there points of attachment to the wall or door frame. The practical result is typically and often a compromise between the required dimensional operating clearances of the door assembly, and the effective closing and sealing of the door panels to the corresponding structural opening. Various dimensional clearance distances between the door tracks, wheels, rollers, movable panels and the door frame are required to promote free engagement and movement within their desired ranges of motion and operation, and yet still provide reasonably effective degrees of sealing of the door panels to the corresponding structural opening for preferably ideal environmental weather tightness and structural integrity whenever the garage door is closed.

SUMMARY

The present disclosure provides an improved garage door opening, closing, and sealing system for improved weather sealing to significantly reduce the potential for air leaks and drafts to reduce energy usage and increase long-term resource and energy savings. The overhead garage door system has a closed tightness and mechanical security that is independent of a typical currently-installed overhead garage door track and structural support system.

One aspect of the disclosure provides a threshold sealing system for an overhead door panel assembly. The threshold sealing system includes a threshold biasing element including a base configured to attach to a floor surface and a biasing surface extending at an oblique angle relative to the base. The threshold sealing system also includes an anchor configured to secure the base of the threshold biasing element to the floor.

This aspect of the disclosure may include one or more of the following optional features. In some configurations, the threshold biasing element and the anchor are integrally formed. Here, the biasing element and the anchor may have a continuous cross-sectional shape.

In some examples, the oblique angle of the biasing surface ranges from 70 degrees to 80 degrees. In other implementations, the oblique angle of the biasing surface ranges from 74 degrees to 76 degrees. In some configurations, the biasing surface has a height of at least 1.5 inches. Optionally, the biasing surface has a height of at least 1.7 inches.

In some implementations, the biasing surface extends from the base to a distal end. Here, the distal end of the biasing surface may include one of a chamfer or a radius. In some examples, the biasing surface includes a low-friction coating.

Another aspect of the disclosure provides a method of sealing an overhead door assembly against a door frame. The method includes positioning the overhead door assembly within a vertical track assembly attached to the door frame. The method also includes attaching a threshold biasing element to a floor surface beneath a shaft subassembly disposed on the overhead door assembly when the overhead door assembly is positioned within the vertical track assembly, the threshold biasing element being operable to bias the shaft subassembly towards the door frame when the overhead door assembly is moved towards the floor surface along the vertical track assembly.

This aspect of the disclosure may include one or more of the following optional features. In some examples, the method includes forming the threshold biasing element with a base configured to attach to the floor surface and a biasing surface operable to bias the shaft subassembly towards the door frame when the overhead door assembly is moved towards the floor surface along the vertical track assembly.

In some examples, forming the threshold biasing element with the biasing surface includes forming the biasing surface at an oblique angle relative to the base. In some implementations, forming the biasing surface at in oblique angle includes forming the biasing surface at an angle ranging from 70 degrees to 80 degrees relative to the base. In some configurations, attaching the threshold biasing element includes attaching the threshold biasing element to an anchor, and inserting the anchor into the floor surface.

These and other objects, advantages, purposes and features of the present disclosure will become apparent upon review of the following specification and examples in conjunction with the drawings.

DETAILED DESCRIPTION

Figures 1, 1A:
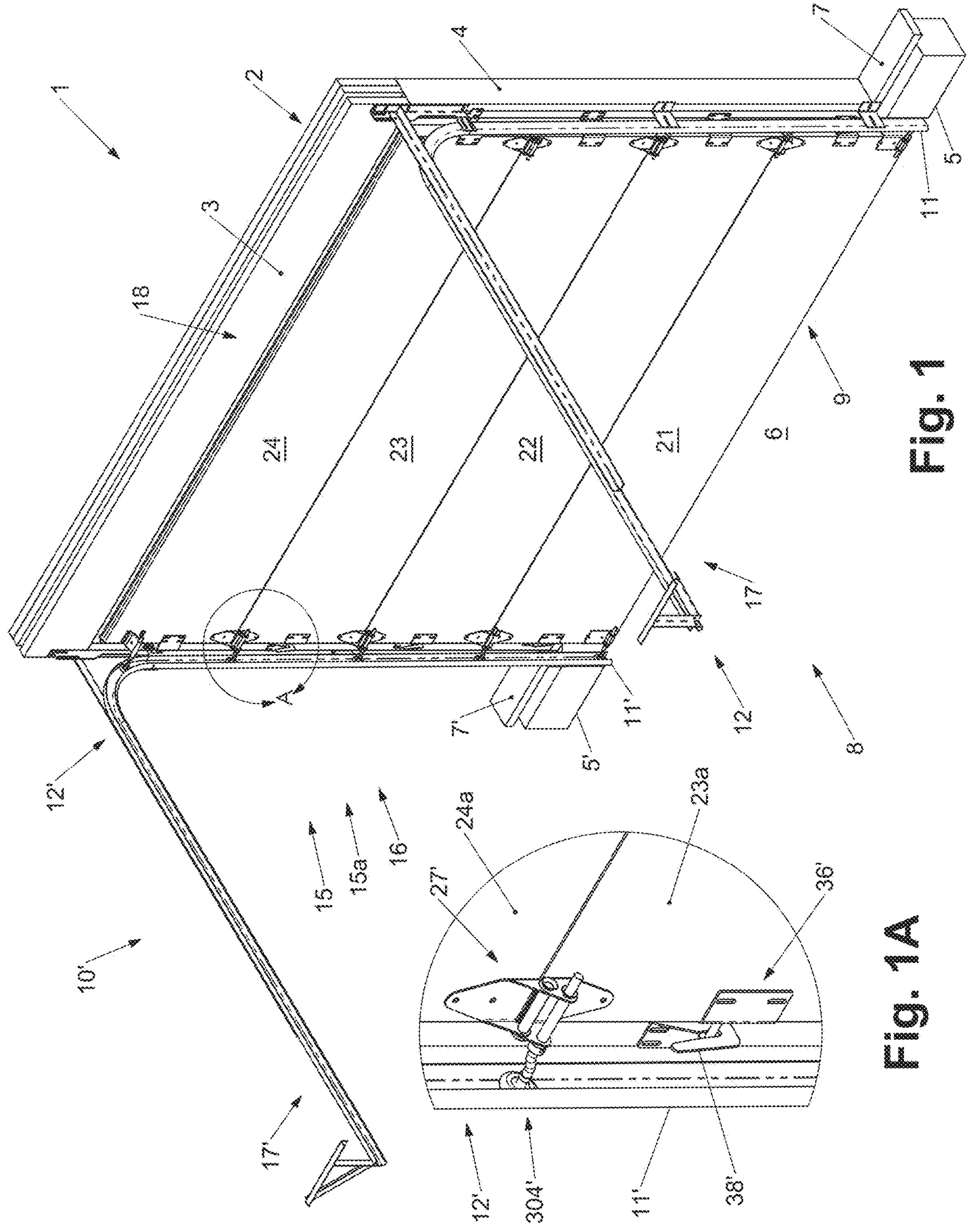
FIG. 1 is a three-quarter inside upper perspective view of a typical overhead garage door system in accordance with one example of the present disclosure.
FIG. 1A is a detailed view of a portion of the three-quarter inside perspective view of FIG. 1.
Figure 2:
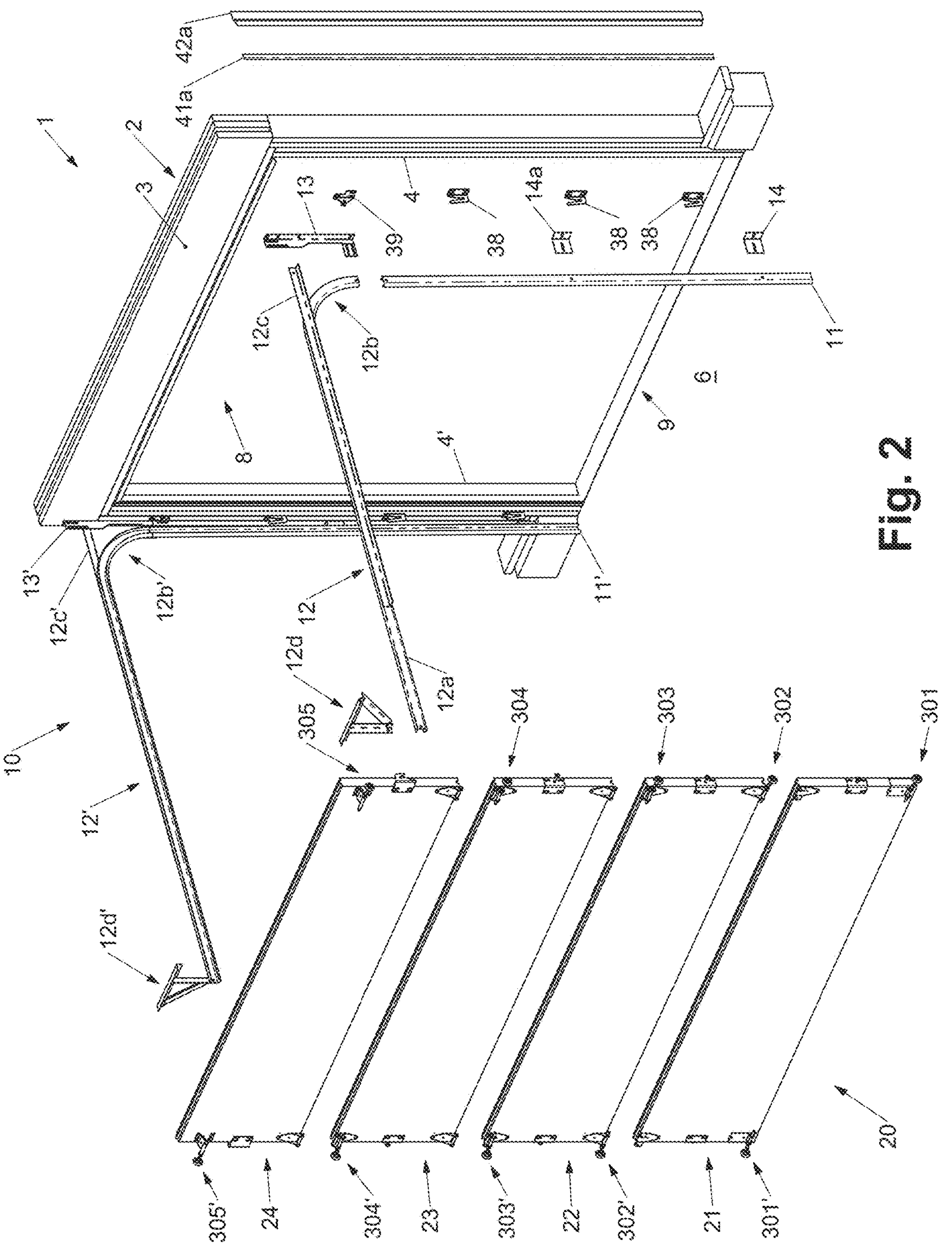
FIG. 2 is a three-quarter inside partially exploded perspective view of the garage door system of FIG. 1.

Referring now to the drawings and the illustrative examples depicted therein, an overhead garage door improved opening, closing and weather sealing system 1, as shown in FIGS. 1, 1A, and 2, is generally constructed in a door structural frame 2 within a structural wall of a garage or building. Overhead garage door system 1 includes an arrangement of first, second, third and fourth door panel subassemblies 21, 22, 23, and 24, respectively, that are each linked together by a series of pivotal hinge assemblies 25, 26, 27 to form a hinged multi-panel assembly 20 capable of following a track 11, 12 of an overhead door system. The garage door includes a door moving or door sealing assembly that functions to move the door panels towards and against the door structural frame when the garage door is closed. For example, the first, second, and third panels 21, 22, 23 include a wedge-pin bracket subassembly 34, 35, 36, respectively, that each have a wedge pin 34*b*, 35*b*, 36*b* of varied length for engaging respective door frame angled contact brackets 38 to enhance sealing of the door panels against the frame, as further described below. When closing the door panel subassemblies 21, 22, 23, and 24, wedge pins 34*b*, 35*b*, 36*b* make sliding contact with door frame angled-contact brackets 38, respectively, which are attached at appropriate locations along the door structural frame. This sliding contact applies a resultant outward or exterior direction horizontal force to a central portion of the door panel subassemblies 21, 22, 23 causing the door panel assemblies 21, 22, 23 to move or translate closer to the inner surface of a door frame jamb 4 of the door structural frame to further seal or insulate the garage or facility, as also further described below.

The tightness and mechanical sealing and security of the overhead garage door movable multi-panel assembly 20 when it is closed is provided independently of the overhead garage door tracks and structural support system 10, since the door closing and tightness to the door structural frame 2 is provided specifically and substantially by the engagement of the respective wedge-pin bracket subassemblies 38, 39 and angled-contact bracket subassemblies 34, 35, 36 and 37, while the offset track-wheel and shaft subassemblies 301, 302, 303, 304 and 305 freely roll along the track 12.

The wheel and shaft subassemblies of the present disclosure provide for additional movement of the door panels away from the wheels and tracks and towards the door structural frame (in a direction generally normal to the direction of travel of the wheels along the tracks and in a direction generally normal to the axis of rotation of wheels) when the door is closed and provide for additional clearance between the door panels and the door structural frame during movement of the garage door between its opened and closed positions. For example, with vertically oriented tracks, the wheel and shaft assemblies are configured to allow for movement of the door panels relative to the wheels in a generally horizontal direction that is generally normal to the axis of rotation of the wheels and thus generally normal to a plane defined between the opposite spaced apart tracks. In the illustrated examples, the offset-track-wheel shaft subassemblies 301, 302, 303, 304 and 305 include a support shaft 32 that has a wheel mounting portion that is offset relative to a shaft mounting portion. The wheel mounting portion mounts the track-wheel 31 and the panel mounting portion is mounted to one of the respective door panels 32, 22, 23, 24. The shaft/wheel offset allows for the door panels to move along the track inboard of the building or door structural frame and then, when the pins engage the angled brackets, the shaft pivots relative to the door panel to allow the door panel to move away from or outboard from the tracks and towards and into engagement with the door structural frame. By having the door panels substantially spaced inboard from the door structural frame when the door is at least partially opened, the overhead garage door 1 allows for the multi-panel assembly 20 to have a seal along its outer surface that does not contact the outer surface or structural frame 2 of the building structure during opening of closing of the multi-panel assembly 20, but does contact and seal against the building structure when moved against the building structure by the pivoting offset-track-wheel shaft subassemblies 301, 302, 303, 304, and 305 as will be further described below.

The overhead garage door tracks and structural support system 10 is attached to and supported at the door structural frame 2 as is common with most known overhead garage door arrangements of this type. The overhead garage door tracks and structural support system 10 generally includes vertical track members 11 that are securely attached to the vertical door frame jambs 4 at vertical track door frame jamb support brackets 14.

Figures 3, 3A:
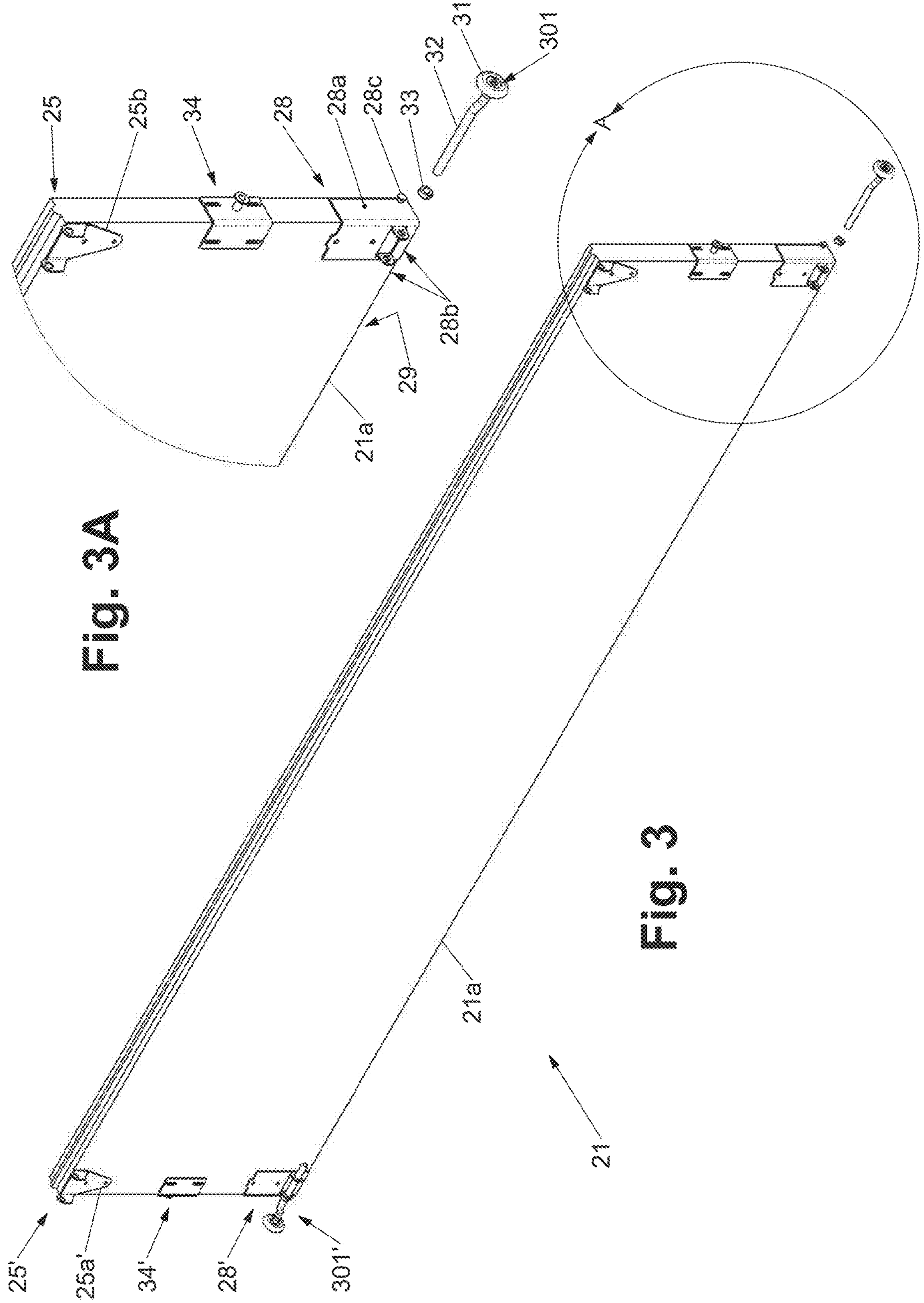
FIG. 3 is an inside perspective view of a first door panel subassembly shown in FIG. 2.
FIG. 3A is a detailed view of one end of the first door panel subassembly of FIG. 3.

FIGS. 3 and 3A show the components of the first door panel subassembly 21 including the first panel bottom corner bracket subassembly 28. Bottom corner bracket subassembly 28 further includes bottom corner bracket plate 28*a* that is securely attached to first door panel 21*a* and further includes first offset track-wheel and shaft subassembly 301. First offset track-wheel and shaft subassembly 301 is free to pivot centrally within a pair of pivot-hole tabs 28*b* about offset support shaft axis of rotation 32*a*, best shown by reference in FIGS. 12A and 12E.

It may be noted that first panel counterbalance cable attachment stud 28*c* is provided at each side of the garage door at the first panel bottom corner bracket subassembly 28 to provide an attachment or anchor point for respective overhead garage door counterbalance support cables and pulley systems (not shown), as one in the art would understand.

First pivotal hinge lower plate 25*b* of first pivotal hinge subassembly 25 is attached by fasteners to the upper portion of first door panel subassembly 21. Finally, first panel wedge-pin bracket subassembly 34 is securely fastened to the approximate mid-point at both vertical edges of first door panel 21*a*.

Figures 4, 4A:
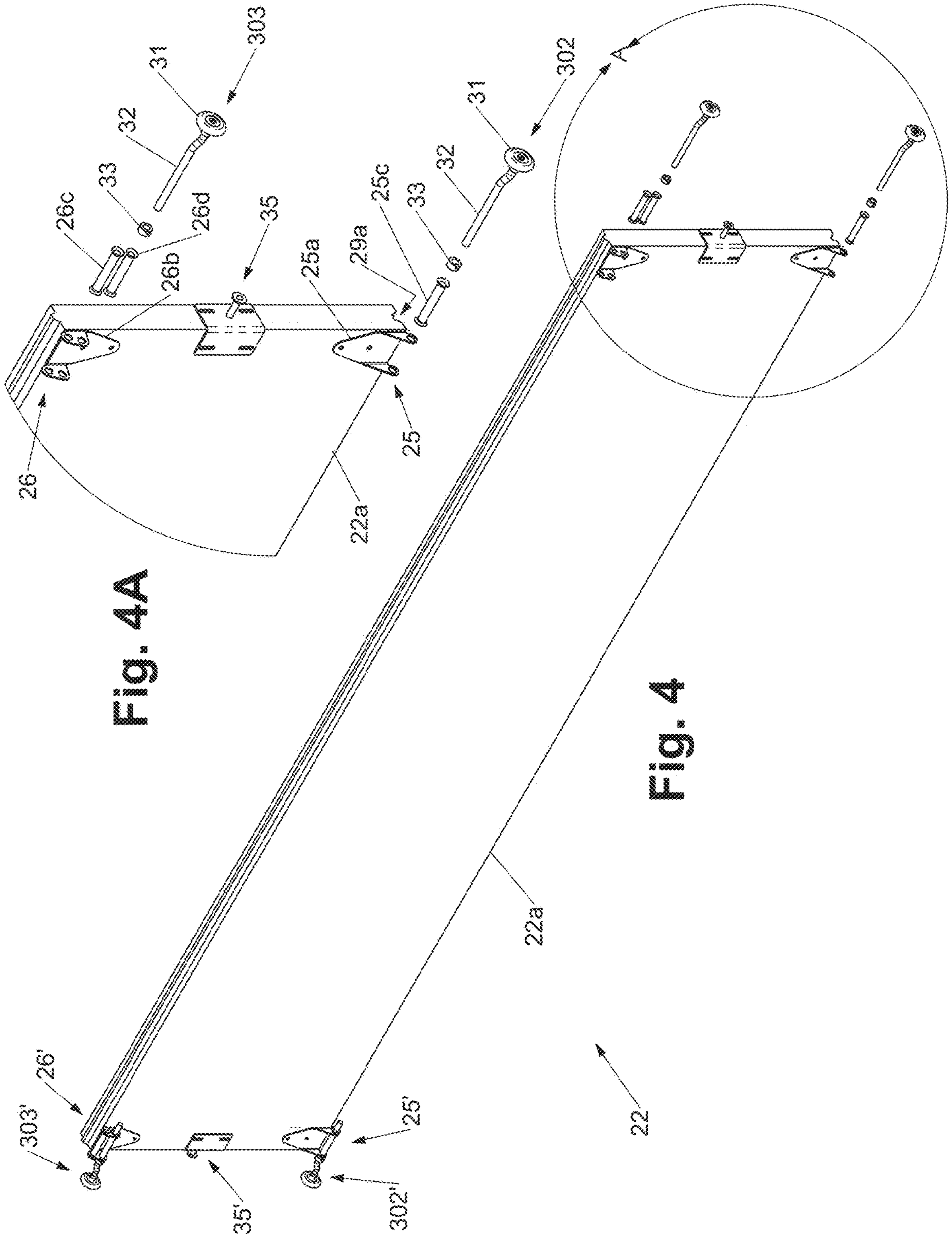
FIG. 4 is an inside perspective view of a second door panel subassembly shown in FIG. 2.
FIG. 4A is a detailed view of one end of the second door panel subassembly of FIG. 4.

FIGS. 4 and 4A show the components of the second door panel subassembly 22 including first pivotal hinge upper plates 25*a* securely attached to the bottom corners of second door panel 22*a*. First and second door panel sub-assemblies 21 and 22 are pivotally jointed by first pivotal hinge-pin tube 25*c*, which may include, for example, expanded ends for permanent attachment into the hinge assembly 25, as one in the art would understand. Support shaft 32 of second offset track-wheel and shaft subassembly 302 is free to pivot centrally within first pivotal hinge assembly 25 and first pivotal hinge-pin tube 25*c* about offset support shaft axis of rotation 32*a*, best shown by reference in FIGS. 12A and 12E.

In FIG. 4A, second pivotal hinge lower plate 26*b* of second pivotal hinge subassembly 26 is attached by fasteners to the upper portion of second door panel subassembly 22*a*. Third offset track-wheel and shaft subassembly 303 is free to pivot centrally within second pivotal hinge lower plate 26*b* of second pivotal hinge assembly 26 and second pivotal hinge-pin tube 26*d* about offset support shaft axis of rotation 32*a*, best shown by reference in FIGS. 12A and 12E.

It should be noted that in this third track wheel instance 303 the offset axis 32*a* of the support shaft 32 of offset track-wheel and shaft subassembly 303 and the second pivotal hinge axis at second pivotal hinge assembly 26 are not at a common central axis as is the case with the first pivotal hinge subassembly 25. Many track wheel shafts are offset away from the door panels by increasing amounts as their respective heights above the floor increases because the vertical tracks 11 (and 11') are typically installed at a slight angle with respect to interior faces of the sides of the door frame jamb 4 (and 4') such that the top portion of the tracks are slightly further away from the door frame than the bottom portion of the tracks. The slight angle defined by the respective axes of the track wheel shafts with respect to the door panels generally matches the slight angle of the installed vertical tracks. This slight angle is often optional provides for added clearance between the door frame and each of the respective door panels as the door is raised and opened. Additionally when the garage door is closed the slight angle provides to help gradually reduce the running clearance and any required gap between the garage door panels and the inside or interior face of the door frame jamb 4 (and 4') as much as practical without causing excessive friction or contact. The current disclosure does not rely on this slight vertical track angle and is operable to function either with vertical door tracks set either parallel or at a slight vertical angle with respect to the door frame. Careful study of FIGS. 13 through 18 best illustrate the slight angle shown between vertical track 11 and door frame jamb 4 depicted within the example of the current disclosure. Finally in FIGS. 4 and 4A, second panel wedge-pin bracket subassembly 35 is securely fastened to the approximate mid-point at both vertical edges of second door panel 22*a*.

Figures 5, 5A:
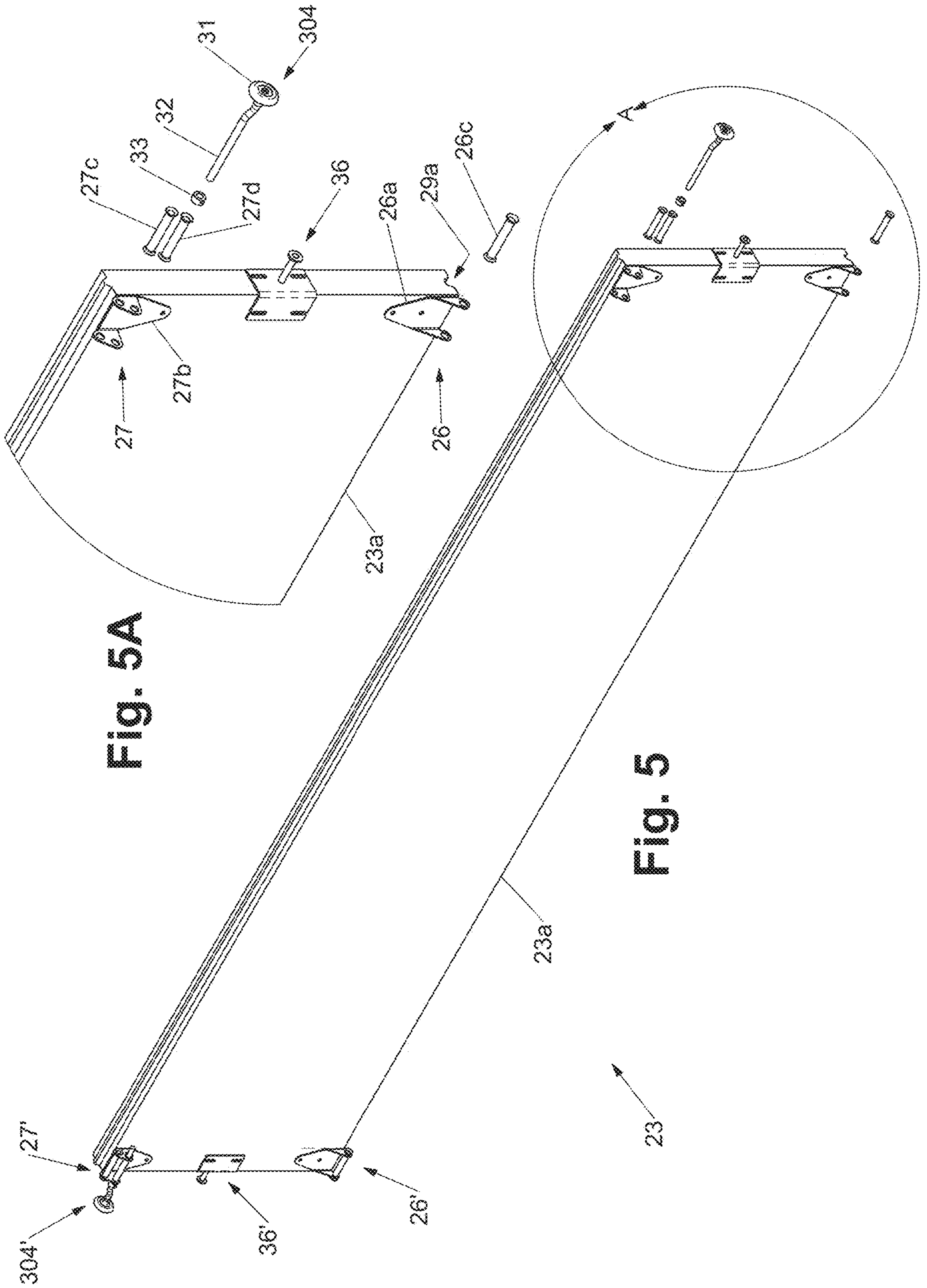
FIG. 5 is an inside perspective view of a third door panel subassembly shown in FIG. 2.
FIG. 5A is a detailed view of one end of the third door panel subassembly of FIG. 5.

FIGS. 5 and 5A show the components of the third door panel subassembly 23 including second pivotal hinge upper plates 26*a* securely attached by fasteners to the bottom corners of third door panel 23*a*. Second and third door panel subassemblies are pivotally jointed by second pivotal hinge-pivot tube 26*c* which acts as an effective hinge pivot pin for second pivotal hinge subassembly 26. Fourth offset track-wheel and shaft subassembly 304 is free to pivot centrally within offset support shaft pivot tube 27*d* at third pivotal hinge lower plate 27*b* of third pivotal hinge subassembly 27 about offset support shaft axis of rotation 32*a*, best shown by reference in FIGS. 12A and 12E.

Again, and for the reason stated above regarding slight angles of the vertical tracks 11 (and 11') with respect to the door frame jamb 4 (and 4') and the increasing offset location of the track wheel shafts with respect to the door panels, it should be noted that in this fourth instance the offset axis 32*a* of the support shaft 32 of offset track-wheel and shaft subassembly 304 and the second pivotal hinge axis are again not at a common central axis as is the case with the first pivotal hinge subassembly 25. In fact, the offset is further increased beyond that of the previous or second pivotal hinge subassembly 26. Finally, as shown in FIGS. 5 and 5A, third panel wedge-pin bracket assembly 36 is securely fastened to the approximate mid-point at both vertical edges of third door panel 23*a.*

Figures 6, 6A:
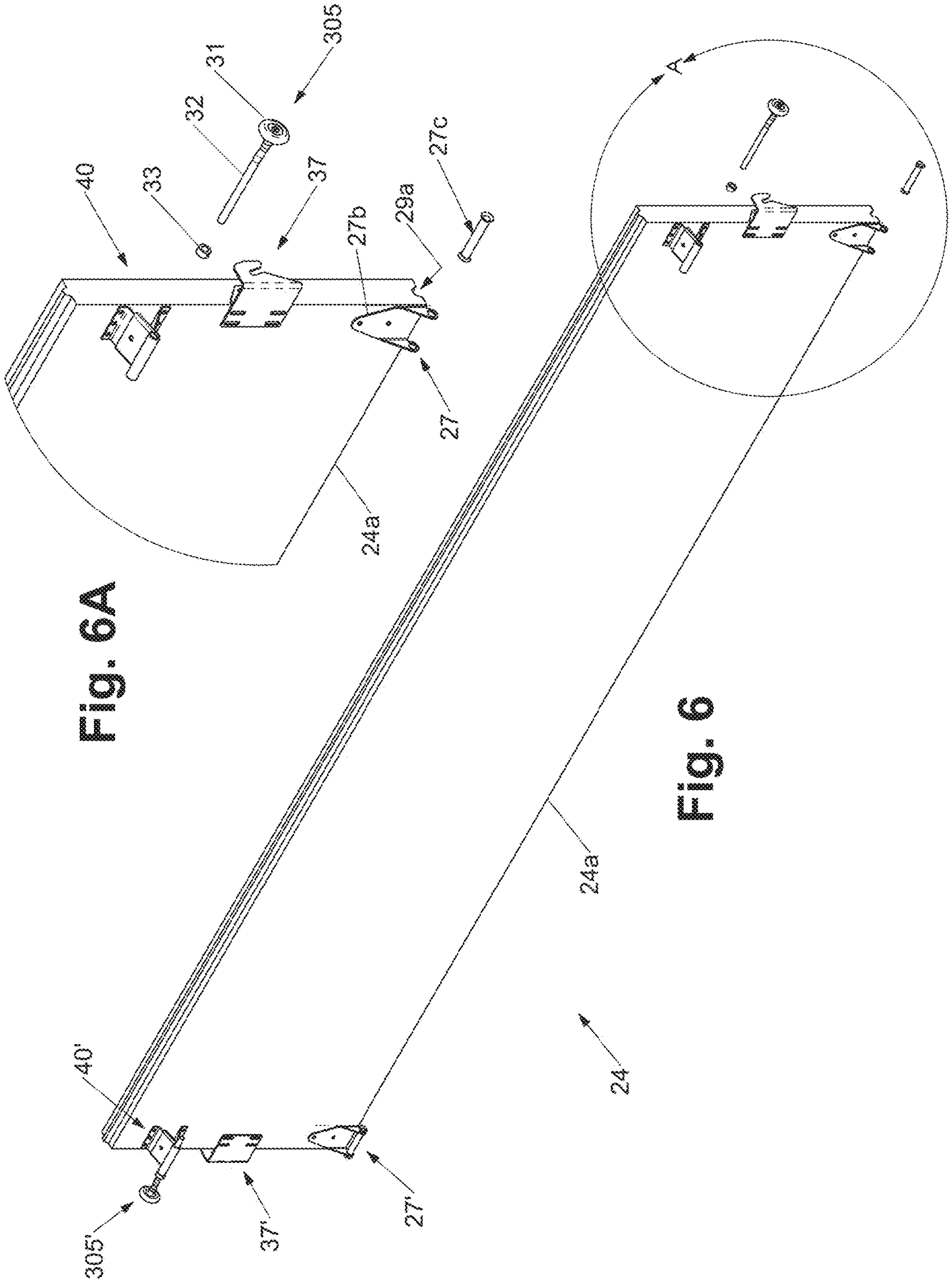
FIG. 6 is an inside perspective view of a fourth door panel subassembly shown in FIG. 2.
FIG. 6A is a detailed view of one end of the fourth door panel subassembly of FIG. 6.

FIGS. 6 and 6A show the components of the fourth door panel subassembly 24 including third pivotal hinge upper plate 27*b* securely attached by fasteners to the bottom corners of fourth door panel 24*a*. Third and fourth door panel subassemblies are pivotally jointed by third pivotal hinge-pivot tube 27*c* which acts as an effective hinge pivot pin for the third pivotal hinge subassembly 27. The fifth offset track-wheel and shaft subassembly 305 is free to pivot centrally within the fourth door panel upper track-wheel bracket subassembly 40 (and 40') about offset support shaft axis of rotation 32*a*, best shown by reference in FIGS. 12A and 12E. The fourth door panel upper track-wheel bracket is securely fastened to the fourth door panel 24*a* by fasteners at a location selected by design a distance part way down from the top most edge or portion of the fourth door panel 24*a*. Additionally, the track-wheel and shaft subassembly 305 is further offset away from the interior face of the fourth door panel 24*a* to allow the track-wheel to engage the horizontal track curved portion 12*b* as the track curves away from the door structural frame 2 at this location as shown in FIGS. 1 and 2. This 'early curving away from the door frame aspect' because the horizontal track curved portion 12*b* of the horizontal track member 12*a* is positioned at a vertical location as low as possible with respect to the top of door opening 8 and door frame header 3 for the benefit of reducing the total or effective height of the horizontal door track system 10 as much as possible, as one in the art would understand. This is often required with garage door installations having low-clearance ceilings providing limited available vertical clearance for door track systems at the interior portion of the building structure.

Finally as shown in FIGS. 6 and 6A, a fourth panel angled-contact bracket subassembly 37 is securely fastened to the approximate mid-point at both vertical edges of the fourth door panel 24*a*. In this fourth and special instance, the bracket design and arrangement is different from the previous first, second, and third door panel assemblies 21, 22, and 23 respectively. In this special instance the wedge-pin bracket subassembly for the fourth door panel 24*a* is instead attached and secured by fasteners to the door frame jamb 4 door of structural door frame at 2 rather than at the mid-point edges of the fourth door panel 24*a*. As compared with the previous 3 door panels just described, the functional locations of the wedge-pin bracket 39 and fourth panel angled-contact bracket subassembly 37 are effectively reversed at the fourth door panel 24*a*. A key reason for this design aspect is to avoid having to provide a wedge-pin bracket subassembly similar and corresponding to the preceding ones at all the remaining door panel assemblies that would include the longest version of a wedge-pin corresponding to the first, second, and third wedge-pins 34*b*, 35*b*, and 36*b* respectively. The requirement of additional length for each of the series of successive wedge-pin brackets 34, 35, 36 is to avoid interference contact with the door-frame-mounted angled-contact brackets 38 whenever the door assembly 20 is raised for opening or lowered for closing. Additionally, if in fact a substantially long fourth panel wedge-pin bracket were to be installed at the mid-point of the vertical edges of the fourth panel as with the other remaining panels, the left and right side door track assemblies would need to be spaced even further apart in order to avoid contact interference between the potential and substantially longer fourth panel wedge-pin bracket, and the curved portion of the horizontal track 12*b*, as well as the track member door frame header support bracket 13. It should also be noted that if a substantially long fourth panel wedge-pin bracket pin were to be secured to the fourth door panel, this would further represent a relatively longer moment arm compared to the other wedge-pin bracket pins at the remaining door panels. Thus, the relative strength of the fourth panel wedge-pin bracket can be maintained without a potential increase the size and thickness of the bracket or with the diameter of the wedge-pin in order to meet the foreseeable and anticipated force and mechanical requirements of the current garage door system.

Thus, the presented arrangement of the brackets for the fourth and uppermost door panel subassembly 24 helps to alleviate the strength requirement and caused by increased length of the wedge-pin 39*b* and the relative strength concerning the fourth panel wedge-pin bracket 39 design compared to the remaining and corresponding edge-pin brackets. Second, a further advantage of allowing a reduced distance between the left and right side door tracks is accomplished such that the total lateral or horizontal width between the right and left side door tracks of the overhead garage door system 1 can be preferably reduced and minimized. Thirdly, an additional and useful design advantage is provided in that the third panel wedge-pin bracket subassembly 36, readily avoids any interference contact with door frame fourth panel wedge-pin bracket 39 as the third garage door panel 23 travels along and around the horizontal track curved portion 12*b* of horizontal track assembly 12. In effect the mid portion of the third and remaining door panels 23, 24 including the wedge-pin bracket subassembly 36 and 36' are steered or otherwise directed away from the fourth panel wedge-pin bracket 39 and 39' respectively due to the relative placement and geometry of the door panels 21, 22, 23, 24, track wheels 301, 302, 303, 304, and 305 (including 301', 302', 303', 304', and 305'), and the curved portion 12*b* of the track. Likewise the remaining and subsequent wedge-pin bracket subassemblies 35 and 34 also readily avoid any interference contact with door frame fourth panel wedge-pin bracket 39 during either opening or closing movements as a result of the design and location of the components.

As shown in FIGS. 3, 3A, 4, 4A, 5, 5A, 6 and 6A, a track wheel shaft stop collar 33 is optionally provided at each of the respective first through fifth offset track-wheel and shaft subassemblies 301, 302, 303, 304, and 305 (including 301', 302', 303', 304', and

305'). Track wheel shaft stop collars 33 each further include a threaded set screw, for example, to provide for locking each of the collars 33 to its respective track-wheel offset support shaft 32. The purpose of this is to allow any necessary side to side or initial centering adjustment of the overhead garage door movable panel assembly 20 with respect to the overhead garage door tracks and structural support system 10 and the garage door opening 8 as may be necessary. Once adjusted the track wheel shaft stop collars 33 would serve to limit or otherwise control the side to side direction of freedom of movement of the moveable panel assembly 20. Other fasteners known in the art can secure the relative axial locations or positions of the shafts 32 within their respective locations while providing free rotation at the offset support shafts 32 including, for example, welded collars, washers, or machined shoulders incorporated into the support shafts 32. Thus, the proper functional design clearances are maintained between and at the respective wedge-pin bracket subassemblies 38, 39; and angled-contact bracket subassemblies 34, 35, 36 and 37 for proper function of the garage door assembly.

Figures 7, 7A, 7B:
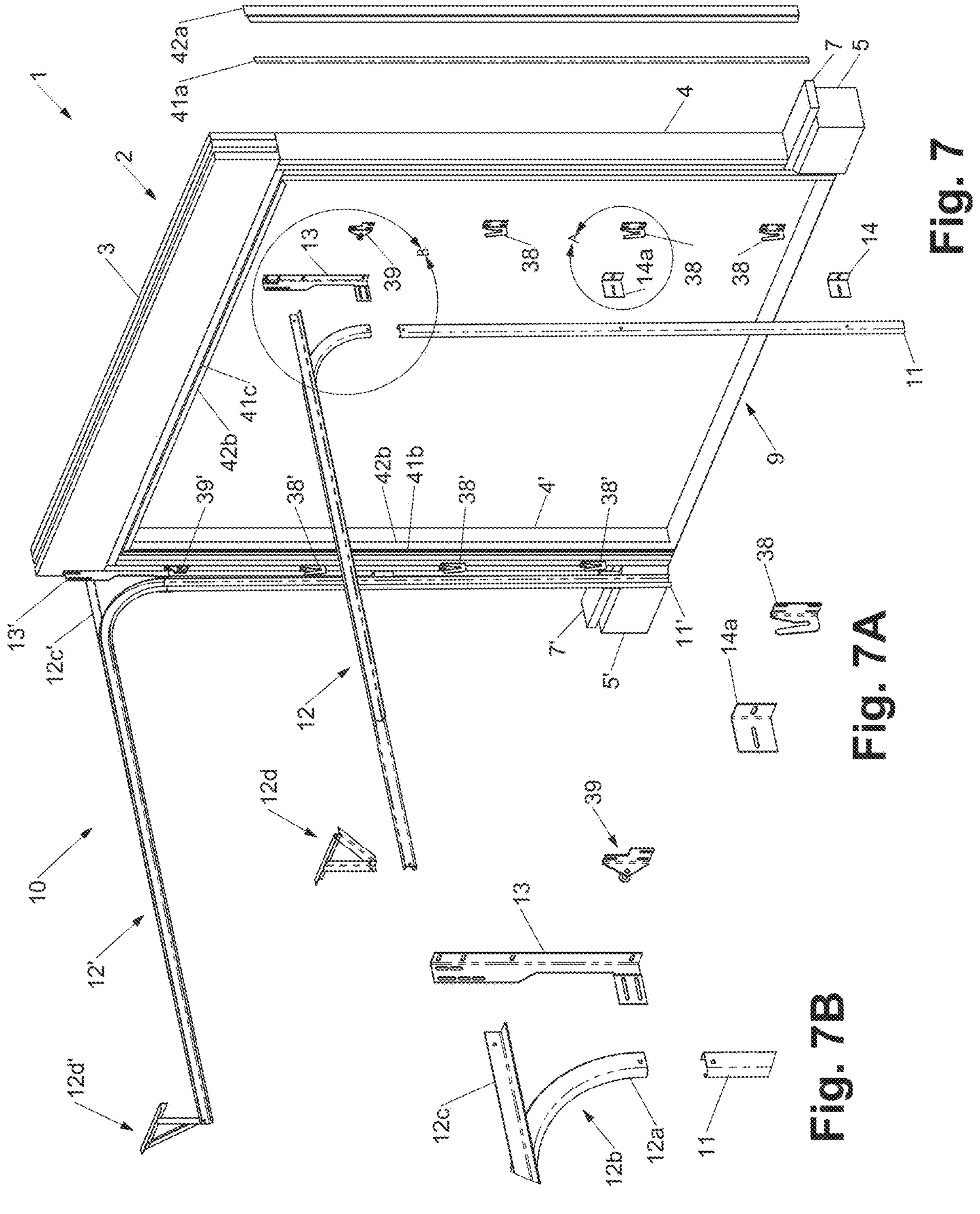
FIG. 7 is an inside perspective partially exploded view of one set of garage door tracks and mounting brackets shown in FIG. 2.
FIG. 7A is a detailed view of example door frame and door track brackets of FIG. 7.
FIG. 7B is a detailed view of example tracks and door frame brackets of FIG. 7.

FIGS. 7, 7A, and 7B provide a partially exploded view in greater detail of some of the components of the example of the present disclosure. Of particular interest are door frame first panel angled-contact bracket 38, door frame second panel angled-contact bracket 38, third door frame panel angled-contact bracket 38, and door frame fourth panel wedge-pin bracket 39. It should be noted that door frame first panel angled-contact bracket 38, door frame second panel angled-contact bracket 38, and third door frame panel angled-contact bracket 38 represent brackets that are physically the same with respect to material and dimensions within this example of the present disclosure. The preferred material for the brackets in this example is mild steel; however the use of other suitable structural materials is fully anticipated. Accordingly each of these four component brackets is securely attached with fasteners to the door frame jamb 4 of door structural frame 2. It should be understood that a corresponding set of mirrored-image brackets are included and secured at the opposite side of the garage door opening 8 at door frame jamb 4'. Also shown are side weather strip bulb seals 41*a* and 41*b*, top weather strip bulb seal 41*c*, side weather strip lip seals 42*a* and 42*b*, and top weather strip lip seal 42*c*. The weather strip seals are securely attached with fasteners to the inner surfaces of the door frame jambs 4 and 4' as well as the inner surface of the door frame header 3 within the door opening. The sealing edge portions of the respective weather strips are in firm contact with the outer face portions of the first, second, third, and fourth door panels 21*a*, 22*a*, 23*a*, and 24*a* respectively, whenever the overhead garage door movable multi-panel assembly 20 is in the closed position.

FIGS. 8, 8A, 8B and 8C show the details and features of door frame first panel angled-contact bracket 38 according to this example of the present disclosure. Door frame first panel angled-contact bracket 38 is comprised of steel, for example, in the form of a cut and bent plate. A set of four mounting slots 38*e* are provided to allow fasteners, such as wood screws or lag bolts, for example, to secure the bracket 38 to the door frame jamb 4. In this example four slots are shown, however any number of slots or holes may be otherwise provided for such that some adjustability of the bracket 38 can be readily made as to its adjustment and exact final location at the surface of the door frame jamb 4, for example. At the generally perpendicular portion of the bracket 38 with respect to its mounting surface including the slots 38*e* a generally wedge-shaped opening is provided including angled-contact closing surface, angled-contact opening surface 38*d*, and pre-closing guide surfaces 38*f* and 38*g*. These four angled-contact surfaces are at respective angles A1, A2, A3, and A4 with respect to the mounting surface of the bracket 38 at fastener slots 38*e*. The purpose of the angled surfaces is to provide a point of relative movement contact and guidance and engagement for each of the respective panel wedge-pins 34*b*, 35*b*, and 36*b* of panel wedge-pin bracket subassemblies 34, 35, and 36 respectively. Accordingly, this engagement provides mechanical guidance, position control, and an effective resulting clamping force at each of the respective door panels at each of the respective left and right side mid-portions of each door panel, and their respective door panels, when the overhead garage door movable multi-panel assembly 20 is either opening or closing.

FIGS. 9, 9A, 9B, and 9C, show the details and features of first panel wedge-pin bracket subassembly 34 according to this example of the present disclosure. First panel wedge-pin bracket subassembly 34 includes fabricated and welded steel, for example, in the form of a cut and bent plate 34*a*, first panel wedge-pin 34*b*, and first panel wedge-pin end washer 34*c*. A set of four first panel wedge-pin bracket mounting slots 34*d* are provided to allow fasteners, such as wood screws, lag bolts, or other metal or wood fasteners, for example, to secure the bracket 34 to first door panel 21*a* as required.

Figure 10A:
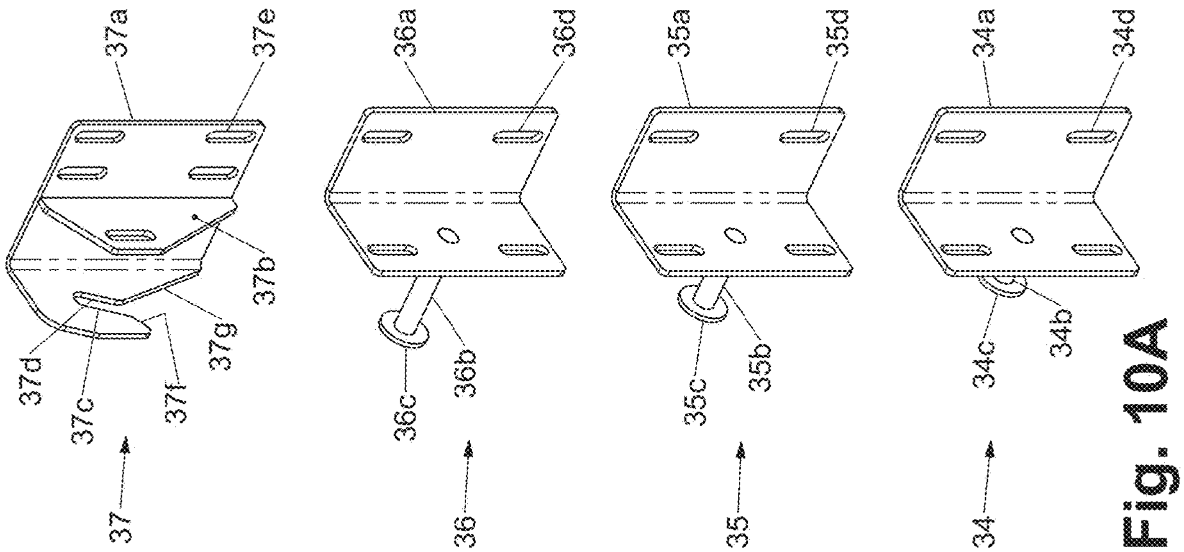
FIG. 10A is an opposite side perspective comparison view of the door panel mounted wedge-pin brackets in FIG. 10.
Figure 10:
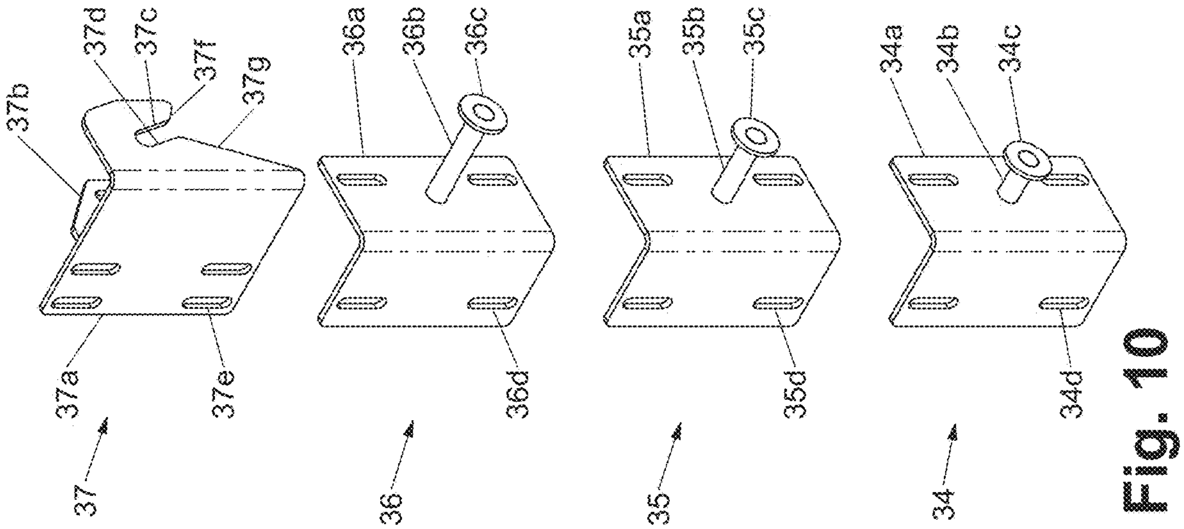
FIG. 10 is a perspective comparison view of door panel mounted wedge-pin brackets.

FIGS. 10 and 10A show the details and a relative comparison between the first, second, and third panel wedge-pin brackets 34, 35, and 36 respectively. Opposing perspective views of the same set of components are provided to illustrate the similarities and relative differences between the brackets, all of which are may be normally fastened to their respective door panels assemblies in the same way. It should be noted that the respective wedge-pins increase in length at wedge-pin brackets 34, 35 and 36. This corresponds to the first, second and third respective door panels. The differences in length are a necessary part of the design of the disclosure, for example, to avoid subsequent contact interference between the door panel wedge-pin bracket 34 with door frame second panel angled-contact bracket 38 when the overhead garage door movable multi-panel assembly 20 is either opening or closing.

Figure 11B:
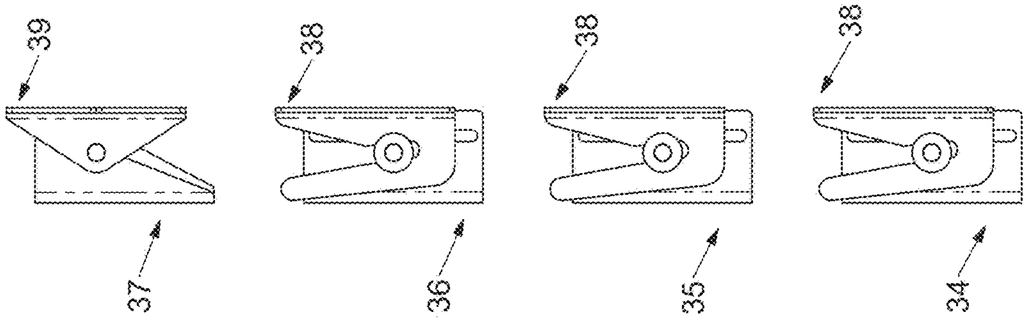
FIG. 11B is a side view of the perspective comparison view of FIG. 11.
Figure 11A:
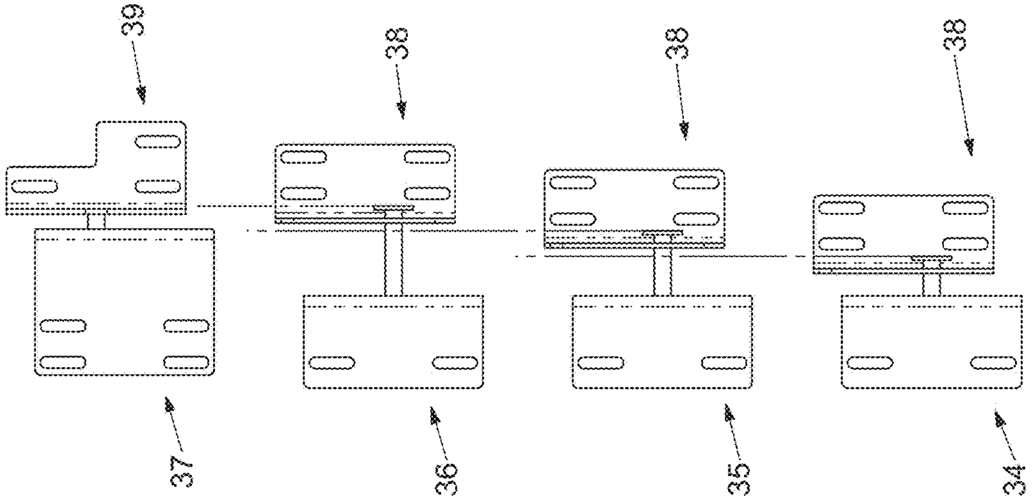
FIG. 11A is a front view of the perspective comparison view of FIG. 11.
Figure 11:
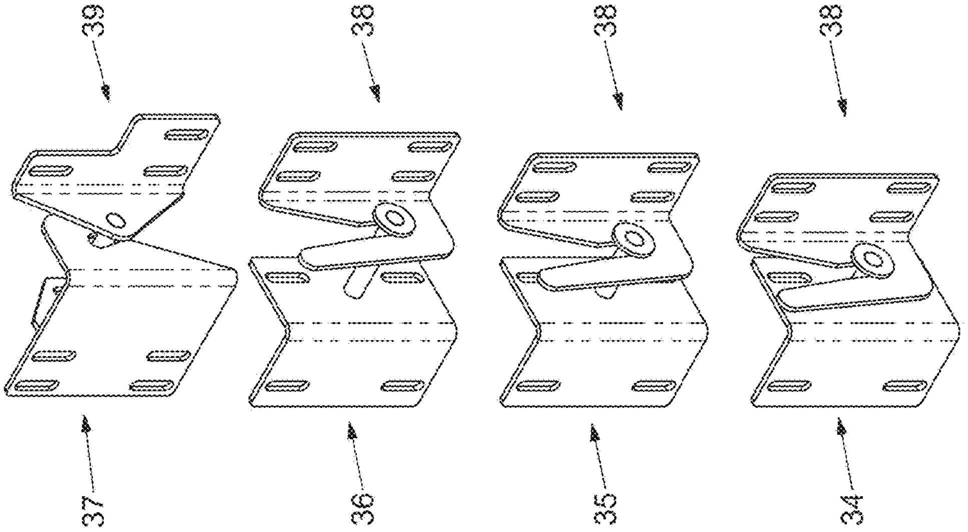
FIG. 11 is a perspective comparison view of the series of door panel mounted wedge-pin brackets shown in FIG. 10 including a series of door-frame-mounted angled contact brackets.

FIGS. 11, 11A, and 11B offer to illustrate how door panel wedge-pin brackets are offset to one another in succession. For example, wedge-pin bracket 34 (fastened to first door panel assembly 21) must move upward as the door is opened, as it travels along and past door frame second angled-contact bracket 38 (fastened to the door frame) the offset provides clearance between wedge-pin bracket 34 and second angled contact bracket 38 without contact interference in each case. This same offset requirement and clearance applies to door panel wedge-pin bracket 35 (fastened to the door panel) and travels along and upward past door frame third angled-contact bracket 38. As compared with the previous 3 door panels just described, the function and locations of the wedge-pin bracket 39, the fourth panel angled-contact bracket subassembly 37, and fourth door panel subassembly 24 are similar. As described previously, the resulting design advantage is provided in that the third panel wedge-pin bracket subassembly 36, readily avoids any interference contact with door frame fourth panel wedge-pin bracket 39 as the third garage door panel travels along and around the horizontal track curved portion 12*b* of horizontal track assembly 12. Subsequent wedge-pin bracket subassemblies 35 and 34 also readily avoid any interference contact with door frame fourth panel wedge-pin bracket 39 during either opening or closing movements of the garage door.

Figure 11C:
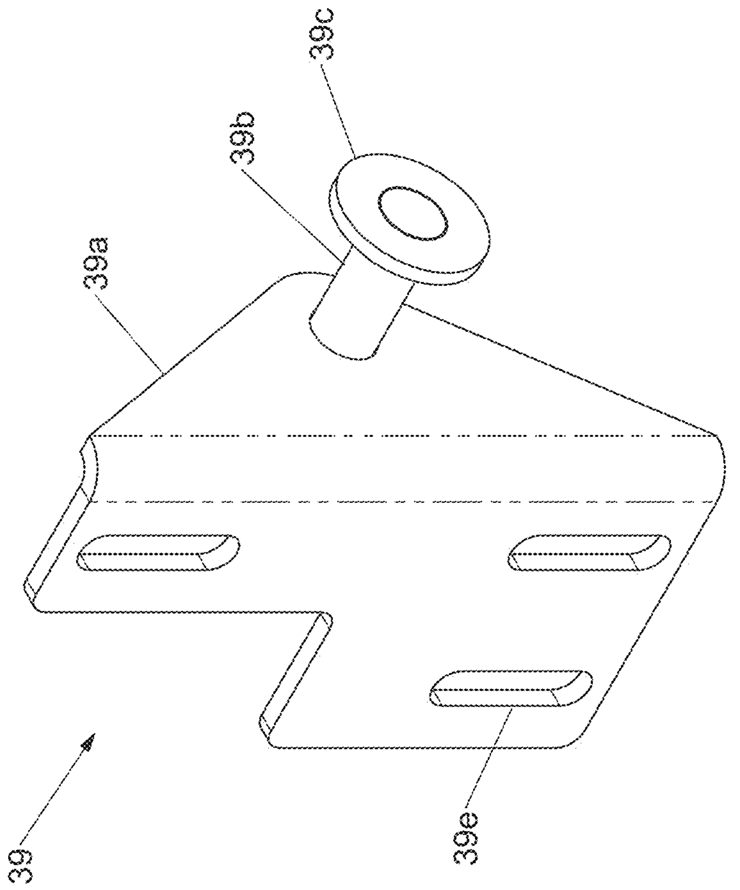
FIG. 11C is a perspective view of the upper panel pin for engaging the upper bracket in FIGS. 11, 11A and 11B.

FIG. 11C is provided to show the additional details of door frame fourth panel wedge-pin bracket 39. This bracket includes door frame fourth panel wedge-pin bracket plate 39, door frame fourth panel wedge-pin 39*a*, and door frame fourth panel wedge-pin end washer 39*c*. In this example the bracket includes mild steel welded together. Door frame fourth panel wedge-pin bracket mounting slots 39*e* are provided to offer a degree of movement during initial set-up during door installation and final adjustments as is the case with the remaining similar brackets shown within the examples of the disclosure.

The first, second, third, and fourth panel wedge-pin end washers 34*c*, 35*c*, 36*c* and 39*c* serve as load carrying members and mechanical stops when the garage door is closed. The respective wedge-pin brackets 34, 35, 36, 39 are engaged with the respective door frame first, second third, and fourth panel angled-contact bracket subassemblies 38, 37. In the event that excessive door panel deflection with respect to the door frame 2 should occur during periods of high wind loads or seismic activity, the various wedge-pin end washers 34*c*, 35*c*, 36*c*, 39*c* and bracket assemblies 38, 37 will provide a means to transfer structural loads across the garage door opening and limit mechanical and structural deflection at and around the garage door opening during such potentially destructive events. In this way the overhead garage door improved opening, closing and weather sealing system and method 1 can provide significant improvements toward helping to minimize structural damage during such occurrences, for example.

Figures 12, 12A, 12B, 12C, 12D, 12E:
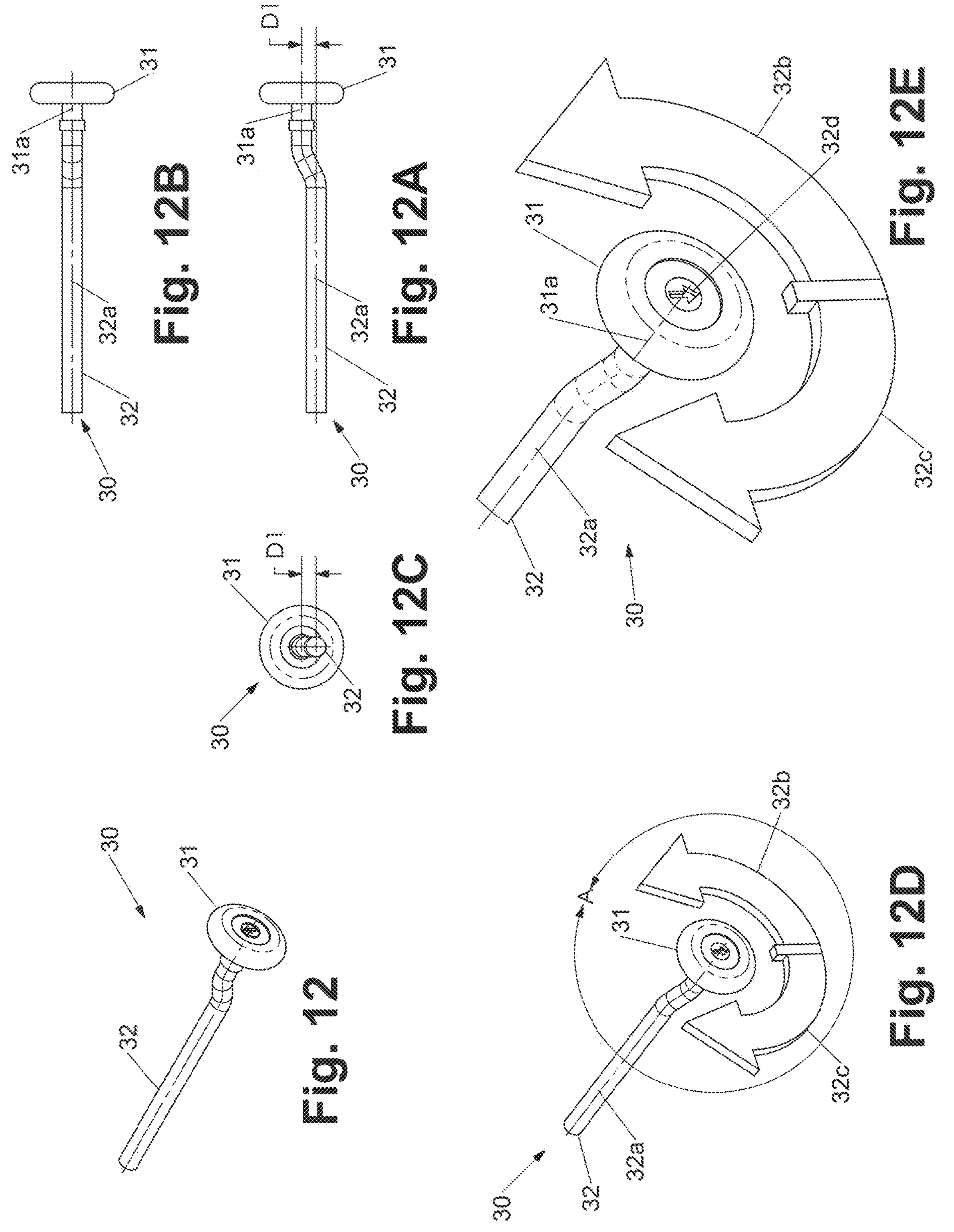
FIG. 12 is a perspective view of an offset track-wheel and shaft subassembly.
FIG. 12A is a side view of the offset track-wheel and shaft subassembly of FIG. 12.
FIG. 12B is a top view of the offset track-wheel and shaft subassembly of FIG. 12.
FIG. 12C is a shaft-end view of the offset track-wheel and shaft subassembly of FIG. 12.
FIG. 12D is a perspective view of the offset track-wheel and shaft subassembly of FIG. 12 including freedom of rotation arrows of the offset shaft.
FIG. 12E is a detailed view of the FIG. 12D.
Figure 13A:
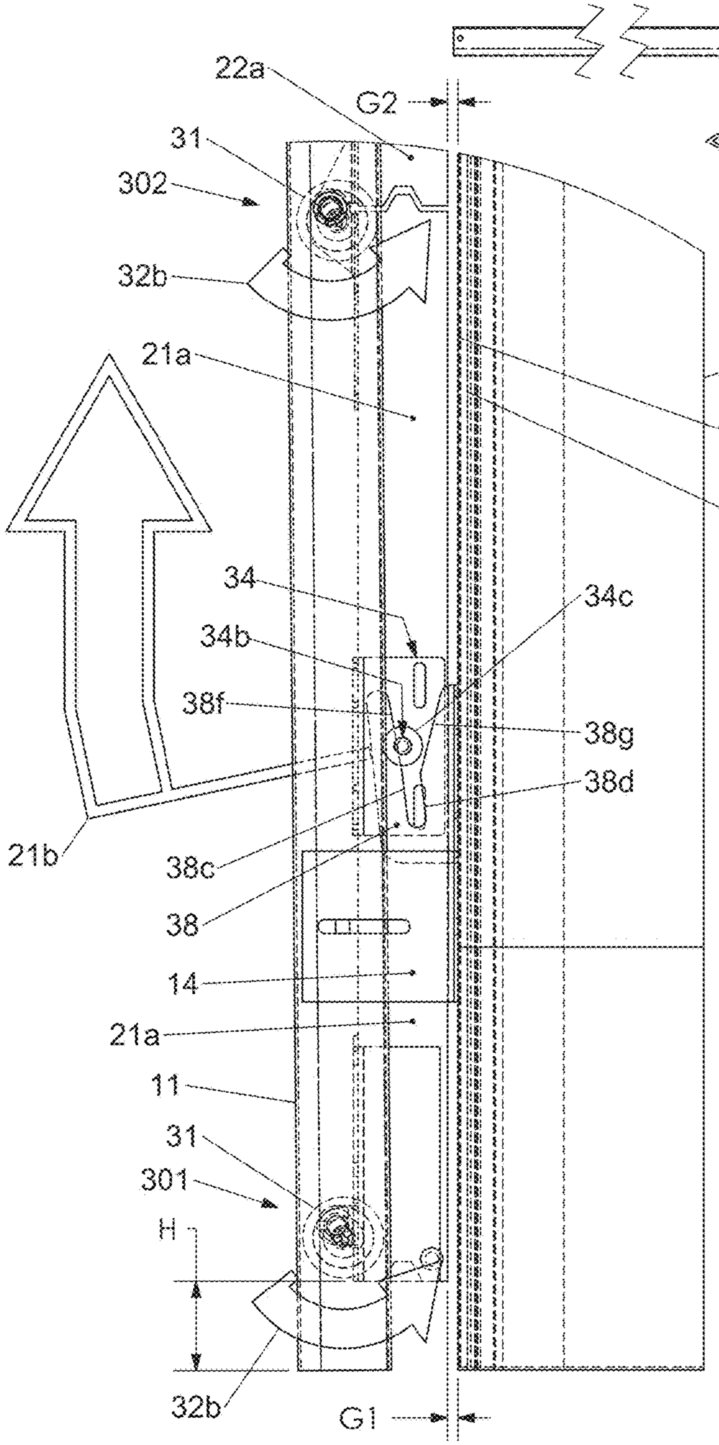
FIG. 13A is a detailed view of the lower portion of FIG. 13.
Figure 13:
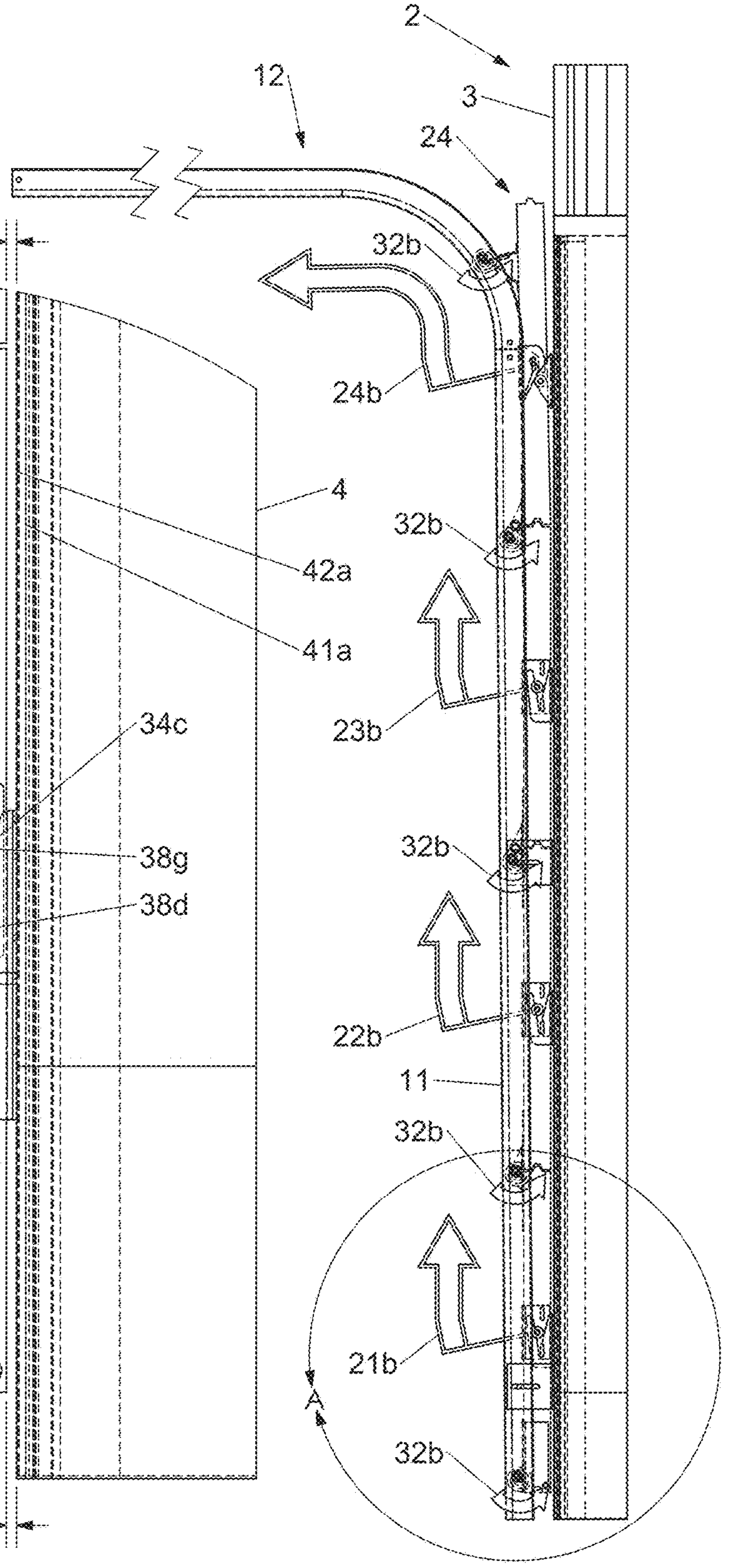
FIG. 13 is a side end view of the garage door system further including direction of motion arrows for overhead garage door initial opening.
Figure 14:
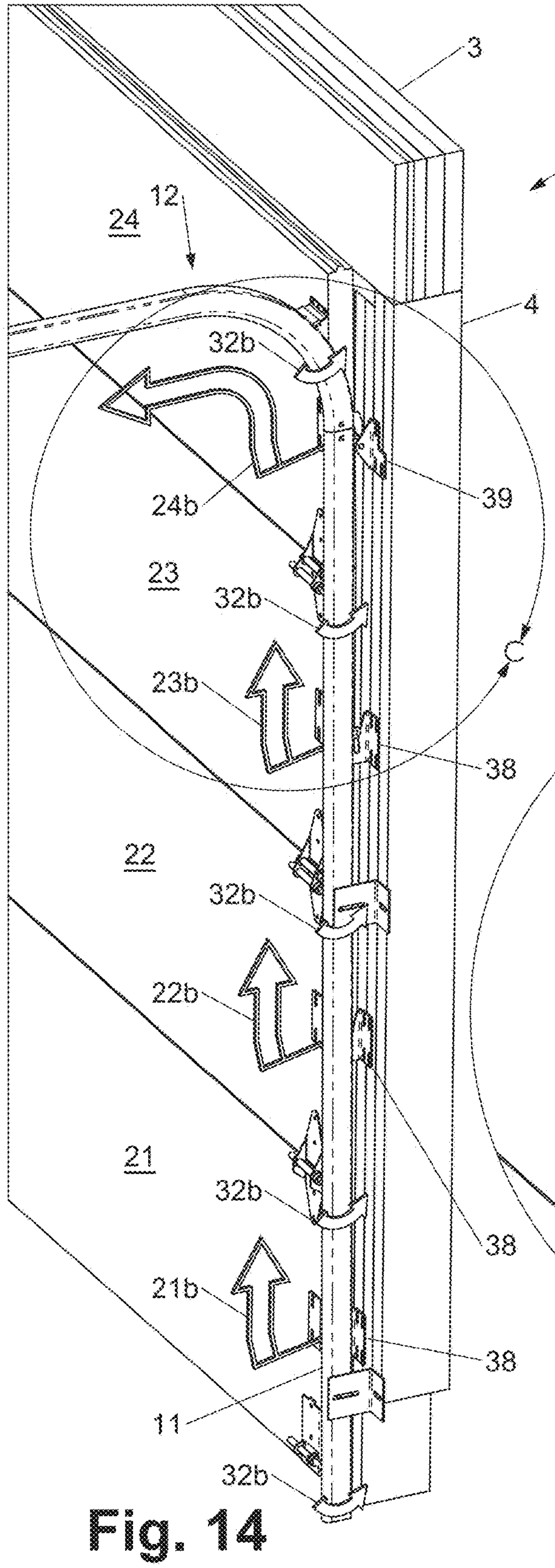
FIG. 14 is a perspective view of the garage door shown in FIG. 13.
Figure 14A:
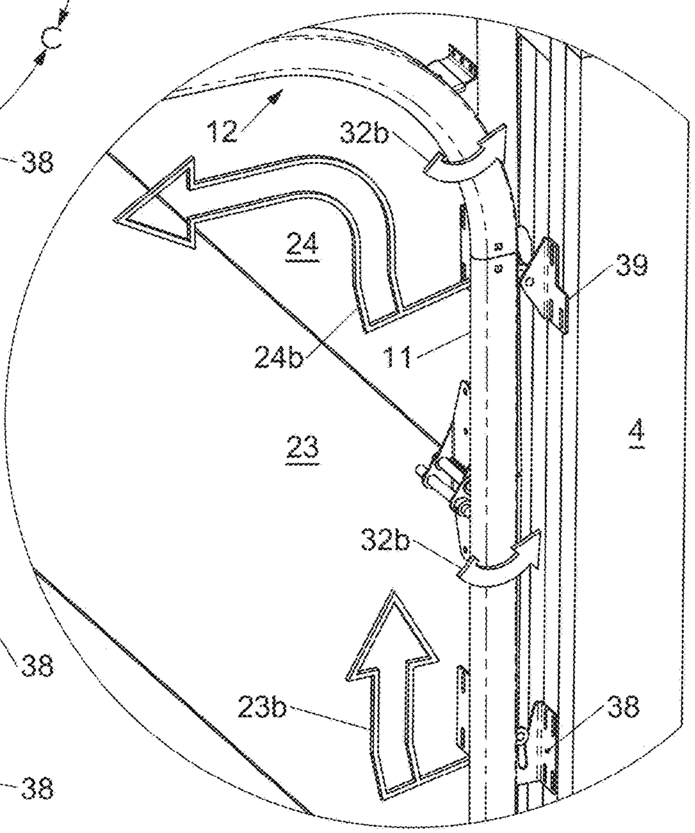
FIG. 14A is a detailed view of the upper portion of FIG. 14.
Figure 15A:
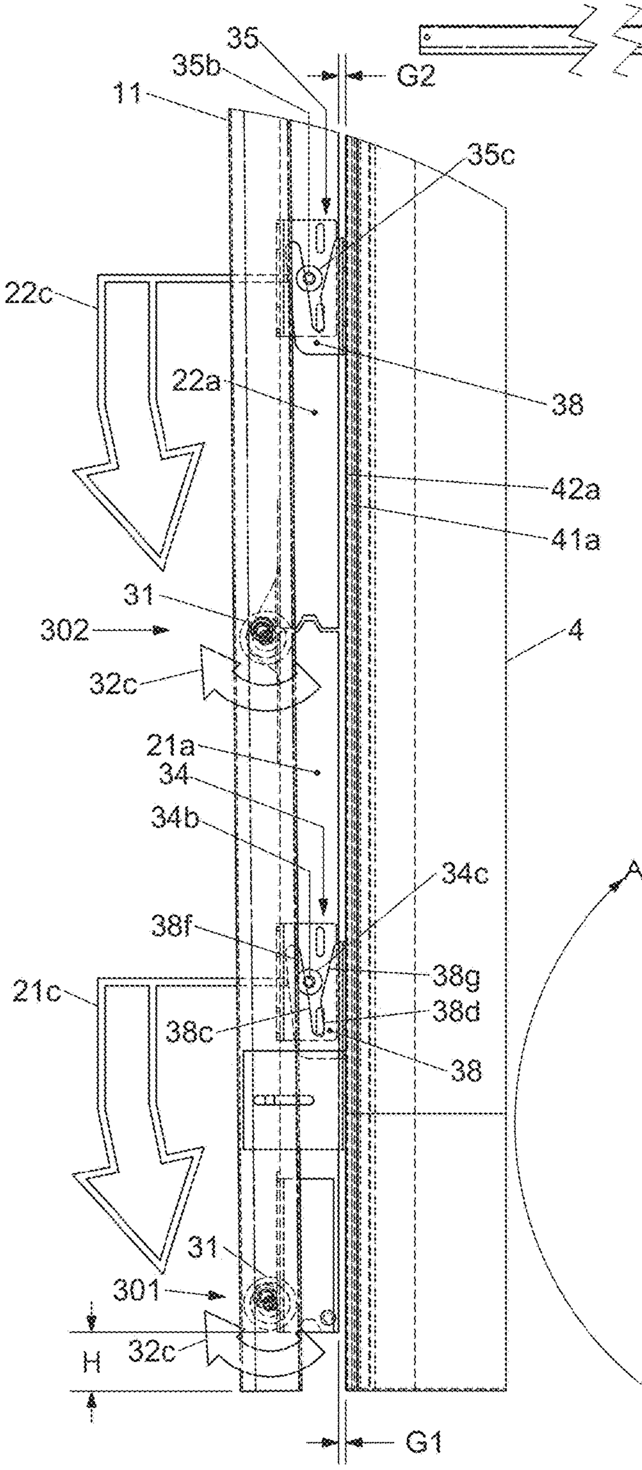
FIG. 15A is a detailed view of the lower portion of FIG. 15.
Figure 15:
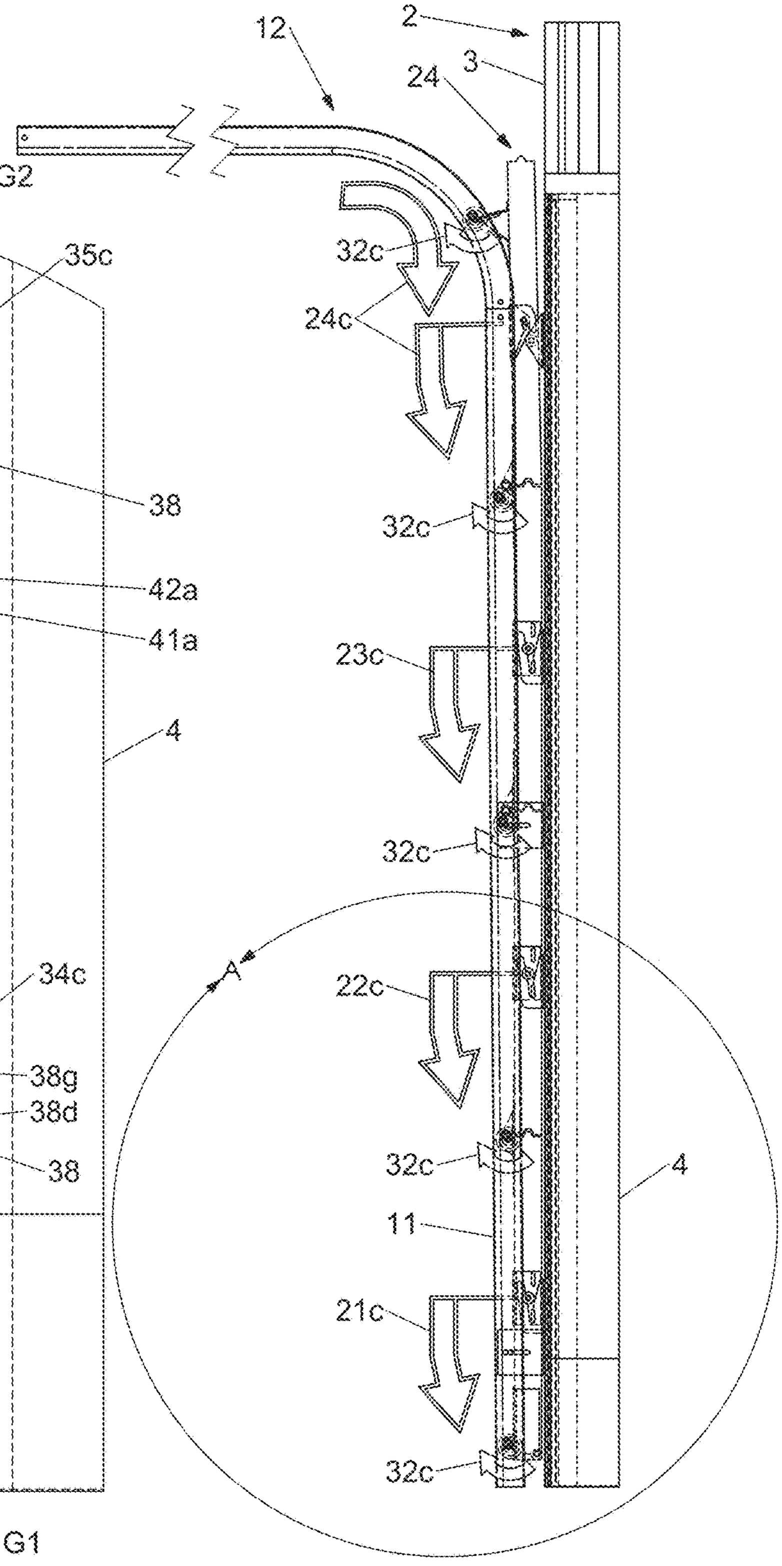
FIG. 15 is a side end view of the garage door further including direction of motion arrows for overhead garage door final closing.
Figure 16:
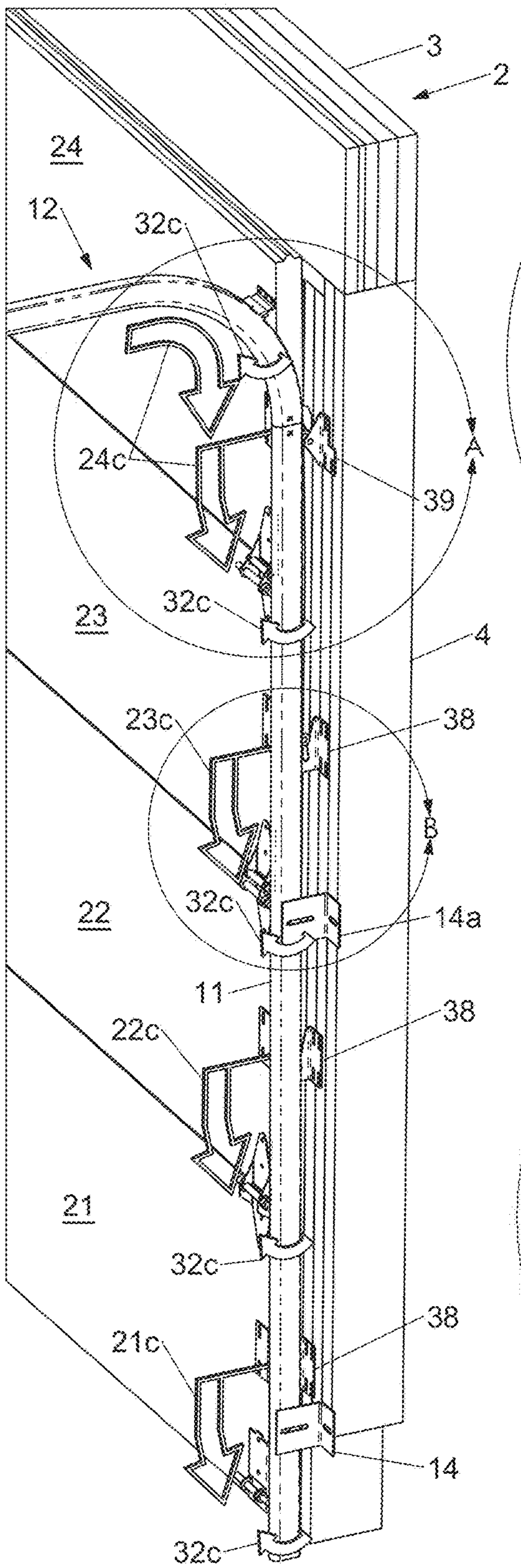
FIG. 16 is a perspective view of the garage door shown in FIG. 15.
Figure 16A:
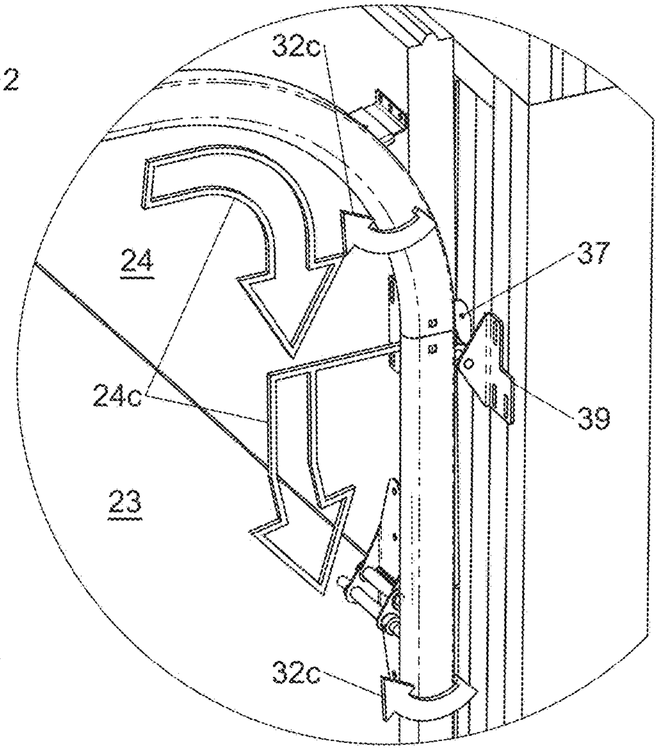
FIG. 16A is a detailed view of the upper portion of FIG. 16.
Figure 16B:
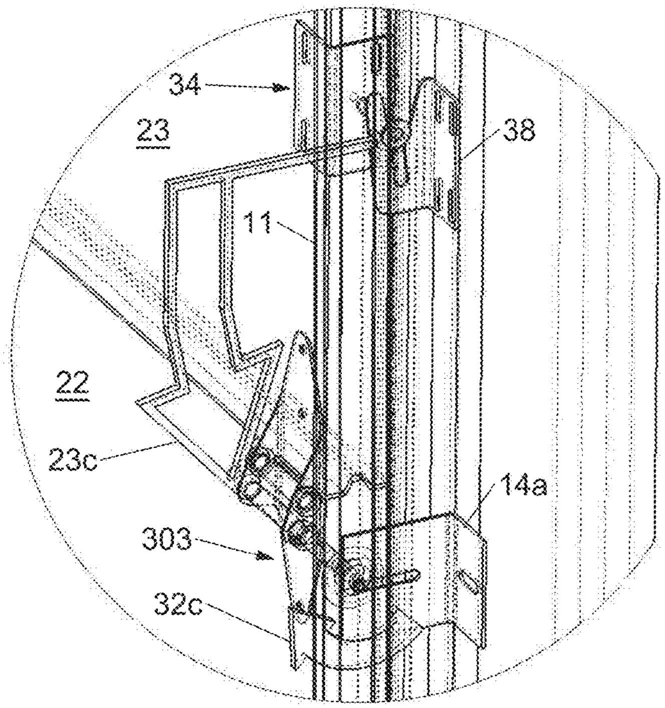
FIG. 16B is a detailed view of the mid portion of FIG. 16.

FIGS. 12, 12A, 12B, 12C show an example of the offset track-wheel and shaft subassembly 30. Offset track-wheel and shaft subassembly 30 includes track-wheel 31 secured or otherwise attached to one end of track-wheel offset support shaft 32. Track-wheel 31 further includes a bearing, roller bearing or ball bearing to provide low friction free rotation of track-wheel 31 relative to track-wheel offset support shaft 32. Use of various types of bearings at track-wheel 31 is generally known within the overhead garage door industry. The offset track-wheel and shaft subassembly 30 includes offset axis 31*a* portion at the track-wheel 31 that is offset with respect to the offset support shaft axis of rotation 32*a* of track-wheel offset support shaft 32. The offset dimension D1 as shown in FIGS. 12A and 12C illustrate the dimensional offset provided, for example in this example, by a mechanical forming process to create the offset in support shaft 32. One in the art would understand that many processes of fabrication can be undertaken to produce the desired and effective degree of offset in support shaft 32, such as welding two separate shafts together (with or without an intermediate joining member) to create a functionally equivalent part, or otherwise for another example, machining a functionally equivalent shape or part form a single piece of material. The axial offset (dimension D1) at track-wheel offset support shaft 32 may be manufactured and produced by various means.

FIG. 12D illustrates the two directions of free rotation of track-wheel axis of rotation 31*a* with respect to offset support shaft axis of rotation 32*a* by the respective arrows offset support shaft of free rotation as door opens 32*b* (first relative example direction) and offset support shaft example direction of free rotation as door closes 32*c* (second relative example direction). The first and second relative example directions 32*b* and 32*c* are referred to within the various illustrated figures at one side of the overhead garage door movable multi-panel assembly 20. It should be understood that the first and second relative example directions 32*b* and 32*c* are reversed at the second side of the overhead garage door movable multi-panel assembly 20 as the first and second directions of rotation will be simply opposite as viewed from or at the opposite sides or lateral left and right views of the door.

FIG. 12E is a detailed view of FIG. 12D showing an offset support shaft axis offset direction reference indicator 32*d*. In the illustrated example the indicator 32*d* is represented by an arrow marked or otherwise materially stamped, for example, at the end surface of track-wheel offset support shaft 32. The purpose of the indicator 32*d* is to not only aid in the disclosure of the present example, but may also be optionally implemented in practice during the manufacturing process to provide and serve as a visual aid to readily identify the true direction of the offset of the track-wheel 31 relative to the track-wheel axis of rotation 31*a*. While it is understood that the indicator 32*d* at the end of each offset track-wheel and shaft subassembly 30 may be typically blocked from view by the vertical track member 11, it is understood that a series of corresponding inspection holes (not shown) may be optionally provided at predetermined locations within the vertical track members 11 and 11' such that effective adjustments to the door system can be made with the door at the closed position. This visual aid indicator is considered potentially helpful to personnel during proper set-up and adjustment processes and procedures during field installations of the overhead garage door improved opening, closing and weather sealing system and method 1 according to the present disclosure.

Although shown and described as having an offset axis wheel assembly (where the wheel axis of rotation is offset from a pivot axis of the support shaft or panel mounting shaft portion), the wheel assemblies may otherwise provide for lateral or outward movement (in a direction generally normal to the direction of the tracks and generally normal to the axis of rotation of the wheels and away from the tracks and thus towards the door structural frame) of the door panel relative to the tracks and wheels (beyond normal "play" of the wheel in the track), while remaining within the spirit and scope of the present disclosure. For example, the shaft of the wheel assemblies may comprise a straight shaft that is movably mounted in a slot of a bracket at the door panel, whereby the shaft may be biased (such as spring-loaded) towards a position in the slot where the panel is spaced from the door structural frame, but may be moved along the slot (against the spring force) when the door panels arrive at the closed position and the guide pins engage the brackets to urge and move the door panels towards the door structural frame. Other means for allowing such directional movement (in a direction generally normal to the direction of the tracks and generally normal to the axis of rotation of the wheels and away from the tracks and thus towards the door structural frame) of the panels relative to the wheels (i.e., in situations where there is play or space between the wheels and side walls of the track, the panel moves outward more than the wheels can move outward in the tracks) may be implemented in accordance with the present disclosure. The additional movement allowed by the wheel assemblies of the present disclosure provides for enhanced clearance of the door panels from the door structural frame during movement of the door, while providing for enhanced sealing of the door panels against the door structural frame when the garage door is fully closed.

As shown in FIGS. 13, 13A, 14 and 14A, as the door movable multi-panel assembly 20 is initially opening, the door frame first panel angled-contact opening surface 38*d* makes contact with the first panel wedge-pin 34*b* of first door panel subassembly 21. This sliding contact applies a resultant inward horizontal force to the central portion of the first door panel subassembly 21 causing the first door panel 21 to be moved slightly away from the inner surface of the door frame jamb 4. The resulting gap between the first and second door panel subassemblies 21 and 22 and the door frame 2 is illustrated by dimensions G1 and G2 in FIG. 13A. Just prior to this, the outer or exterior face of the first door panel 21*a* would have been held in firm and secure contact with the inner face of the door frame jamb 4, further including firm contact with the side weather strip bulb seal 41*a* and side weather strip lip seal 42*a*.

Figure 8C:
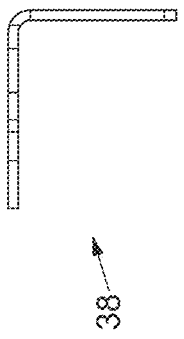
FIG. 8C is a top view of the door-frame-mounted angled-contact bracket shown in FIG. 8.
Figure 8B:
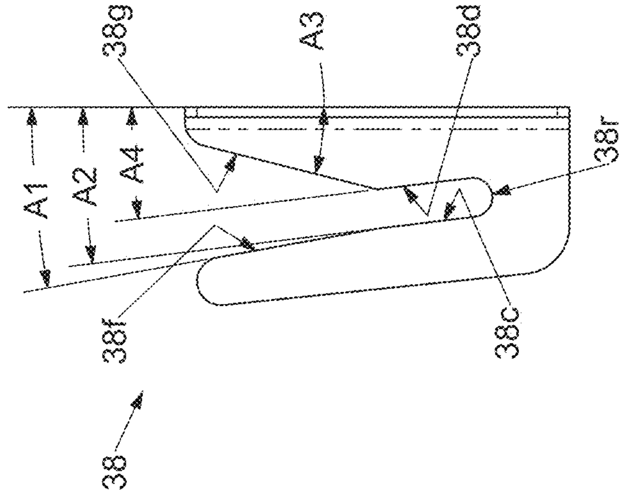
FIG. 8B is a side view of the door-frame-mounted angled-contact bracket shown in FIG. 8.
Figure 8A:
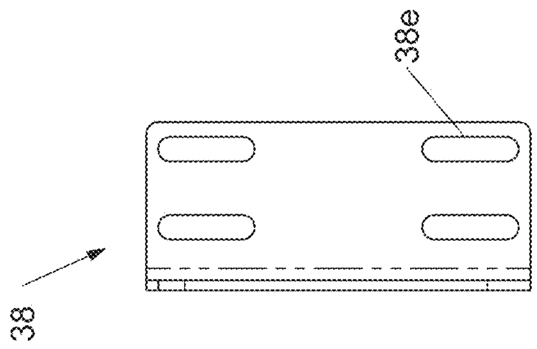
FIG. 8A is a front view of the door-frame-mounted angled-contact bracket shown in FIG. 8.
Figure 8:
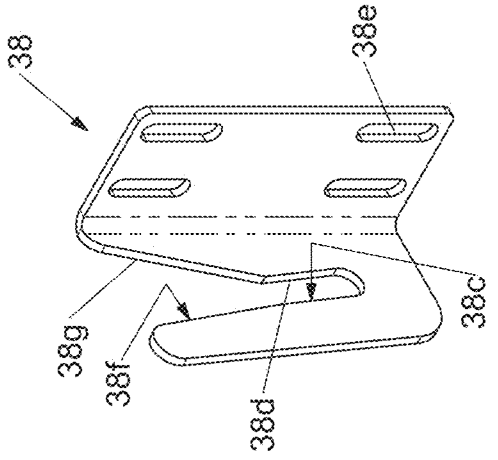
FIG. 8 is a perspective view of a door-frame-mounted angled-contact bracket shown in FIG. 7A.
Figure 9C:
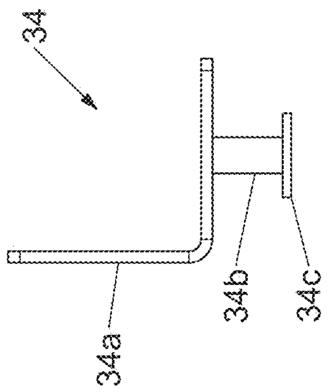
FIG. 9C is a top view of the wedge-pin bracket shown in FIG. 9.
Figure 9B:
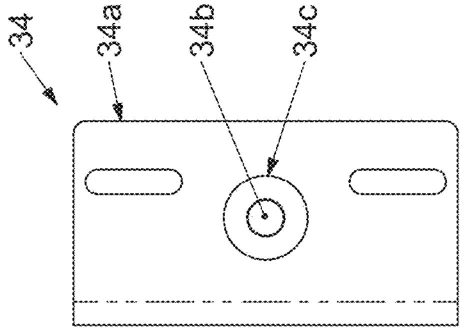
FIG. 9B is a side view of the wedge-pin bracket shown in FIG. 9.
Figure 9A:
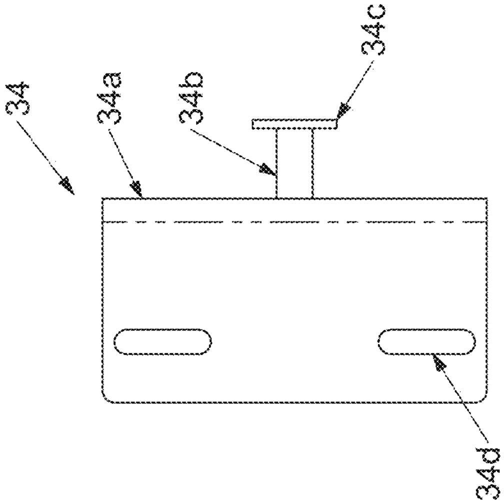
FIG. 9A is a front view of the wedge-pin bracket shown in FIG. 9.
Figure 9:
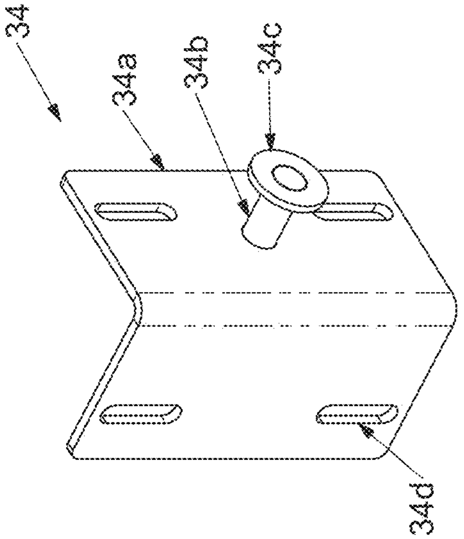
FIG. 9 is a perspective view of a door panel mounted wedge-pin bracket subassembly first best shown in FIG. 3A.

The freedom of movement of the first door panel subassembly 21 is provided by the first and second offset track-wheel and shaft subassemblies 301 and 302 that support the first door panel subassembly within vertical track member 11 and are free to rotate 32*b* about their respective track-wheel axes of rotation 31*a*. Thus, the first door panel subassembly is free to be moved by a limited and generally controlled amount away from the inner face of the door frame jamb 4, and further including the side weather strip bulb seal 41*a* and side weather strip lip seal 42*a*. This degree of freedom is initially controlled by, for example, the first panel angled-contact opening surface 38*d* (as best shown in FIG. 8B) and the corresponding angled surfaces at door frame first, second, third and fourth panel angled-contact brackets 38, and 37*d*. As shown in FIG. 8B, door frame first panel angled-contact bracket 38 includes the following angled surfaces by design; door frame first panel angled-contact closing surface 38*c* corresponds to angle A2; door frame first panel angled-contact opening surface 38*d* corresponds to angle A4; door frame first panel pre-closing guide surface 38*f* corresponds to angle A1; and door frame first panel pre-closing guide surface 38*g* corresponds to angle A3. These angled contact surfaces may be adjusted by design to provide the desired rates of movement or motion characteristics of closing or opening of the garage door panels at the near fully closed position of the overhead garage door movable multi-panel assembly 20. The required angled surfaces also includes various curved surfaces or arcs of various radii to facilitate the desired rates of movement or motion characteristics of closing or opening of the garage door panels.

The controlled door motion and unique operational characteristic while being opened as described above occurs generally simultaneously for all four of the door panel assemblies 21, 22, 23 and 24 at each vertical side of the door assembly as the overhead garage door movable multi-panel assembly 20 is initially moved upward and begins opening. The direction of motion of each or the door panel subassemblies 21, 22, 23 and 24 is represented by door panel subassembly opening direction of motion arrow 21*b*, 22*b*, 23*b*, and 24*b* respectively in FIGS. 13, 13A, 14 and 14A. These arrows illustrate the general direction of motion of the respective door panel assemblies 21, 22, 23 and 24 as well as the general relative direction of rotation of the position of the respective trackwheels 31 (with respect to the door panels) about their respective offset support shaft axes of rotation 32*a* at each instance. As the movable multi-panel assembly 20 continues in an upward opening direction of motion, the door moves free of the door frame 2 without compression force against the weather strip bulb seal(s) 41*a* (41*b* and 41*c*) and weather strip lip seal(s) 42*a* (42*b* and 42*c*).

As shown in FIGS. 15, 15A, 16 and 16A, as the door movable multi-panel assembly 20 is initially closing, the door frame first panel angled-contact opening surface 38*c* makes contact with the first panel wedge-pin 34*b* of first door panel subassembly 21. This sliding contact applies a resultant outward or exterior direction horizontal force to the central portion of the first door panel subassembly 21 causing the first door panel 21 to be moved or translate closer to the inner surface of the door frame jamb 4. The existing gap diminishes between the first and second door panel subassemblies 21 and 22 and the door frame 2 as illustrated by dimensions G1 and G2 in FIG. 15A. Just prior to this action of movement, the outer face of the first door panel 21*a* would have been at a dimensional distance G2 and G1 from the face of the door frame jamb 4, further including a dimensional distance away from or otherwise in light contact with the side weather strip bulb seal 41*a* and side weather strip lip seal 42*a*.

The freedom of movement of the first door panel subassembly 21 is provided by the fact that the first and second offset track-wheel and shaft subassemblies 301 and 302, which support the first door panel subassembly 21 within vertical track member 11, and are free to rotate in direction 32*b* about their respective track-wheel axes of rotation 31*a*. Thus, the first door panel subassembly is free to be moved in a controlled manner closer to the inner face of the door frame jamb 4, further including the side weather strip bulb seal 41*a* and side weather strip lip seal 42*a* by the first panel angled-contact closing surface 38*c* at door frame first panel angled-contact bracket 38.

The controlled door motion and unique operational characteristic while being closed as described above occurs generally simultaneously for all four of the door panel assemblies 21, 22, 23 and 24, and at each vertical side of the door assembly as the overhead garage door movable multi-panel assembly 20 is moved downward and approaches its final closed position. The direction of motion of each of the door panel subassemblies 21, 22, 23 and 24 is represented by door panel subassembly opening direction of motion arrows 21*c*, 22*c*, 23*c*, and 24*c*, respectively, in FIGS. 15, 15A, 16, 16A, and 16B. These arrows illustrate the general direction of motion of the respective door panel assemblies 21, 22, 23 and 24 as well as the general relative direction of rotation of the position of the respective track-wheels 31 (with respect to the door panels) about their respective offset support shaft axes of rotation 32*a* at each instance. As the movable multi-panel assembly 20 continues in a downward closing direction of motion, assembly 20 remains free of the door frame 2 without excess compression force against the weather strip bulb seal(s) 41*a* (41*b* and 41*c*) and weather strip lip seal(s) 42*a* (42*b* and 42*c*).

Figure 17A:
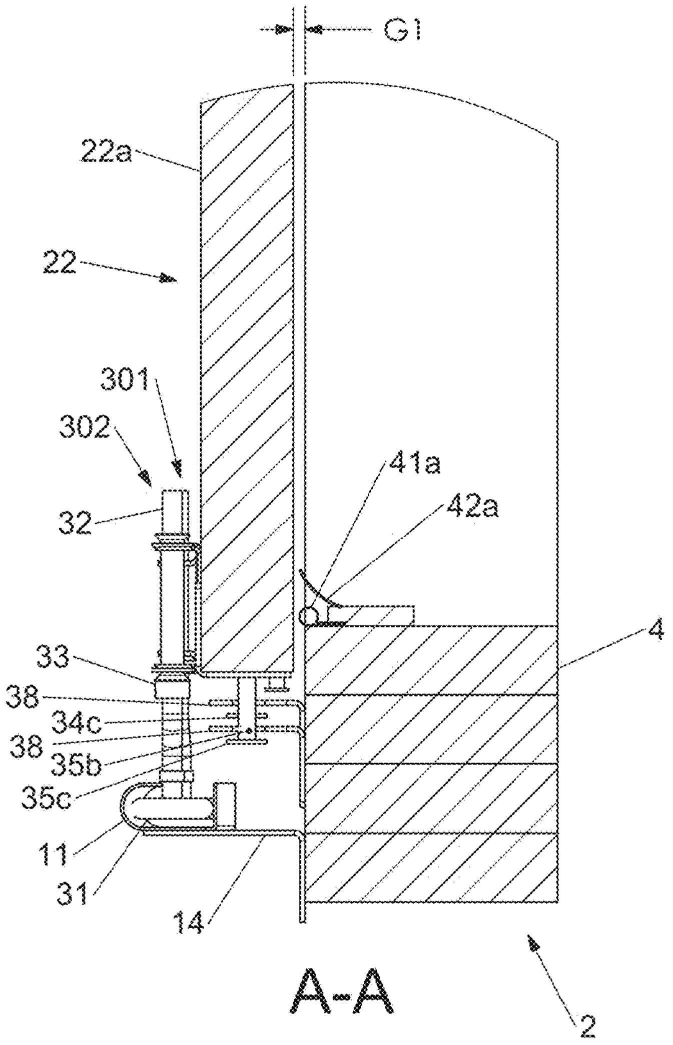
FIG. 17A is a partial cross-sectional view of FIG. 17 taken along the line A-A in FIG. 17.
Figure 17:
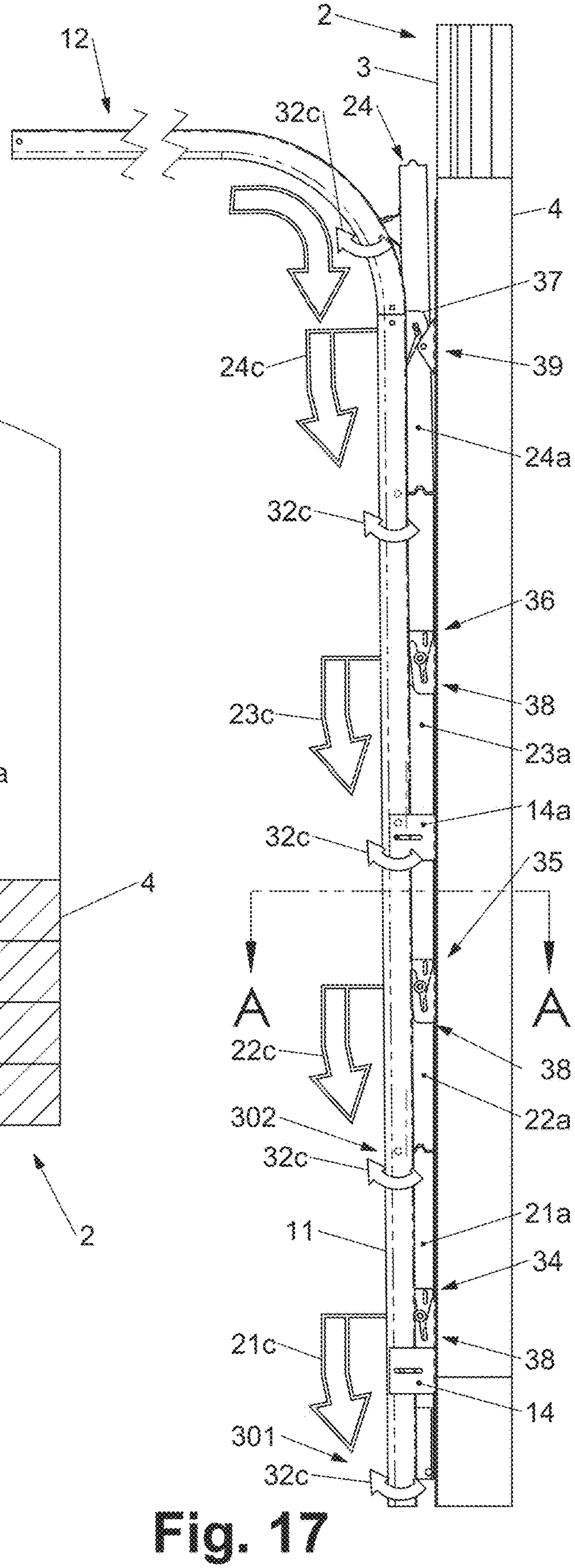
FIG. 17 is a side end view of the garage door further including direction of motion arrows while the door is partially open and near to being fully closed.

FIGS. 17 and 17A shows a side view and cross-sectional view respectively of the overhead garage door improved opening, closing and weather sealing system and method 1 with the door in the partially open closed position. In this case each of the respective door panel subassemblies 21, 22, 23 and 24 are in a dimensional condition of being held away from the door fame 2 by the contact engagement at each of the respective wedge 22 pin bracket subassemblies 38, 39; and angled-contact bracket subassemblies 34, 35, 36 and 37. As shown in FIG. 17A cross-sectional view, door panel subassembly 22, including door panel subassembly 21 just below it, remain at dimension G1 away from the door structural frame 2. Dimension G1 represents a gap between the respective door panel subassemblies and the door structural frame 2. Additionally as shown in FIG. 17A, side weather strip bulb seal 41*a* and side weather strip lip seal 42*a* are generally disengaged from surface contact with respective door panel subassemblies 22 and 21. While the overhead garage door movable multi-panel assembly 20 is either being raised or lowered reduced contact with the door structural frame 2 as well as the side weather strip bulb seal 41*a* and side weather strip lip seal 42*a* occurs. Overhead garage door movable multi-panel assembly 20 is able to generally and loosely remain away from the door structural frame 2 including the door seals by the relative amount of free rotation at each of the offset track-wheel and shaft subassemblies provided by the respective freedoms of rotation at each track-wheel 31 within their tracks and by the offset support shaft axis of rotation 32*a*. As a result, the available clearances at the door seals provide the benefit of reduced friction, wear and tear at the side weather strip bulb seal 41*a* and side weather strip lip seal 42*a*. This benefit also applies to the remaining opposite vertical side of the door, as well as at the top horizontal region of the door, including opposite side weather strip bulb seals 41*b* and lip seals 41*c*, and at top weather strip bulb seal 41*c* and lip seal 42*c*.

Figure 18A:
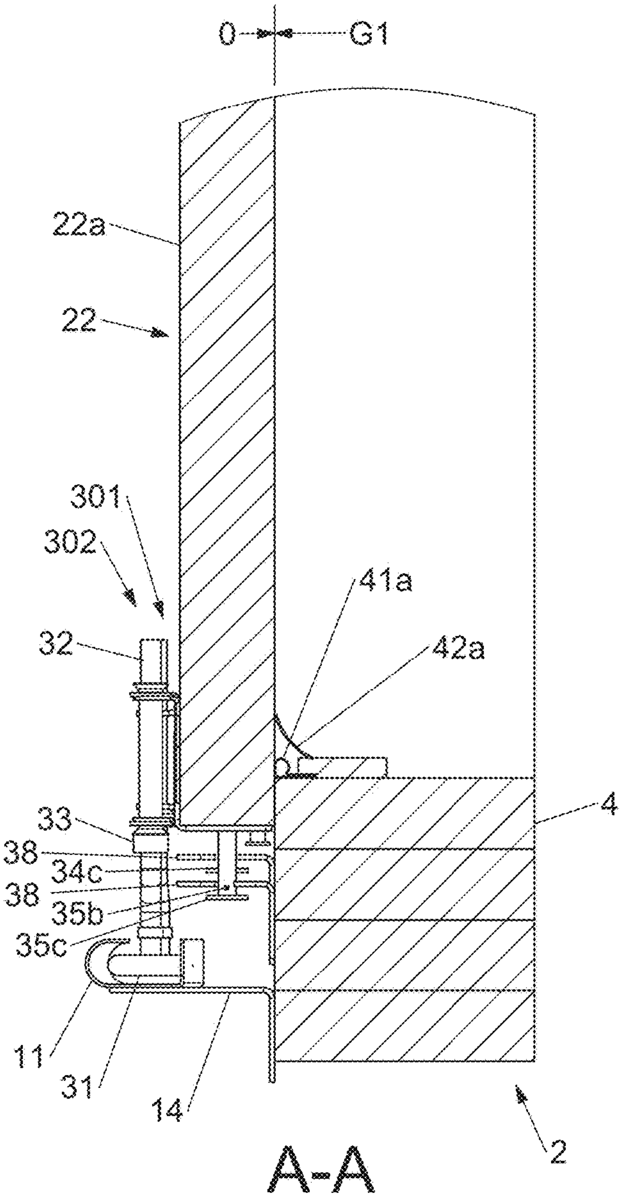
FIG. 18A is a partial cross-sectional view of FIG. 18 taken along the line A-A in FIG. 18.
Figure 18:
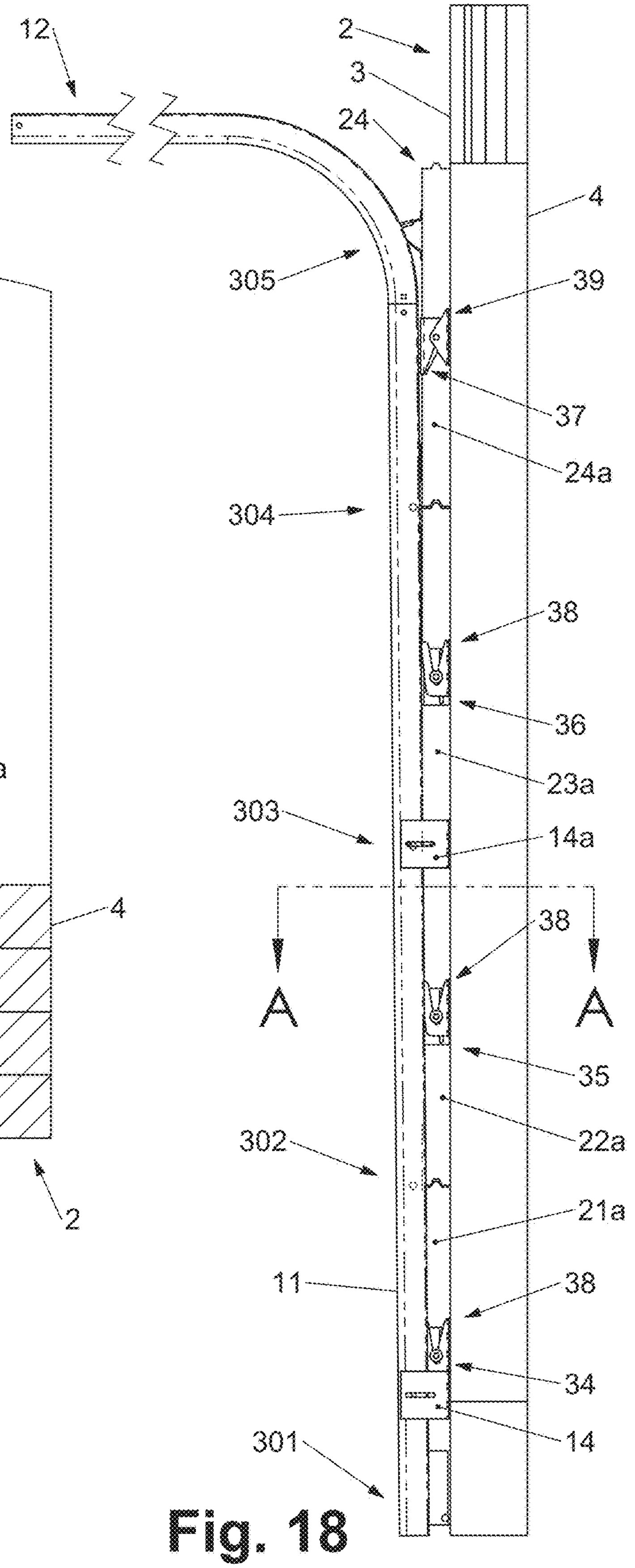
FIG. 18 is a side end view of the garage door with the door at closed position.

FIGS. 18 and 18A shows a side view and cross-sectional view, respectively, of the overhead garage door improved opening, closing and weather sealing system and method 1 with the door in the closed position. In this case each of the respective door panel subassemblies 21, 22, 23 and 24 are in a dimensional condition of being held tightly against the interior surface door frame 2 by contact engagement at each of the respective wedge-pin bracket subassemblies 38, 39; and angled-contact bracket subassemblies 34, 35, 36 and 37. As shown in FIG. 18A cross-sectional view and compared to FIG. 17A, door panel subassembly 22, including door panel subassembly 21 just below it, are both held tightly to the door frame, where gap dimension G1 has been eliminated. Additionally, as shown in FIG. 18A and in comparison to FIG. 17A, side weather strip bulb seal 41*a* and side weather strip lip seal 42*a* are now also in firm contact engagement with and firmly compressed by the exterior faces of the respective door panel subassemblies 22 and 21. In this case, overhead garage door movable multi-panel assembly 20, when closed, is held tightly against the door structural frame 2 including the door weather seals. This tight dimensional fit is provided by the contact engagement at each of the respective wedge-pin bracket subassemblies 38, 39; and angled-contact bracket subassemblies 34, 35, 36 and 37; and the free rotation at each of the offset track-wheel and shaft subassemblies provided by to the respective freedoms of rotation provided by offset support shaft axis of rotation 32*a*.

The tightness and mechanical security of the overhead garage door movable multipanel assembly 20 when it is closed is provided independently of the typical and traditional overhead garage door tracks and structural support system 10, since the door closing and tightness to the door structural frame 2 is provided specifically and substantially by the engagement of the respective wedge-pin bracket subassemblies 38, 39; and angled-contact bracket subassemblies 34, 35, 36 and 37; and the free rotation at each of the offset track-wheel and shaft subassemblies.

This point can be best illustrated by imagining that when the door is fully closed and fully engaged at the respective wedge-pin bracket subassemblies 38, 39; and angled-contact bracket subassemblies 34, 35, 36 and 37, it would then be possible simply for demonstration purposes and to better illustrate the effectiveness of the present disclosure to completely disassemble and remove the door tracks 11 and 12 (11' and 12') and further including each of the offset track-wheel and shaft subassemblies 301, 302, 303, 304, and 305 (including 301', 302', 303', 304', and 305') without causing any disruption to the weather tightness, structural integrity and security of the garage door itself. External forces applied at the exterior surfaces of the garage door movable multi-panel assembly are transferred directly through the panels, into the respective wedge-pin bracket subassemblies 38, 39; and angled-contact bracket subassemblies 34, 35, 36 and 37 where the structural load-path forces are then distributed directly into the door structural frame 2. This occurs independently of the typical overhead garage door tracks and structural support system 10, thus providing significant advantages related to increased structural strength and integrity of the garage door system while it is in the closed position.

Figure 19:
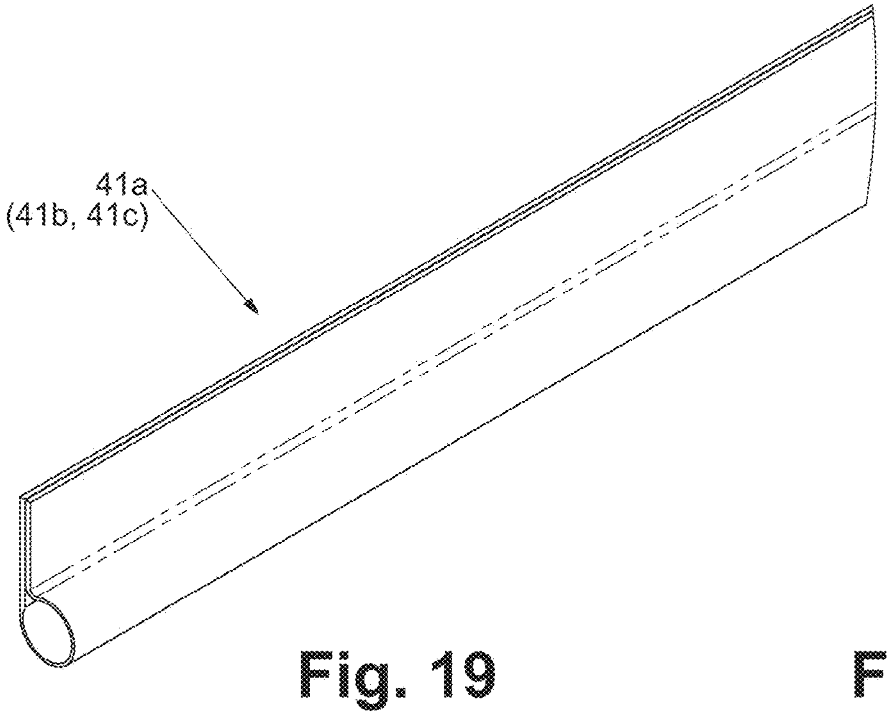
FIGS. 19 and 19A are example illustrations of commercially available weather strip bulb seal material.
Figure 19A:
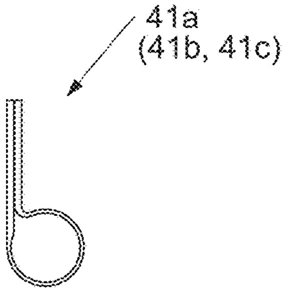

FIGS. 19 and 19A represent examples of side and top weather strip bulb seals 41*a*, 41*b* and 41*c* which in this example are a commercially available weather strip bulb seal material made of flexible weather resistant polymer plastic. Closed-cell flexible urethane foam may be used to optionally fill the interior opening of the bulb-portion of the seal.

Figure 20:
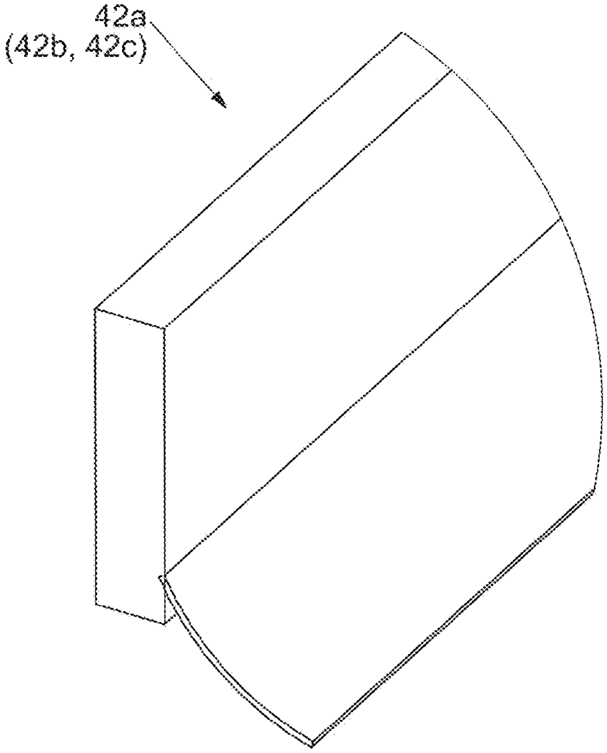
FIGS. 20 and 20A are example illustrations of commercially available weather strip lip seal material.
Figure 20A:
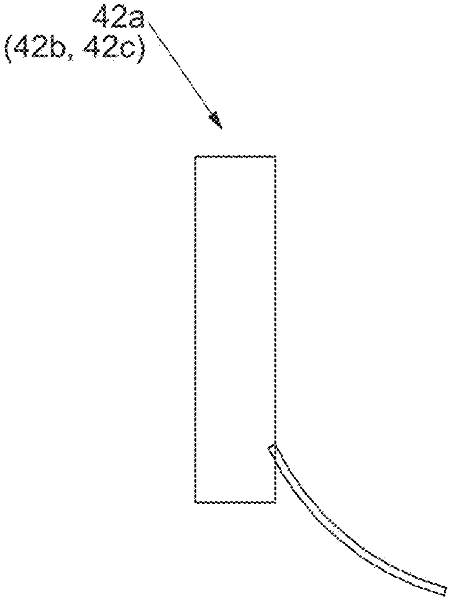

FIGS. 20 and 20A represent examples of side weather strip lip seal 42*a*, 42*b*, and 42*c* is made of both a rigid plastic rectangular base in cross-section and a molded-in and highly flexible polymer weather strip lip.

Figure 20B:
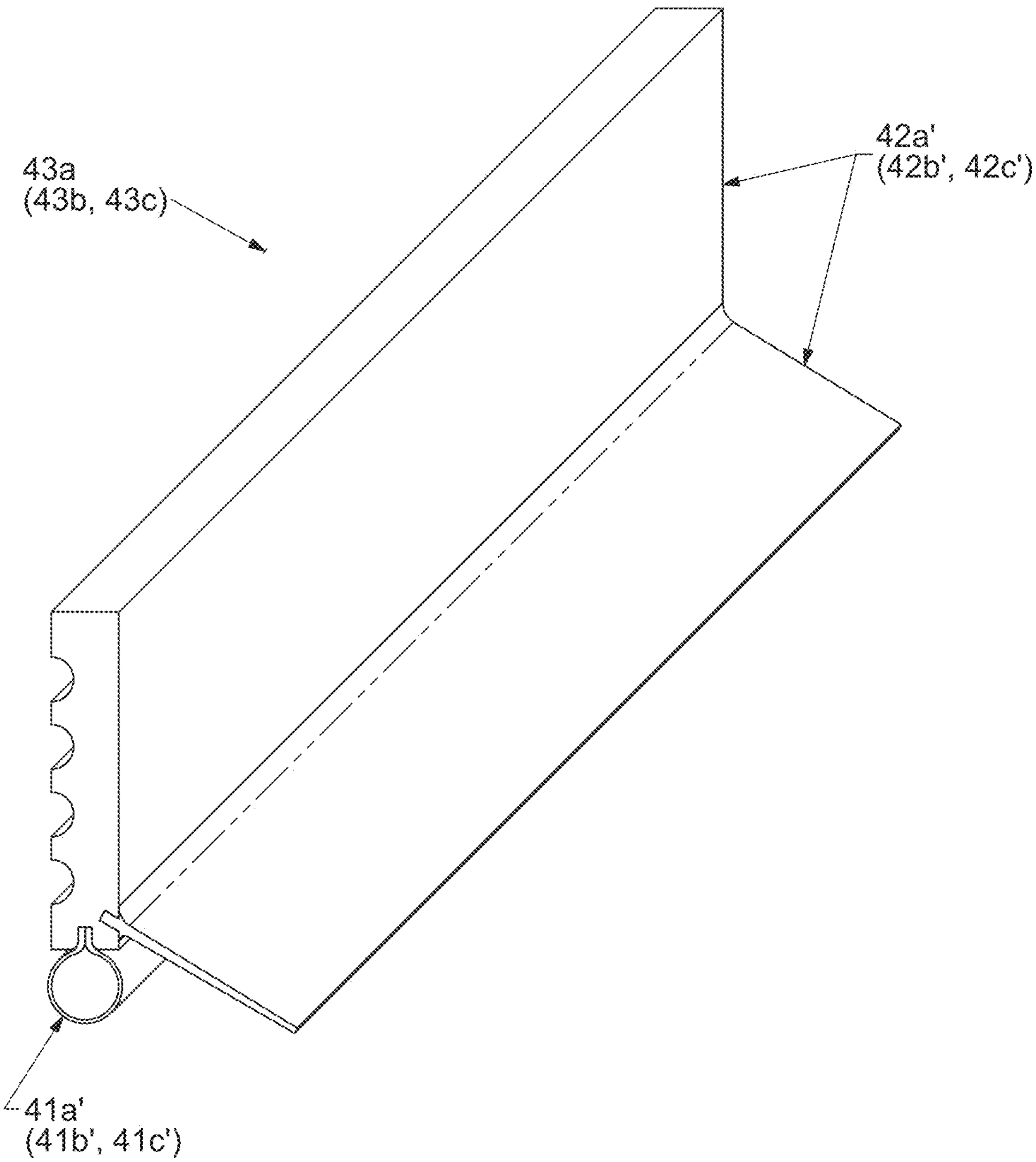
FIG. 20B show a perspective view of a combined-element one-piece multi-function proprietary weather seal design or assembly.

Optionally and preferably within the scope of the present disclosure, as shown in FIG. 20B, a custom designed and manufactured one-piece seal arrangement that combines the features of both of the presently available commercial seals and materials may be developed and incorporated to enhance the form, function and benefits of the present disclosure herein described. Weather strip rigid base portion including highly flexible or semi-flexible lip seals 42*a'*, 42*b'* and 42*c'* and weather strip bulb seals 41*a'*, 41*b'*, and 41*c'* are shown by example to become combined into a 1-piece dual-purpose weather seal 43*a*, 43*b*, and 43*c* respectively, encompassed by proprietary design and manufacture. This seal arrangement provides the same advantages of double-sealing of the door panels to the structure of the door frame as with the 2-piece weather seal shown in FIGS. 19, 19A, 20, and 20A, thus combining the flexible outer lip seal with the inner bulb compression seal. The added advantage of this one-piece design includes providing the increased benefits of ease of initial installation, ease of weather seal final adjustments with respect to the door panels, reduced number of necessary components, and an overall total cost reduction in manufacturing and inventory handling requirements as it relates to the present disclosure.

Additionally, when sufficient dimensional clearance is optionally provided, that the side and top weather strip bulb seals 41*a*, 41*b* and 41*c* or other types of compressible foam or elastomeric weather seal materials may be optionally located or disposed for compression and effective weather sealing between the opposing exterior faces of the door panels 21*a*, 22*a*, 23*a*, and 24*a*, and the interior face or surface of the door jambs 4 and 4' including the interior face or surface of door frame header 3. Attachment of the side and top weather strip bulb seals 41*a*, 41*b* and 41*c* or other types of compressible foam or elastomeric weather seal materials may be provided for at one of either the exterior faces of the door panels 21*a*, 22*a*, 23*a*, and 24*a*, and the interior face or surface of the door jambs 4 and 4' including the interior face or surface of door frame header 3. Thus, alternate styles or optional locations of the weather strip bulb seals 41*a*, 41*b* and 41*c*, and further including weather strip lip seals 42*a*, 42*b*, and 42*c*, may be foreseeably utilized. Alternately and, optionally, it is understood that a combined-element one-piece multi-function proprietary weather seal design assembly is anticipated without significantly affecting the scope and disclosure of the present disclosure.

Furthermore, as best shown in FIGS. 17A and 18A, many available overhead garage door systems include an area of dimensional overlap, as shown by example, between the second door panel 22*a* and door frame jamb 4. This dimensional overlap is representative of the overlap provided at each of the remaining door panels and at both vertical sides of the movable multi-panel assembly 20 as shown in FIG. 2.

Optionally, many commercially available residential overhead garage door systems greatly reduce, and in some instances entirely eliminate, the corresponding dimensional overlap at these locations. In these instances it is foreseeable that alternate styles or optional locations and of the weather strip bulb seals 41*a*, 41*b* and 41*c*, and further including weather strip lip seals 42*a*, 42*b*, and 42*c*, are anticipated without significantly affecting the scope and disclosure of the present disclosure.

Figures 21, 21A:
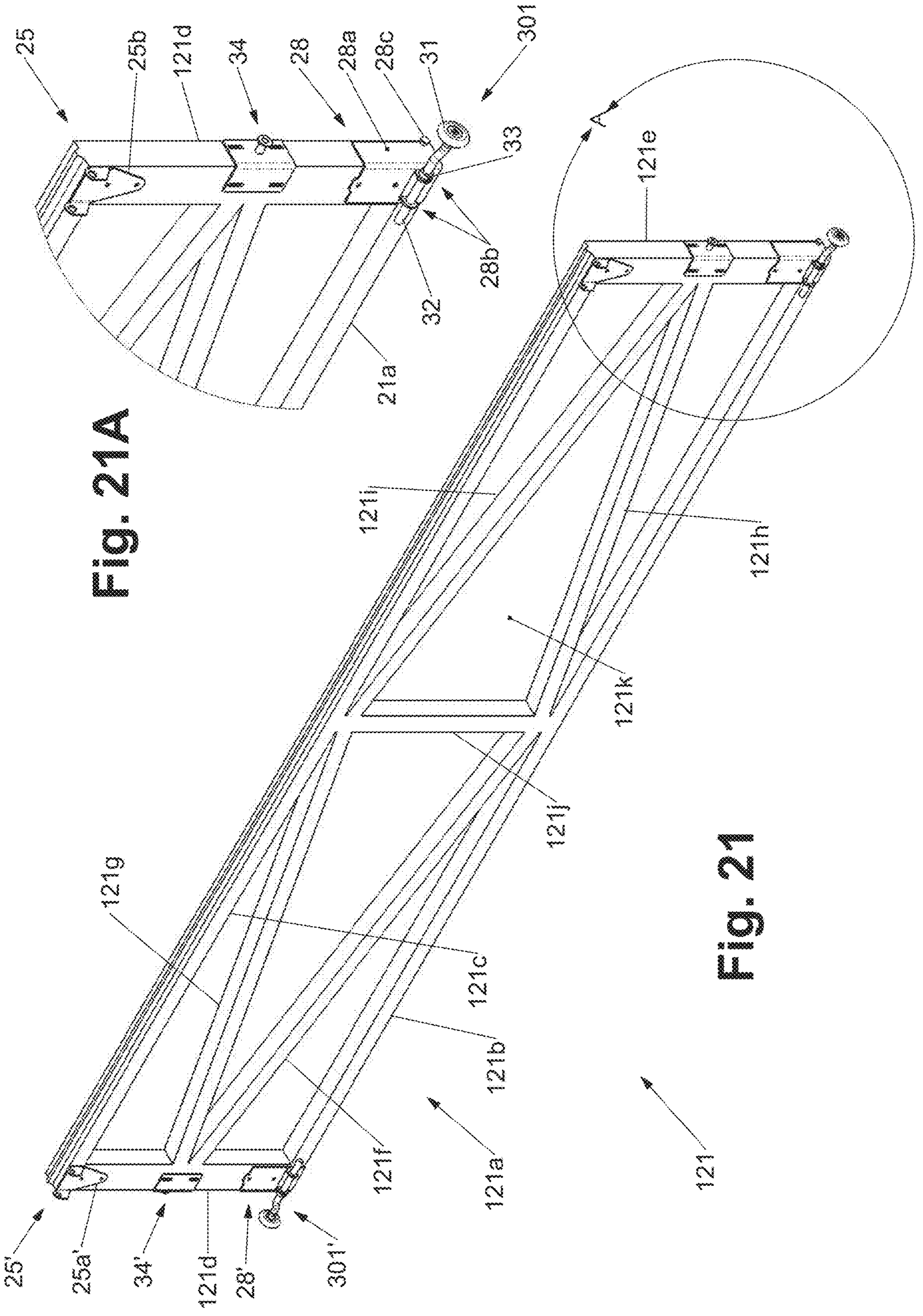
FIG. 21 shows a perspective view of an example of a non-insulated structural door panel assembly similar to that shown in FIG. 3.
FIG. 21A shows a detail view of the example of a non-insulated structural door panel assembly of FIG. 21.

FIG. 21 shows a perspective view of an example of a non-insulated structural door panel assembly similar to that shown in FIG. 3. In this example, the first door panel non-insulated structural subassembly 121 includes structural members without insulation as may be preferred in some garage door applications. first non-insulated structural door panel 121*a* is generally includes lower horizontal structural door panel member 121*b*, upper horizontal structural door panel member 121*c*, first vertical side structural door panel member 121*d*, and second vertical side structural door panel member 121*e*. At the central portion of first non-insulated structural door panel 121*a* additional structural members are provided to significantly increase the structural integrity of the door panel 121*a*. These additional structural members include first diagonal structural door panel member 121*f*, second diagonal structural door panel member 121*g*, third diagonal structural door panel member 121*h*, forth diagonal structural door panel member 121*i*, and center vertical structural door panel member 121*j*. Finally, the exterior structural door panel covering 121*k* provides a suitable outer covering or weather barrier as well as a final structural member or skin at the outer surface of the door panel assembly.

As shown in FIGS. 21 and 21A the overall details and various components remain generally identical to those previously shown and described according to FIGS. 1 through 20A.

Figures 22, 22A:
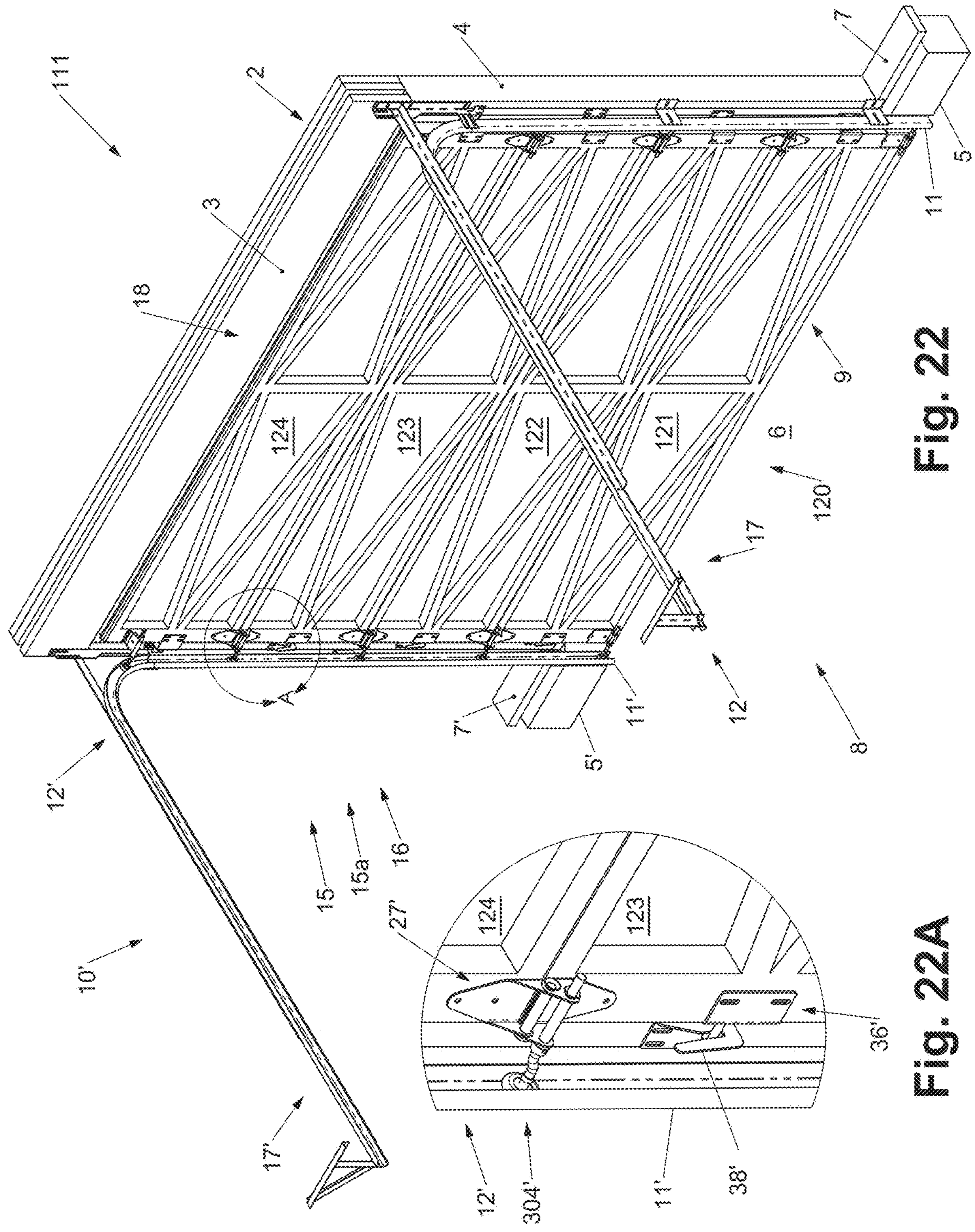
FIG. 22 is a three-quarter inside upper perspective view of a typical overhead garage door system in accordance with one example of the present disclosure, similar to FIG. 1, having non-insulated structural door panel assemblies.
FIG. 22A is a detailed view of a portion of the three-quarter inside perspective view of FIG. 22.
Figures 23, 23A:
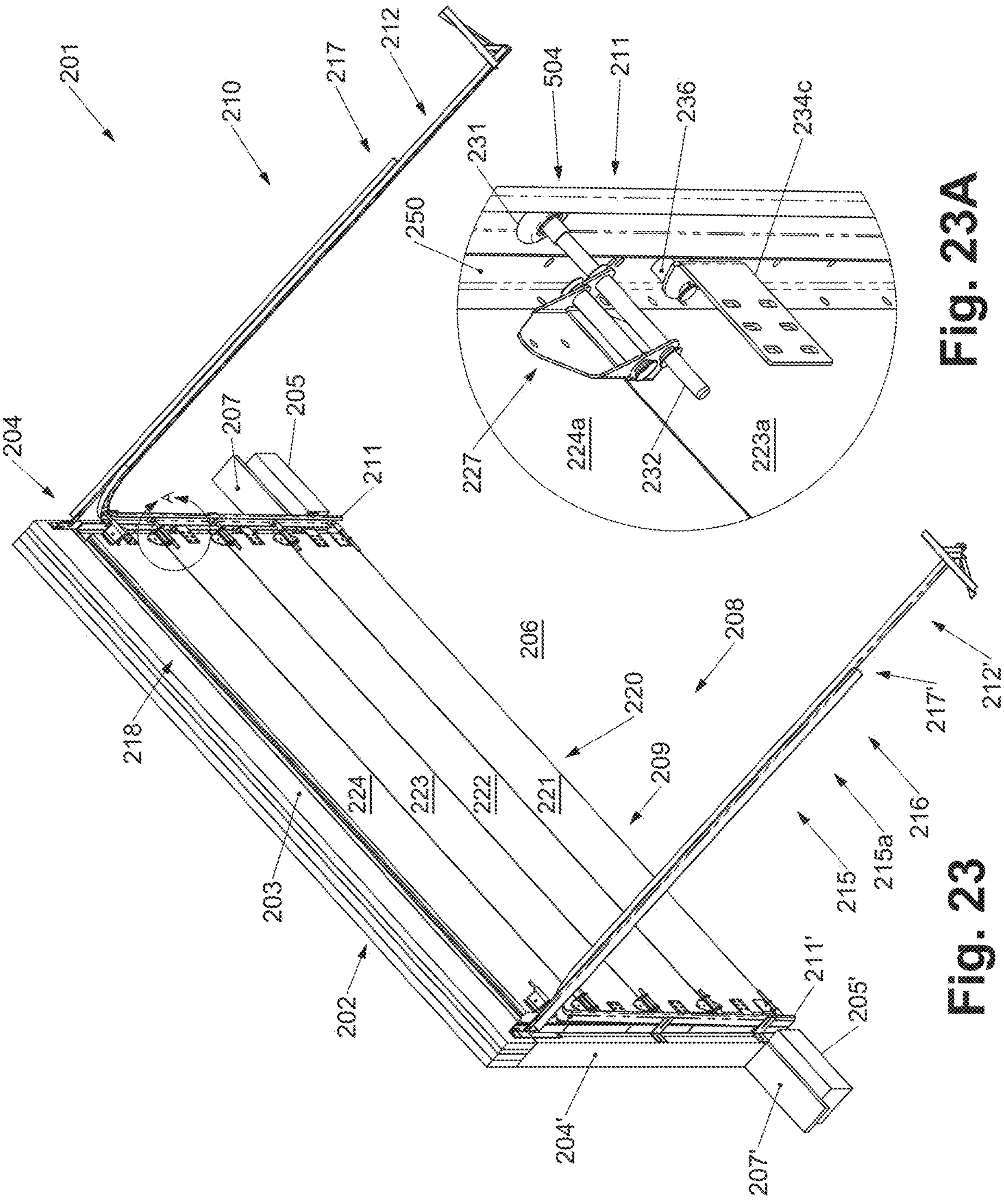
FIG. 23 is a three-quarter inside upper perspective view of a typical overhead garage door system in accordance with another example of the present disclosure.
FIG. 23A is a detailed view of a portion of the three-quarter inside perspective view of FIG. 23.

FIG. 22 shows an illustrated example of the present disclosure generally shows how the present disclosure can provide significant improvements in building structural strength and total load carrying capability of an overhead garage door system 111. For example, in the event of excessive forces and loads applied to the garage door and building structure by high winds, storms, hurricanes, tornados, seismic earthquake activity and the like, structural loads and deflections can be more effectively carried or transferred from the door frame structure 2 and door frame jambs 4 and 4' across the door opening 8 by the overhead garage door movable non-insulated structural multi-panel assembly 120 itself. This is made possible by the secure engagement (when the overhead door is fully closed) of the various panel wedge-pin bracket subassembly 34, 35, 36 and 39 and the angled-contact brackets 37, 38 as well as the ability of the door panel assemblies themselves 21, 22, 23 and 24 to efficiently transfer and carry structural door frame load forces across the door opening. The relative close proximity and arrangement of the various components herein described in the present disclosure helps to provide structural load paths that are as relatively short and efficient as possible through the various members and components of the overhead garage door system.

As shown in FIGS. 22 and 22A the overall details and various components remain generally identical to those previously shown and described according to the above description and corresponding FIGS. 1 through 20A.

It is understood that for the purposes of this illustration the various types of fastening hardware, such as wood screws, lag bolts, hex-head threaded cap screws, threaded hex nuts, and flat washers and the like, are not shown within the example illustrations for the sake of improved clarity of the subject matter. However, it should be understood that these and other various types of fasteners connect and structurally secure the various components related to this disclosure.

Additional components typical of an overhead garage door tracks and structural support system 10 further include matching opposite pairs or sets of components for left and right sides of the door including horizontal track assembly 12 includes horizontal track member 12*a*, horizontal track curved portion 12*b*, and horizontal track support member 12*c* all attached and securely fastened to the door structural frame 2 at track member door frame header support bracket 13. The distal end portions of horizontal track member 12*a* are typically and further supported by horizontal track overhead support bracket 12*d* commonly secured, for example, to a ceiling surface or other overhead structural member within the interior of a building such that the entire horizontal track assembly is capable of securely supporting the total weight of the overhead garage door movable multi-panel assembly 20 when it is raised to the fully open position along the tracks 11 and 12*a*.

Structural walls may be constructed in a variety of ways using a wide variety of different materials and methods of construction such that a discussion and the details of the types of construction are understood to widely vary, and as such, additional descriptions of construction techniques will be set aside for the purposes of this disclosure. In the illustrated example therein, the structural door frame 2 generally includes wood frame members commonly found in many types of buildings, walls, and doorways constructions. In this example the structural door frame 2 generally includes a foundation wall 5 resting upon a floor surface 6, which may be commonly constructed of concrete. Structural wall sill plate 7 is securely fastened to foundation wall 5 which provides support and attachment to the vertical door frame jambs 4 and horizontal door frame header 3. Thus, the general construction arrangement defines the basic garage door opening 8, which typically includes threshold or door sill 9 that is generally a surface in common or otherwise a sub-portion of floor surface 6.

For the sake of clarity of the illustrations and focus on the subject examples of the present disclosure, a number components and operating systems used in overhead garage door systems have been omitted within the examples shown, such as an overhead garage door motorized automated opening and closing mechanized system (not shown); an overhead garage door latching and/or keyed locking system (not shown); overhead garage door mechanical counterbalance system (not shown); overhead garage door counterbalance extension springs (not shown); overhead garage door counterbalance torsional springs (not shown); overhead garage door counterbalance support cables and cable support pulley systems (not shown). Also absent from the illustrations and examples for the sake of clarity is a first panel bottom door sill weather seal (not shown) attached at the bottom-most portion of the lower door panel for sealing and contact at the surface of the door sill 9 or floor 6. Additionally not shown, are weather strip seals between at the horizontal edges of adjacent door panel assemblies (not shown). Accordingly, one in the art would understand that providing generally flexible weather seal materials or weather strips attached or otherwise fixed to one or the other surfaces between the respective upper and lower horizontal edges between the respective door panels to promote weather tightness and reduce air leaks. These types of various components and related common material example aspects of overhead garage doors are typically known to the industry and for the purposes intent and scope of this disclosure may or may not be optionally included with the present disclosure. Generally, these types of various and related common material example aspects are anticipated to have relatively limited or otherwise minimal effect with respect to the identified function, purpose and benefits of the present disclosure as it is presently described herein.

Door panels 21, 22, 23, and 24 may be constructed of various materials including, for example, framed panel sections with attached surface panels or insulated panels includes foam insulation encapsulated within formed sheet metal outer portions to form a structural insulated panel of considerable strength. Structural insulated panel thicknesses may typically vary up to 3 inches of thickness for higher R-value insulating garage door panels while various panels and designs may further include windows and other decorative design features. These types and varieties of design aspects are known and widely used methods of construction within the garage door industry. Within this example of the present disclosure the illustrated panels represented have 2 inches of thickness (approximately 50 mm) structural insulated panels with foam insulation having a sheet metal exterior approximately at all sides. Each of the door panel subassemblies 21, 22, 23, and 24 are pivotally joined in at least two locations (right and left sides) by the respective series of first, second, and third pivotal hinge assemblies 25, 26, and 27 attached respectively at the upper and lower horizontal edges of each door panel 21*a*, 22*a*, 23*a*, and 24*a*.

The door opening system of the present disclosure is suitable for use with any and all sectional door thicknesses (such as, for example, 1⅜ inch, 1¾ inch, 2 inch, 3 inch and/or the like), and for use with insulated or non-insulated sectional doors comprising any materials (such as, for example, steel, aluminum, wood, fiberglass, and/or the like). The door opening system of the present disclosure is suitable for any type of sectional doors, including residential and industrial sectional doors, which may comprise more or less than four sectional door panels, depending on the particular application of the door, and the door panels may comprise any width or height, without affecting the scope of the present disclosure.

Figure 28B:
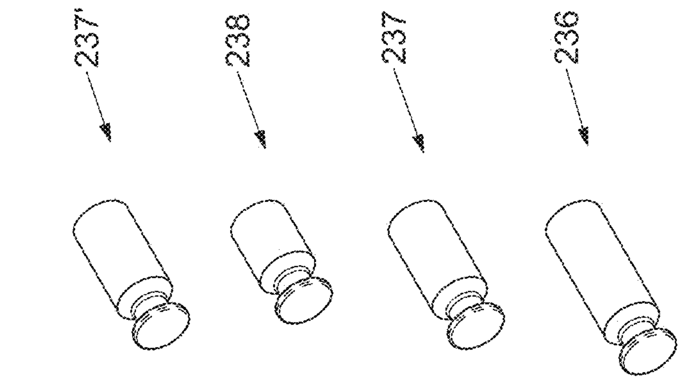
FIG. 28B is a second detailed perspective view of the shoulder bolts shown in FIG. 28.
Figure 28A:
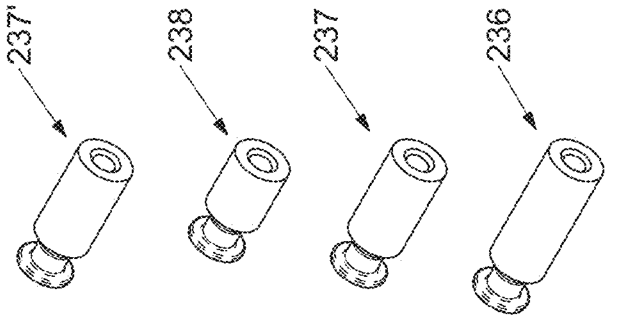
FIG. 28A is a first detailed perspective view of the shoulder bolts shown in FIG. 28.
Figure 28:
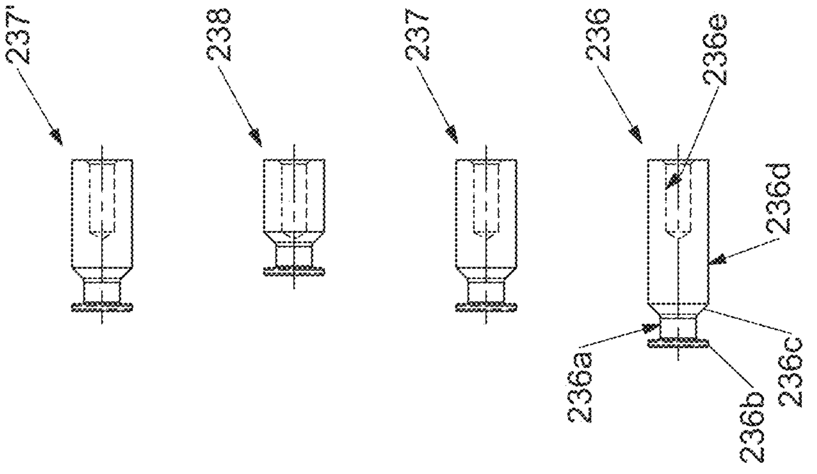
FIG. 28 is a detailed front comparison view of the shoulder bolts shown in FIG. 24.

Referring now to another set of drawings and further illustrative examples depicted as an alternate design therein, an overhead garage door improved opening, closing and weather sealing system 201, as shown in FIGS. 23 through 31A, is generally constructed in a door structural frame 202 within a structural wall of a garage or building. In similar fashion to the previous example, overhead garage door system 201 includes an arrangement of first, second, third and fourth door panel subassemblies 221, 222, 223, and 224, respectively, that are each linked together by a series of pivotal hinge assemblies 225, 226, 227 to form a hinged multi-panel assembly 220 capable of following a track 212 of an overhead door system. The garage door includes a door moving or door sealing assembly that functions to move the door panels towards and against the door structural frame when the garage door is closed. For example, the first, second, third and 4th panels 221, 222, 223 and 224 each include a wedge bracket plate 234*a*, 234*b*, 234*c* and 234*d* respectively for engagement with their respective first, second, third and fourth panel shoulder bolts 236, 237, 238 and 237' as generally best shown in FIGS. 29 and 29A. Each of the panel shoulder bolts are fastened to a reverse angle bracket 250 by a series of threaded fasteners (not shown) extending through a series of holes at the reverse angle bracket wide face 250. The reverse angle narrow face 250*b* is securely attached to the door frame jam 204 by a series of lag bolts or screws (not shown) through a series of holes at the reverse angle bracket narrow face 250*b*. The panel shoulder bolts 236, 237, 238 and 237' are comprised of selected varied lengths as shown in FIGS. 28, 28A and 28B for engaging respective door panel wedge bracket plates 234*a*, 234*b*, 234*c* and 234*d*. The panel wedge bracket plates are offset at each of the door panels to provide both the necessary clearances and engagements with the shoulder bolts when the overhead garage door movable multi-panel assembly 220 is either raised or lowered. Therefore, while very similar to the previous example earlier described, this example represents a "reversed version" of the previous example where the effective placement of respective "wedge brackets" and "shoulder bolts" of the door garage door system have changed places. Thus, the overhead garage door improved opening, closing and weather sealing system and method 201 again provides to enhance sealing of the door panels against the frame, as further described below.

When closing the door panel subassemblies 221, 222, 223, and 224, shoulder bolts 236, 237, 238 and 237' make sliding contact with respective door panel wedge bracket plates 234*a*, 234*b*, 234*c* and 234*d* respectively, which are attached at appropriate locations along the door panel subassemblies 221, 222, 223, and 224. This sliding contact applies a resultant outward or exterior direction horizontal force to a central portion of the door panel subassemblies 221, 222, 223 and 224 causing the door panel assemblies 221, 222, 223, 224 to move or translate closer to the inner surface of a door frame jamb 204 of the door structural frame to further seal or insulate the garage or facility, as also further described below.

The tightness and mechanical sealing and security of the overhead garage door movable multi-panel assembly 220 when it is closed is provided independently of the overhead garage door tracks and structural support system 210, since the door closing and tightness to the door structural frame 202 is provided specifically and substantially by the engagement of the respective shoulder bolts 236, 237, 238 and 237' and door panel wedge bracket plates 234*a*, 234*b*, 234*c* and 234*d*, while the track-wheel and shaft subassemblies 501, 502, 503, 504 and 505 freely roll along the track 212.

Unlike the earlier described example, the wheels 231 and shaft subassemblies 232 of this example of the present disclosure are not offset to provide for additional movement of the door panels away from the wheels and tracks and towards the door structural frame (in a direction generally normal to the direction of travel of the wheels along the tracks and in a direction generally normal to the axis of rotation of wheels) when the door is closed and provide for additional clearance between the door panels and the door structural frame during movement of the garage door between its opened and closed positions. In this case, there is a sufficient degree of free-play at the straight shaft subassemblies 232 and the wheel 231 to provide the necessary freedom of movement required for the door sealing system. This amount of freedom of movement is typical and common for most commercially available garage door track systems. Thus, the necessity for providing an offset axis of the shafts 232 is largely unnecessary within this particular example. It should be understood that the essential functioning, movement features and benefits of this example are largely maintained and equivalent to the previously described example and scope of the present disclosure. Therefore, a detailed description of the similar functional features of this example may be set aside and need not be repeated in detail.

Figure 24A:
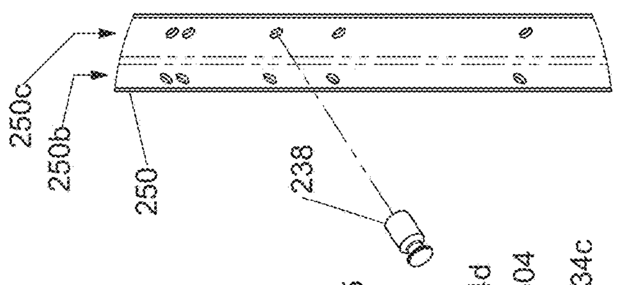
FIG. 24A is an detailed perspective view of a portion of the assembly shown in FIG. 24.
Figure 24:
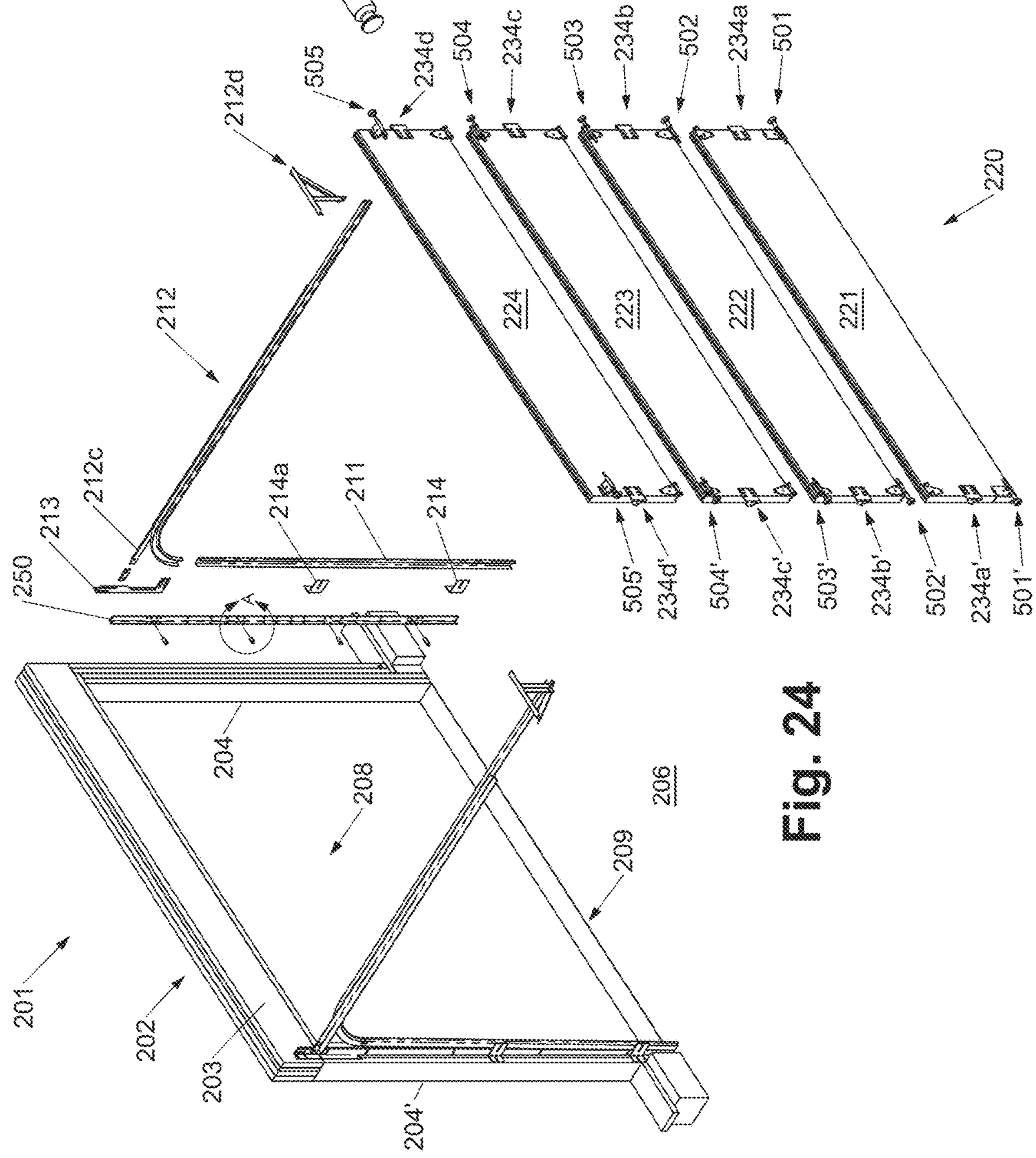
FIG. 24 is a three-quarter exploded inside perspective view of the garage door system of FIG. 23.

Referring to FIGS. 24 and 24A, it should be noted that FIG. 24A shows the attachment of 3rd panel shoulder bolt 238 to the right side reverse angle bracket 250 (threaded fastener not shown). All remaining shoulder bolts are attached in the same way.

Figures 25, 25A:
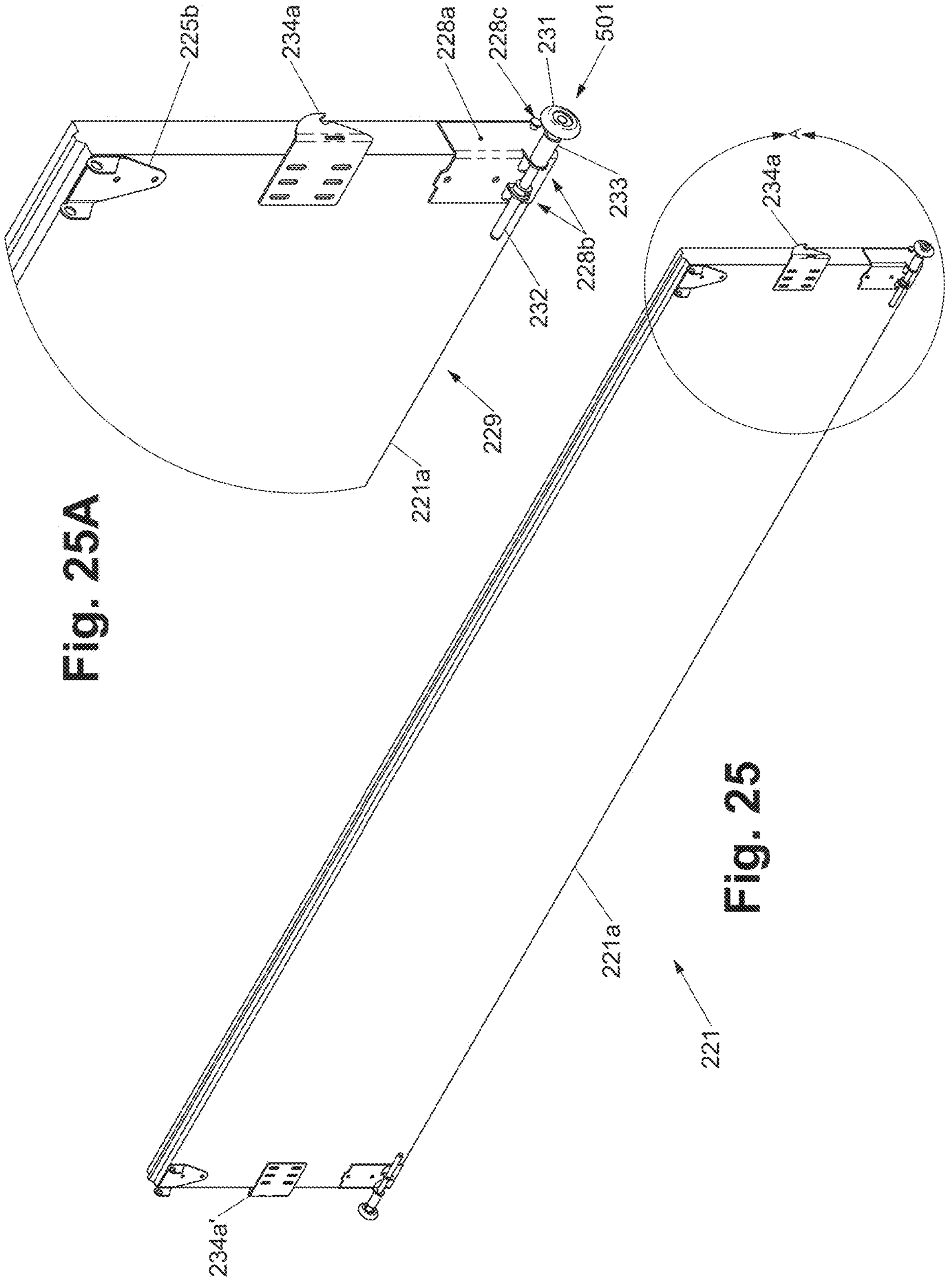
FIG. 25 is a detailed view of one the first door panel subassembly of FIG. 24.
FIG. 25A is a detailed view of one end of the first door panel subassembly of FIG. 25.
Figure 26B:
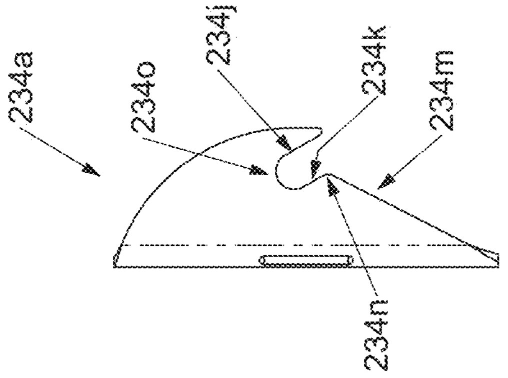
FIG. 26B is an end view of 1st panel wedge bracket shown in FIG. 26.
Figure 26C:
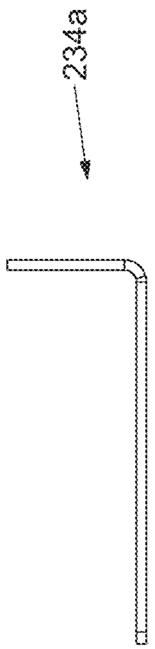
FIG. 26C is a top view of 1st panel wedge bracket shown in FIG. 26.
Figure 26A:
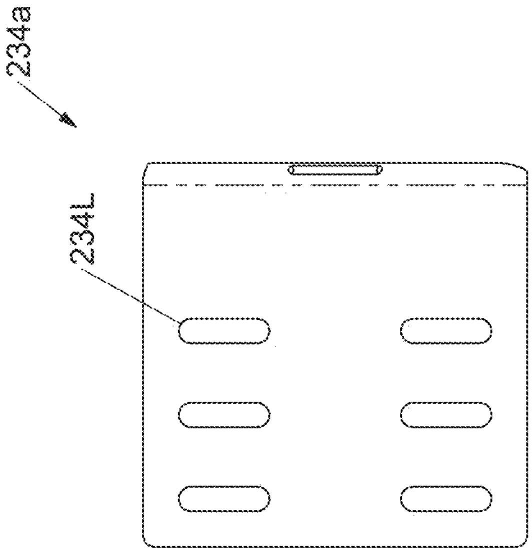
FIG. 26A is a front view of 1st panel wedge bracket shown in FIG. 26.
Figure 26:
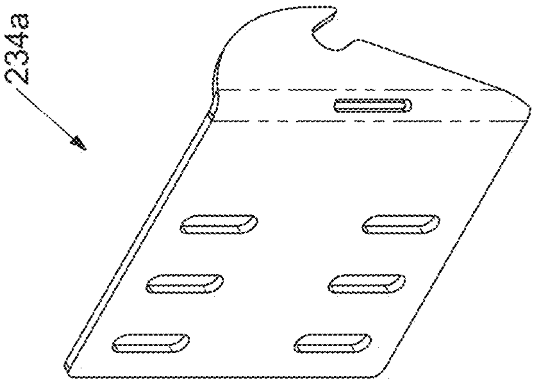
FIG. 26 is a detail perspective view of 1st panel wedge bracket shown in FIG. 25A.
Figure 27B:
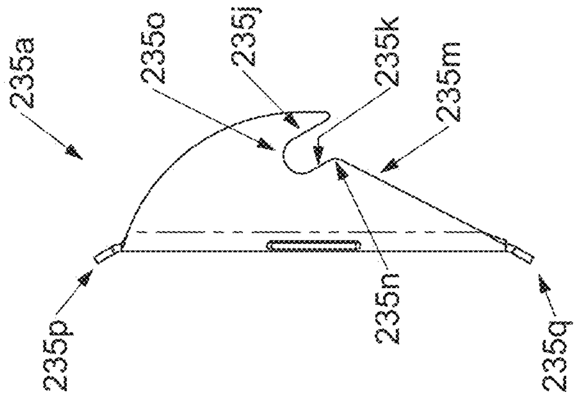
FIG. 27B is an end view of 1st panel wedge bracket shown in FIG. 27.
Figure 27C:
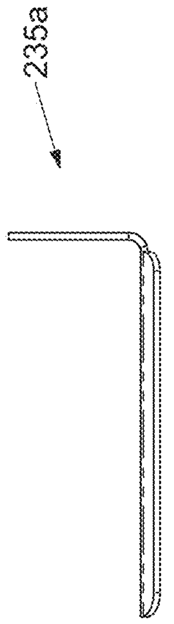
FIG. 27C is a top view of 1st panel Wedge bracket shown in FIG. 27.
Figure 27A:
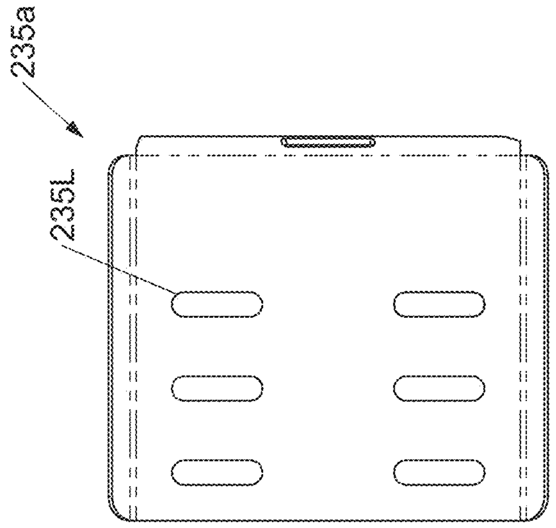
FIG. 27A is a front view of 1st panel wedge bracket shown in FIG. 27.
Figure 27:
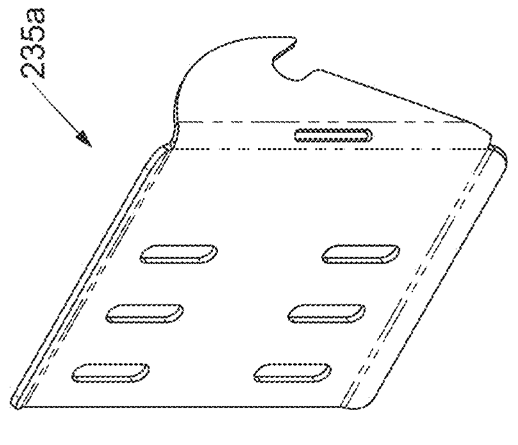
FIG. 27 is an alternate example of 1st panel wedge bracket shown in FIG. 26.

FIGS. 25 and 25A shows 1st door panel assembly 221 as a representative example of each of the remaining three door panel assemblies 222, 223, and 224. It should be noted that 1st panel wedge bracket plate 234*a* is attached to the door panel 221*a* by means of threaded lag bolts or screws (not shown). All corresponding and remaining 2nd, 3rd, and 4th wedge bracket plates 234*b*, 234*c* and 234*d* are attached in like fashion to their respective door panels with the exception of their specific horizontal position at each of the door panels. The horizontal position at each of the door panels is determined by the necessary position for engagement with its specific and respective shoulder bolt 236, 237, 238, and 237' of which the lengths are selected by design for necessary relative clearances and engagements as the multi-panel garage door assembly 220 is movably raised, lowered and alternately make and breaks contact at the weather strip seals and the door panels.

FIGS. 26, 26A, 26B, and 26C illustrate and example for right hand wedge bracket plates 234*a*, 234*b*, 234*c*, and 234*d* which are all the same. Wedge bracket plates may be typically made or fabricated from mild steel however other effective material may be utilized without affecting the scope of present disclosure. Wedge bracket plate further includes an angled-contact closing (door closing) surface 234*j*, angled-contact opening (door opening) surface 234*k*, a bracket mounting slot 234L for vertically adjustable attachment to a door panel, a pre-closing (door closing) guide surface 234*m*, a pre-opening guide (door opening or "bump out") surface 234*n*, and a closing (door closing) slot end radius 234*o*. Contact surfaces 234*j*, 234*k*, 234*n*, and 234*m* engage by example when the multi-panel garage door assembly 220 is movably raised and lowered with surface 236*a* of panel shoulder bolt 236 as shown in FIG. 28. All remaining and respectively corresponding shoulder bolts and wedge bracket plates engage in like fashion to control the movement of the respective door panels during opening and closing. It should be noted that the intended purpose of pre-opening guide (door opening or "bump out") surface 234*n* is to provide a "reverse wedge effect" of the wedge bracket is to help ensure that if the door is held tightly closed (especially for a long period of time for example) and then the door is required to suddenly be opened, this "bump-out" provides a slight horizontal "push-out force" of the door panels away from the door frame and seals at each of the door panels. This is to help positively move each of the door panels slightly horizontally inward toward the inside of building away from the door frame 202 and therefore "quickly break" any potential sticking effect that may occur at the door seals (not shown) all around at door panels 221, 222, 223, and 224 for example. The benefits of this optional feature is that should the door seals happen to "stick" to each of the door panels for any reason (ice, frost, sticky paint, simple contact friction, etc.), this feature will tend to more quickly free the door from the seals (at an approximately 30 degree angle, more or less by design) upon the instant and initial vertical movement of the panels. Without this "instant bump-out effect" the door panels may have a more difficult time breaking free from the seals by simple upward (vertical) motion alone and any inherent static friction (shear friction) that could occur. Additionally, as with the previous example, the vertical tracks 211 and 211' are installed at a slight angle with respect to the door frame jams 204 and 204'. This slight angle provides to help gradually reduce the running clearance and any required gap between the garage door panels and the inside or interior face of the door frame jamb 204 and 204' as much as practical without causing excessive friction or contact. The current disclosure does not rely on this slight vertical track angle and is operable to function either with vertical door tracks set either parallel or at a slight vertical angle with respect to the door frame. Careful study of the earlier example FIGS. 13 through 18 best illustrate the slight angle shown between vertical track 11 (211) and door frame jamb 4 (204) depicted within the example of the current disclosure. Finally, it should be noted by example in FIGS. 25 and 25A the wedge bracket plate 234*a* is securely fastened to the approximate mid-points at both vertical edges of 1st door panel subassembly 221. This is also the case with the remaining door panel subassemblies 222, 223, and 224.

FIGS. 27, 27A, 27B, and 27C shows an alternate example 235*a* which is essentially the same as that of 234*a* shown in FIGS. 26, 26A, 26B, 26C. The essential difference is that alternate example 235*a* further includes upper and lower bent portions 235*p* and 235*q* respectively for the purpose of added strength and resistance to mechanical deflection and bending of the part allowing thinner thicknesses and gage stock of materials to be used for reduced cost and material weight as desired. Other formed-metal part or stamped features or alternate materials may be anticipated without affecting the scope of the present disclosure. The same remaining detailed design features 235*j*, 235*k*, 235L, 235*m*, 235*n*, and 235*o* which are provided as previously described and shown in FIGS. 26 through 26C.

The respective first, second, third and fourth panel shoulder bolts 236, 237, 238 and 237' as generally best shown in FIGS. 28, 28A, and 28B for the sake of comparison is illustrated in detail by shoulder bolt 236. Shoulder bolt 236 by example further includes wedge bracket engagement (contact) surface 236*a*, which is a reduced diameter compared to that of the outer or body diameter 236*d*. A low-profile head 236*b* is necessary to provide a mechanical stop and limit excessive deflection which may occur during high wind loads for example when engaged with the respective wedge brackets. The low-profile design is essential to reduce the total width and space requirements of the present disclosure as much as possible while still allowing practical running clearances between the various components during raising and lowering movements of the garage door movable multi-panel assembly 220 and system operation. An optional chamfer is provided at 236*c* to help guide the wedge brackets for proper engagement. An internal thread is provided at 236*e* for securing each of the respective shoulder bolts to the reverse angle brackets 250 and 250' by means of a threaded fastener (not shown). It should be noted that the relative lengths of shoulder bolts 236, 237, and 238 are selected for proper engagement and running clearances of the respective wedge brackets 234*a*, 234*b*, 234*c* and 234*d*. In this case shoulder bolts 237 and 237' are the same length. This is made possible in that due to the geometry and arrangement of the tracks and door panels, once the 4th door panel assembly 224 and corresponding wedge panel brackets 234*d* and 234*d'* become disengaged from the fourth panel shoulder bolts 237' upon door opening motion, the remaining wedge brackets run clear and will not interfere with shoulder bolt 237'. This allows this length of shoulder bolt to be repeated and thus helps to reduce the overall space and width requirements of the present disclosure.

Figure 29:
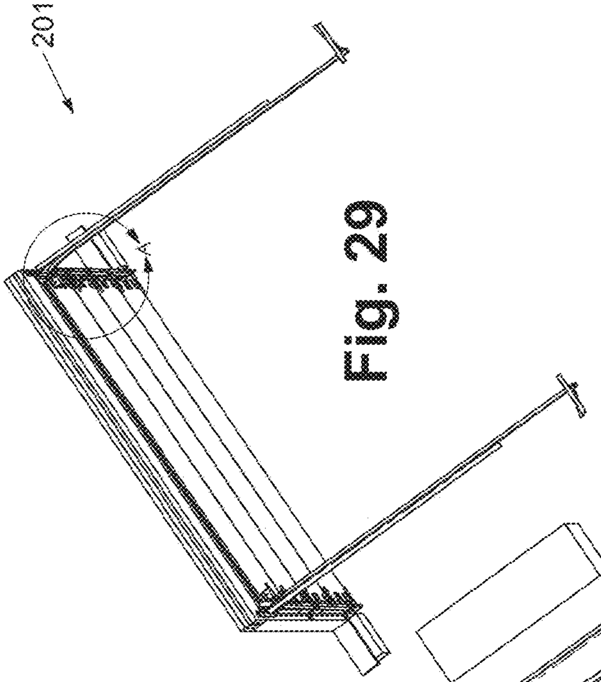
FIG. 29 is and upper inside perspective view of the interior side of the present disclosure shown in FIG. 23.
Figure 29A:
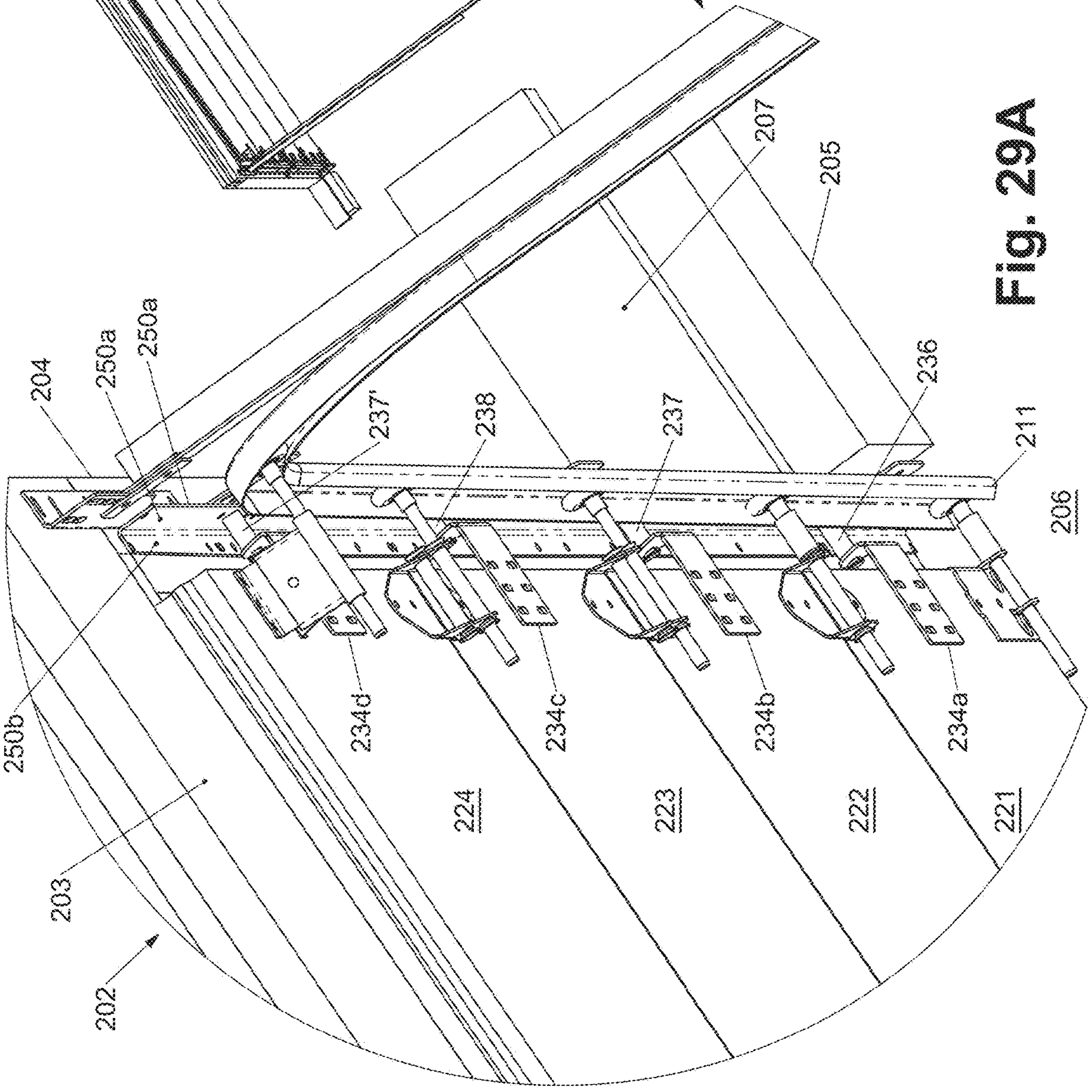
FIG. 29A is a detailed upper inside perspective view of the present disclosure shown in FIG. 29.

FIGS. 29 and 29A show an upper perspective view of the various components previously described with the door in the closed position.

Figure 30A:
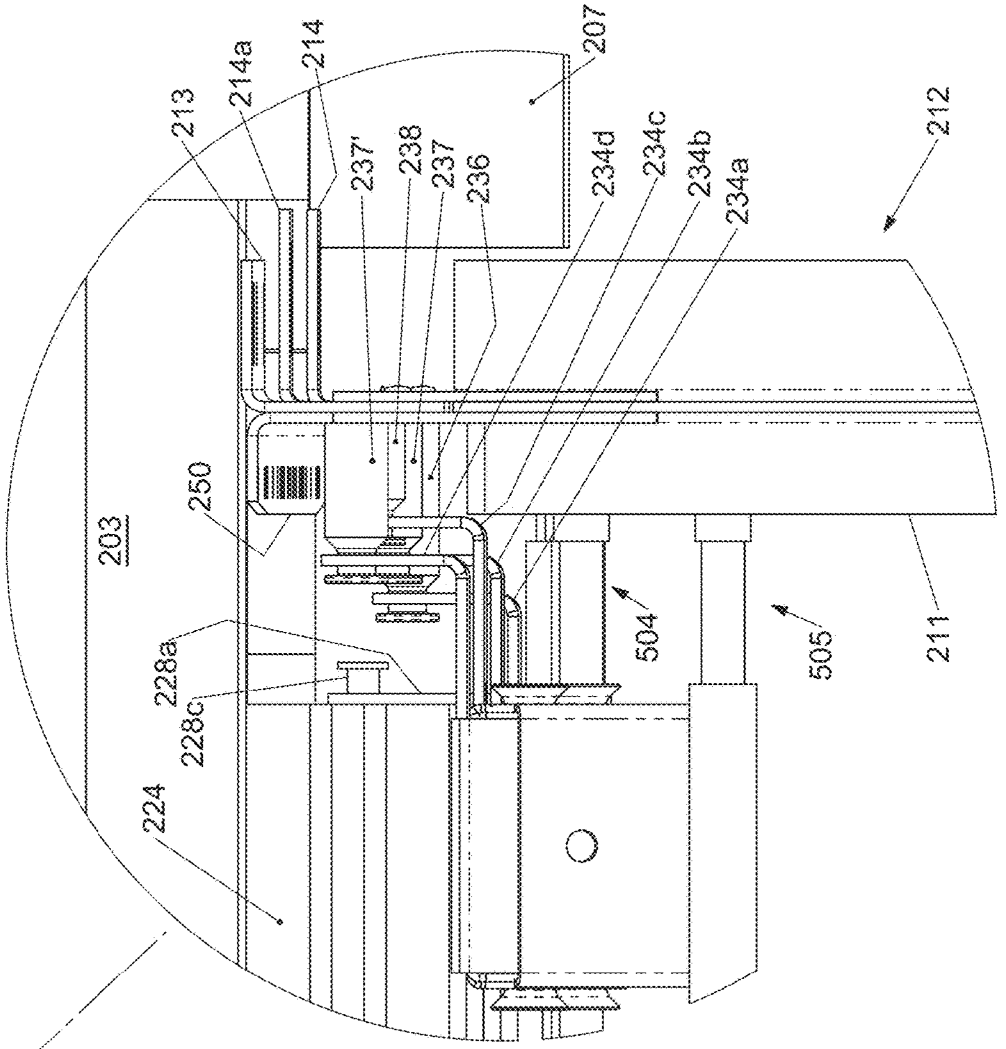
FIG. 30A is a detailed generally top view of the present disclosure shown in FIG. 30.
Figure 30:
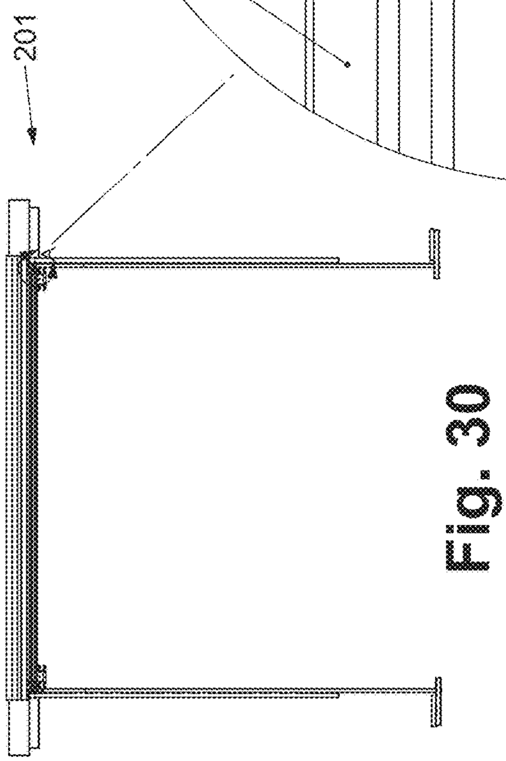
FIG. 30 is a generally top view of the present disclosure shown in FIG. 29.

FIGS. 30 and 30A show substantially top view (looking downward at a slight angle) to show the relationships and arrangements of the various components previously described with the door in the closed position.

Figure 31A:
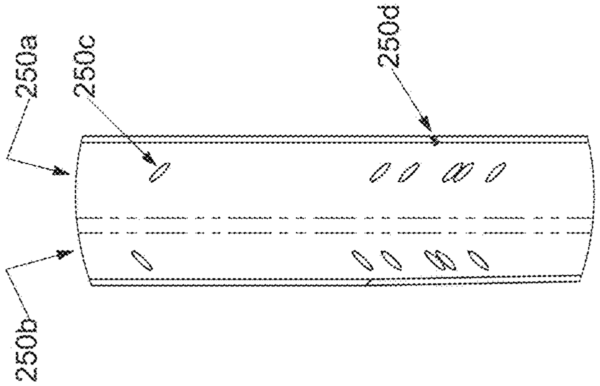
FIG. 31A is a detailed view of the right-side reverse angle of FIG. 30.
Figure 31:
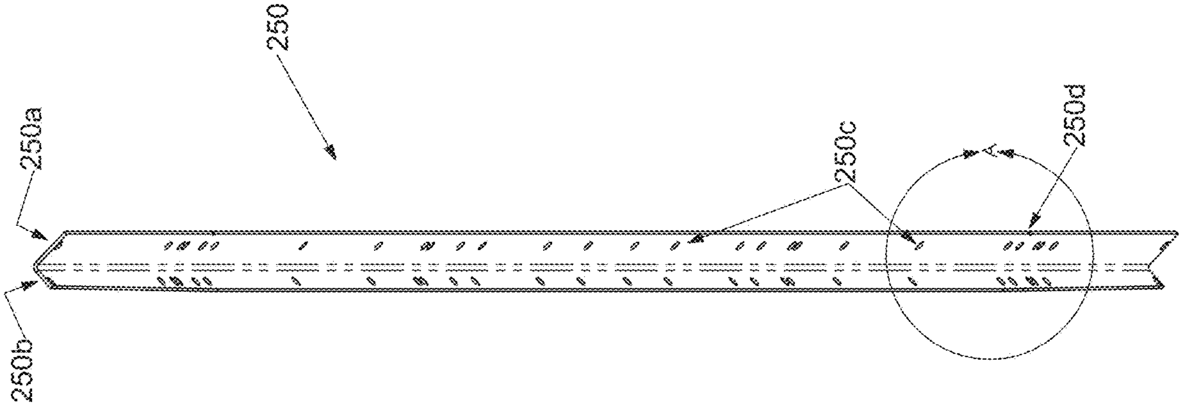
FIG. 31 is a detailed perspective view of a right-side reverse angle of the present disclosure also shown FIG. 29A.
Figure 32A:
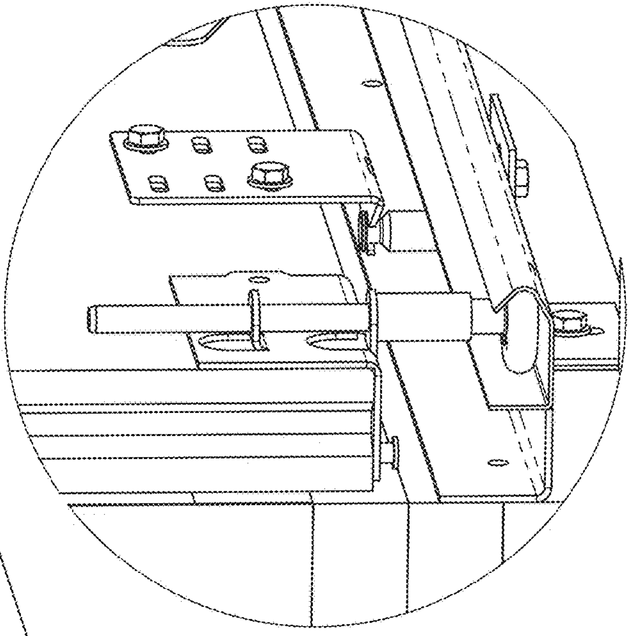
FIG. 32A is an enlarged perspective view of the area A in FIG. 32.
Figure 32:
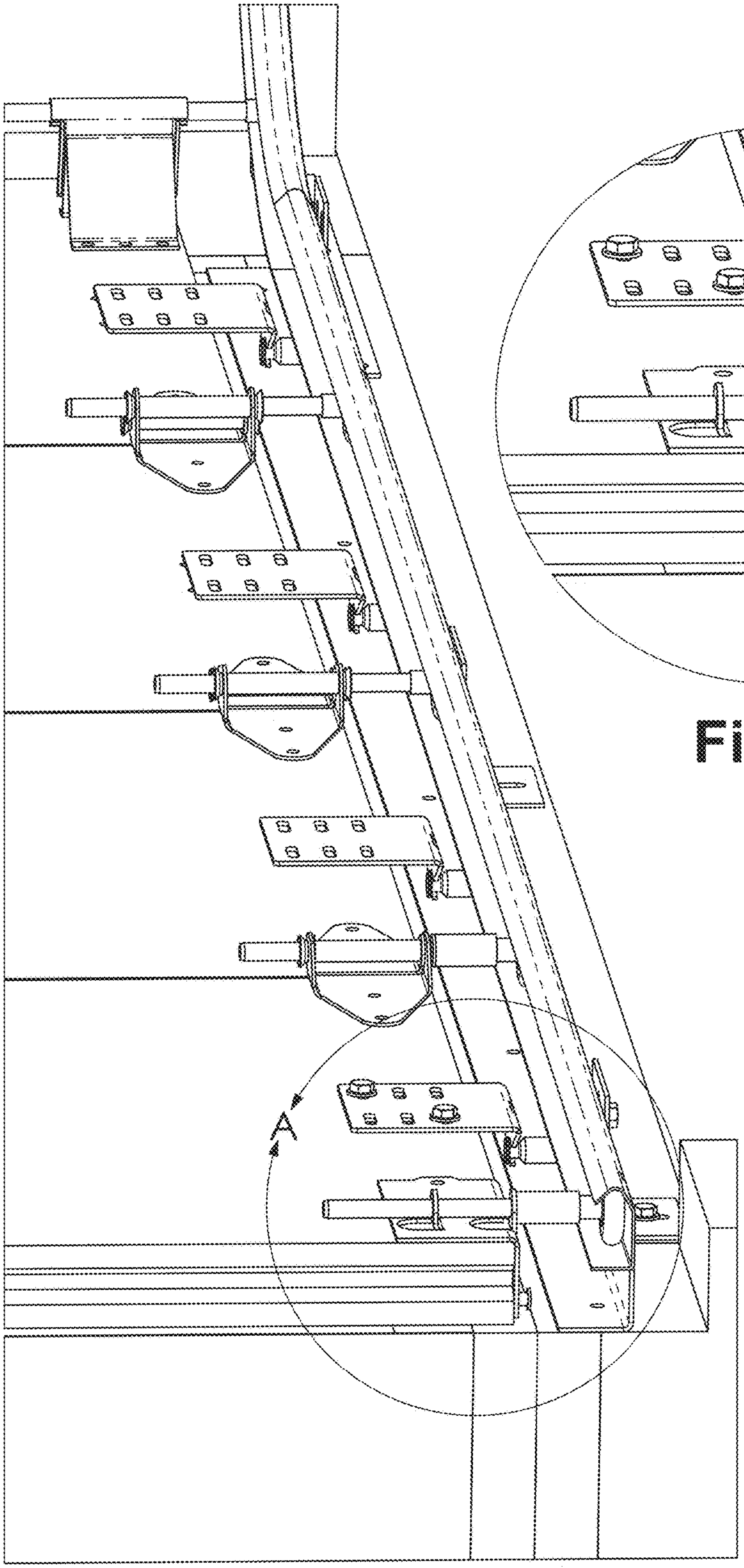
FIG. 32 is a perspective view of an alternative example of the disclosure using continuous angles.
Figure 33:
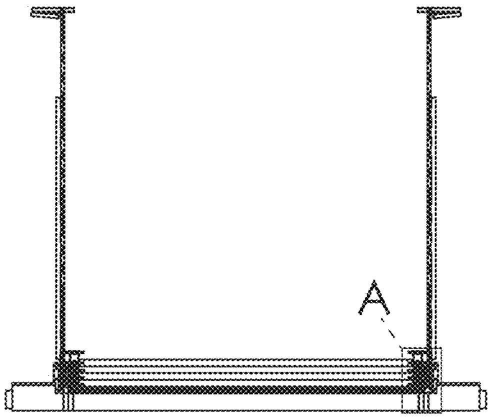
FIG. 33 is a bottom view of the alternative example of FIG. 32.
Figure 33A:
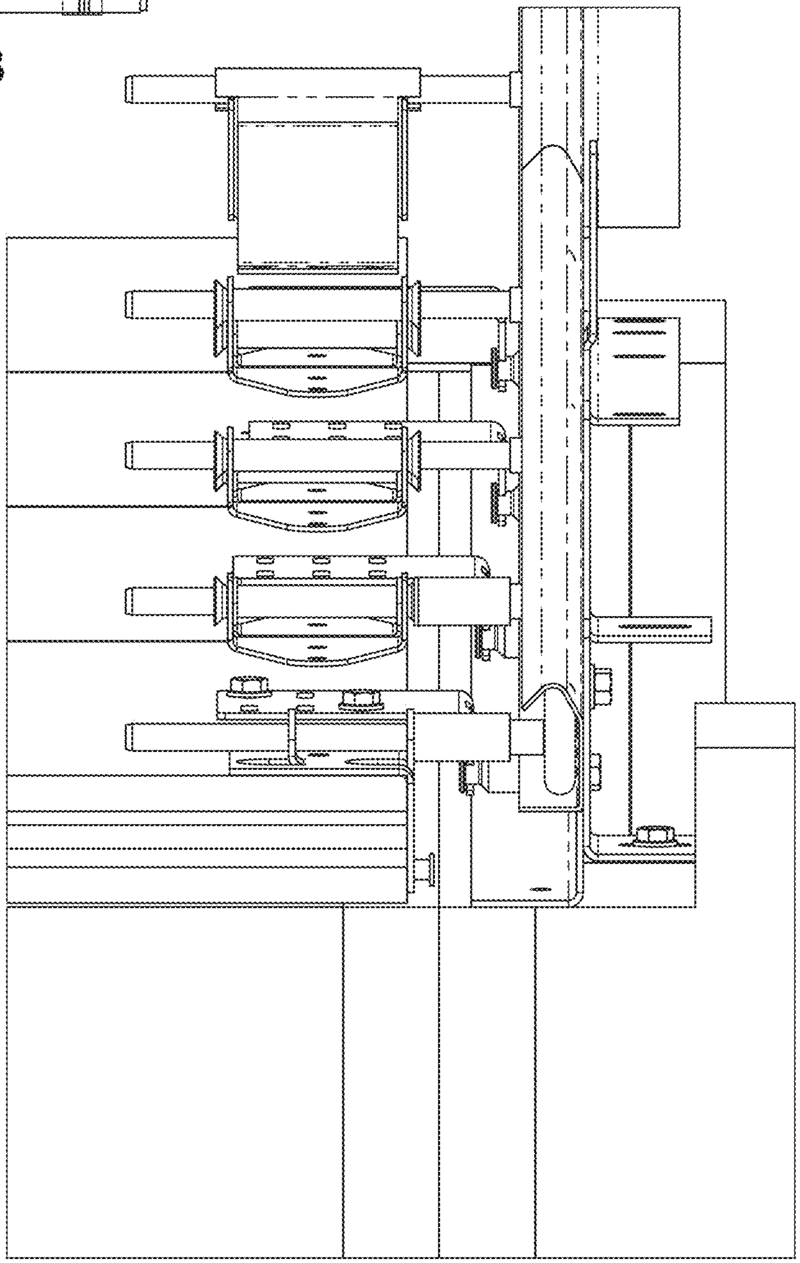
FIG. 33A is an enlarged perspective view of the area A in FIG. 33.
Figure 34:
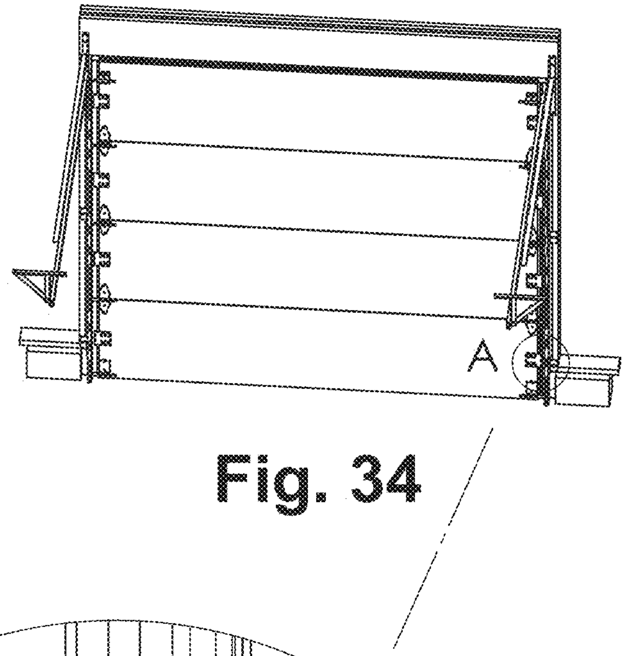
FIG. 34 is a perspective view of the alternative example of FIGS. 32 and 33.
Figure 34A:
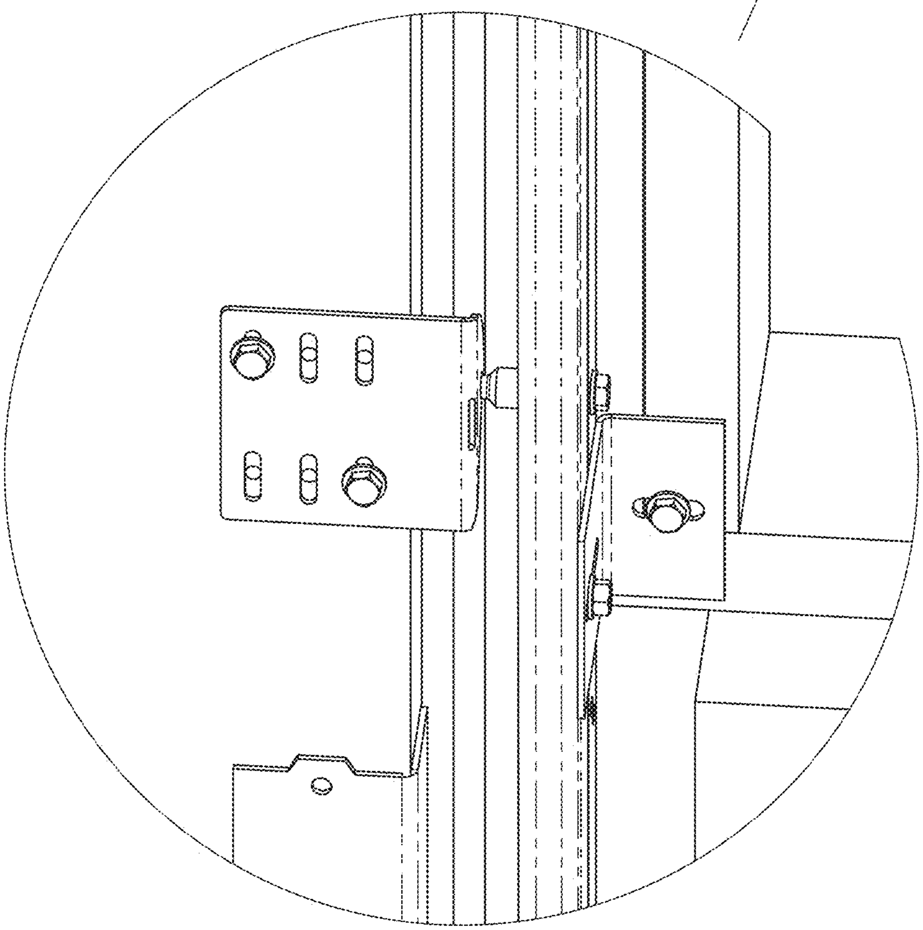
FIG. 34A is an enlarged perspective view of the area A in FIG. 34.
Figure 35:
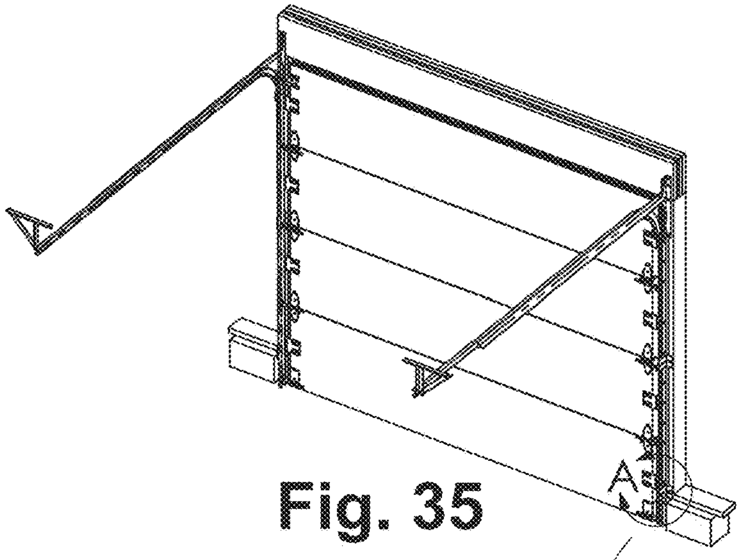
FIG. 35 is another perspective view of the alternative example of FIGS. 32 and 33.
Figure 35A:
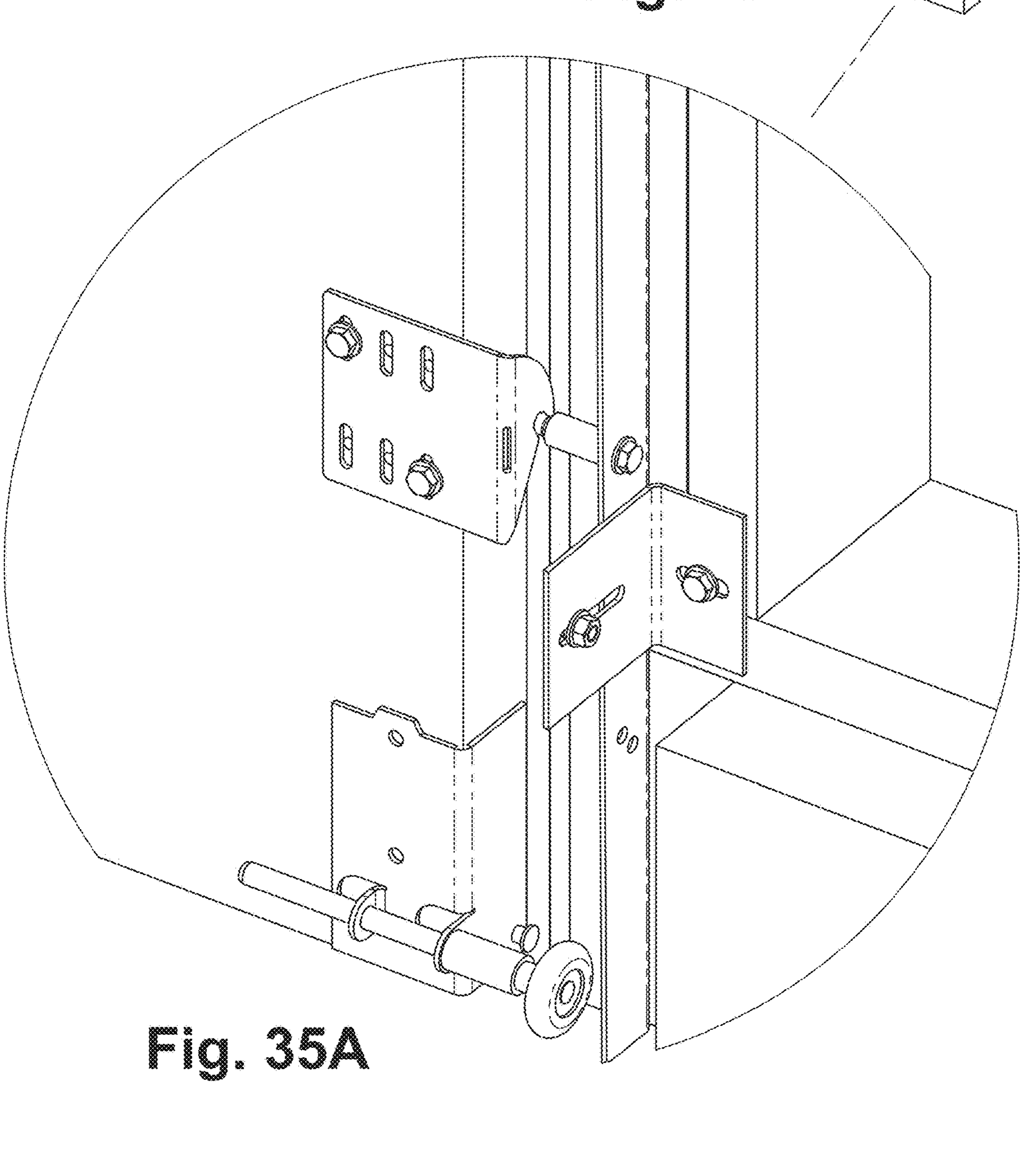
FIG. 35A is an enlarged perspective view of the area A in FIG. 35.

FIGS. 31 and 31A show a detail view of the right-side reverse angle bracket 250. This illustrates the reverse angle bracket wide face 250*a*, the reverse angle bracket narrow face 250*b* the various optional series of shoulder bolt attachment hole patterns 250*c* available for different heights of door panels that are commercially available, and an example of a 1st hole pattern identification notch 250*d*. The identification notch is optionally provided to help garage door service installers and technicians readily locate and select the desired pattern or series of holes desired for a particular installation based upon the height of the selected panels of a particular garage door installation.

Therefore, the present disclosure provides overhead garage door improved opening, closing and weather sealing system having a closed tightness and mechanical security that is independent of typical overhead garage door tracks and structural support system. The door closing and tightness is provided by the engagement of wedge-pin bracket subassemblies and angled-contact bracket subassemblies that cause the door panel assemblies to move closer to the inner surface of the garage door frame jamb to further insulate the garage and provide security. The wheel assemblies that include the wheels that roll along the tracks are configured to allow for greater movement of the door panels towards and into engagement with the building structure by allowing movement of the door panels relative to the wheels and wheel axes themselves in a direction towards the building structure and away from the wheels and tracks. Thus, the system of the present disclosure, due to the enhanced movement of the door toward and into engagement with the building structure, provides improved strength for resisting wind loading of the door when closed and improved energy sealing of the closed door, which addresses the largest point of air loss for heated garages. The system of the present disclosure thus is capable of very tightly securing the closed door to the building door frame for improved weather sealing, strength and security, while also allowing the door to open and move along the tracks as freely as possible (and with the door spaced from the building door frame when the door is at least partially opened).

During the manufacture and testing of the garage door system, certain improvements were made. The joint inventors have discovered that rather than attaching the track directly to the frame, the track can be attached to a continuous angle, which in turn is connected to the frame. The continuous angle and pins allows rapid installation of the product such that the door can be "stacked" to fill the opening allowing the completion of the installation to be accomplished after garage finishes are done. The continuous angle will be labeled with locations to make installation easy accomplish without many different wall clips which need to be located in both vertical and horizontal directions.

The continuous angle provides increased resistance to wind loading and provide increased security. The disclosure, both the previous version and the improved version also both provide reduced air leakage.

Referring now to FIGS. 32-35A, the reverse angle bracket 250 is shown attached to the frame of the garage. Pins are shown with different lengths which are matched to brackets of different lengths, to latch and lock the door into place. Brackets are attached to the door segments and the pins are attached to the continuous angle 250 (best seen in FIGS. 32 and 33). The continuous angle does not need to be fastened to the track, but can be, if desired.

FIGS. 36-41 show components of examples of a threshold sealing system 400, 400' for use with an overhead door system 1'. The overhead door system 1' is substantially similar to the overhead door system 1 discussed above and includes the hinged multi-panel assembly 20 capable of following the track 12 attached to a structure door frame 2 within a wall of a garage or building. The overhead door system 1' may optionally include the wedge-pin bracket subassemblies 34, 35, 36 for biasing panels 21, 22, 23, 24 of the multi-panel assembly 20 towards the door frame 2. In other examples, the threshold sealing system 400 may be incorporated on a multi-panel assembly 20 without the wedge-pin bracket subassemblies 34, 35, 36. Additionally or alternatively, the threshold sealing system 400 may be implemented in conjunction with the offset-track-wheel shaft subassemblies 301, 302, 303, 304, 305, or may be implemented with track-wheel and shaft subassemblies 501, 502, 503, 504, 505 having wheels 231 and straight shaft subassemblies 232.

Figure 36:
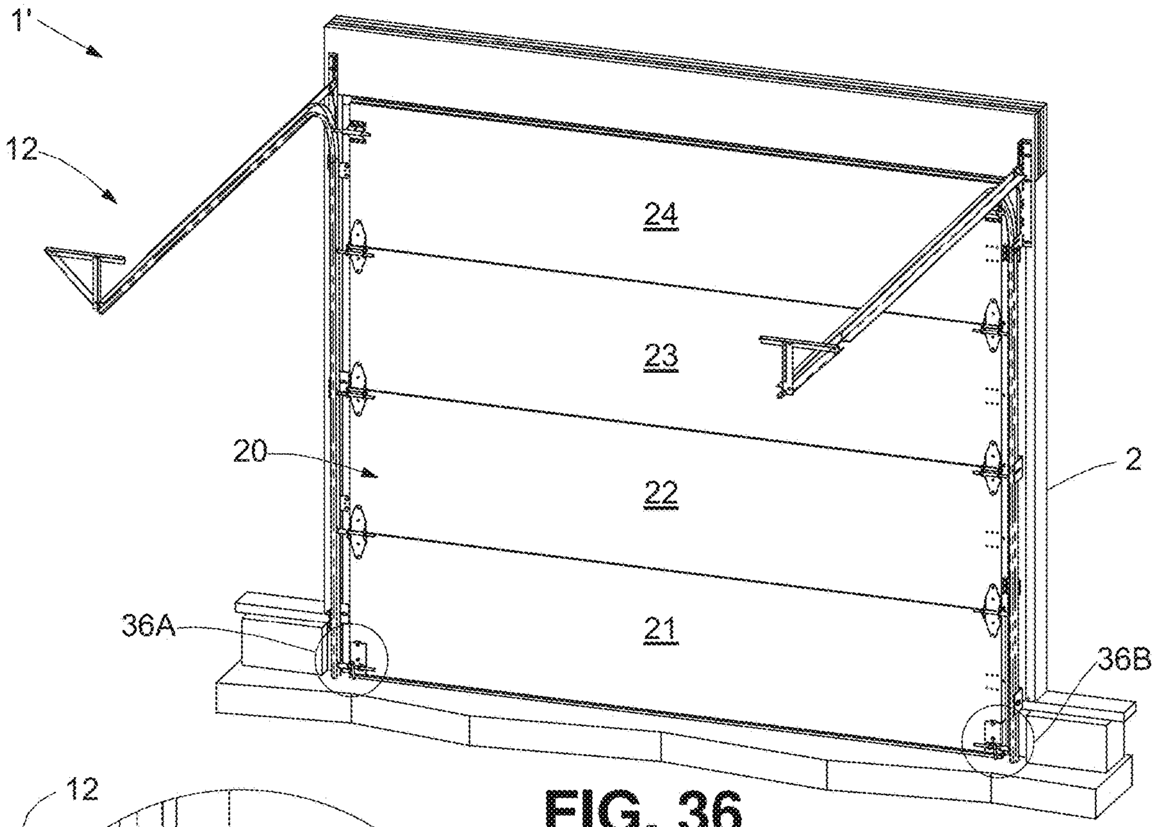
FIG. 36 is a perspective view of an overhead garage door system in accordance with another example of the present disclosure.
Figure 36A:
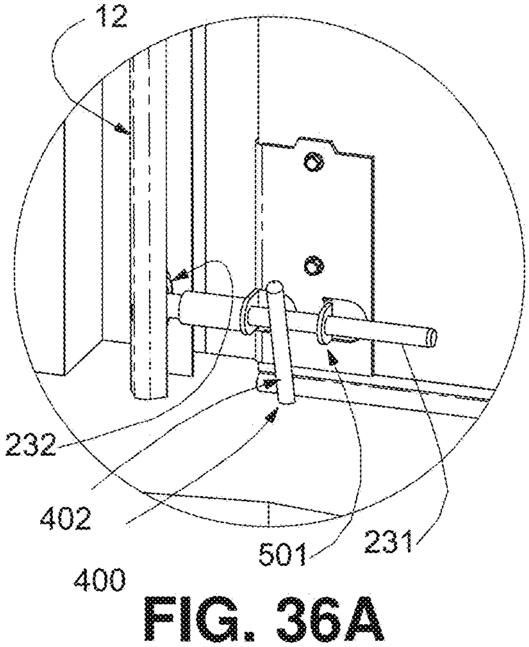
FIG. 36A is an enlarged perspective view of Area 36A in FIG. 36.
Figure 36B:
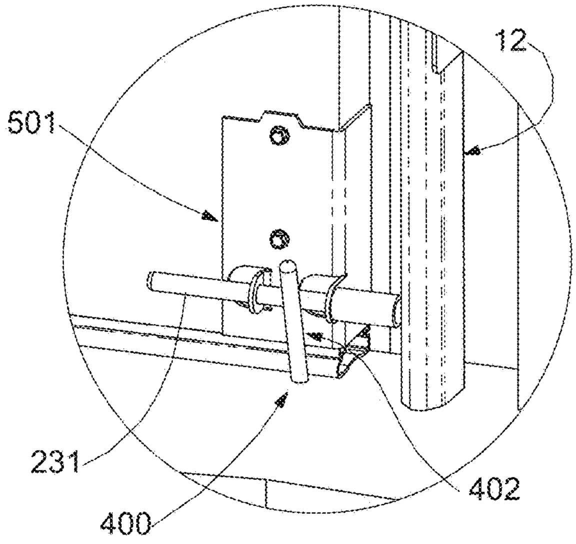
FIG. 36B is an enlarged perspective view of Area 36B in FIG. 36.
Figure 37:
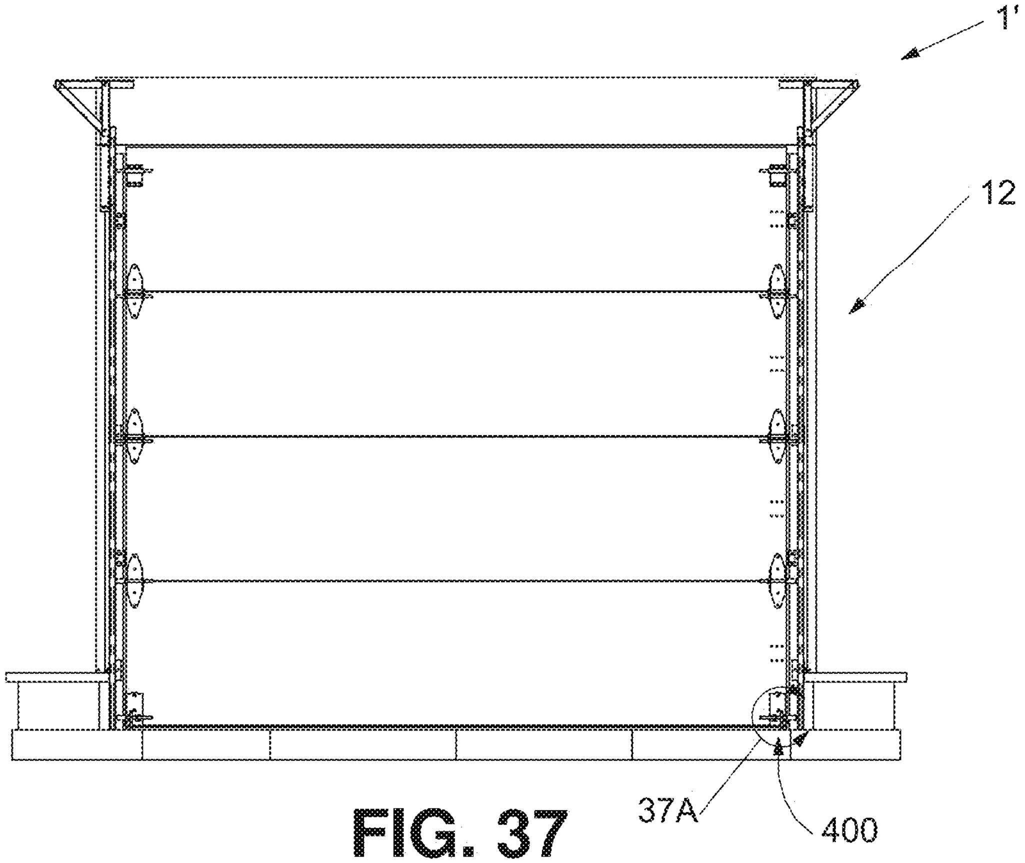
FIG. 37 is a front elevation view of the overhead garage door system of FIG. 36.
Figure 37A:
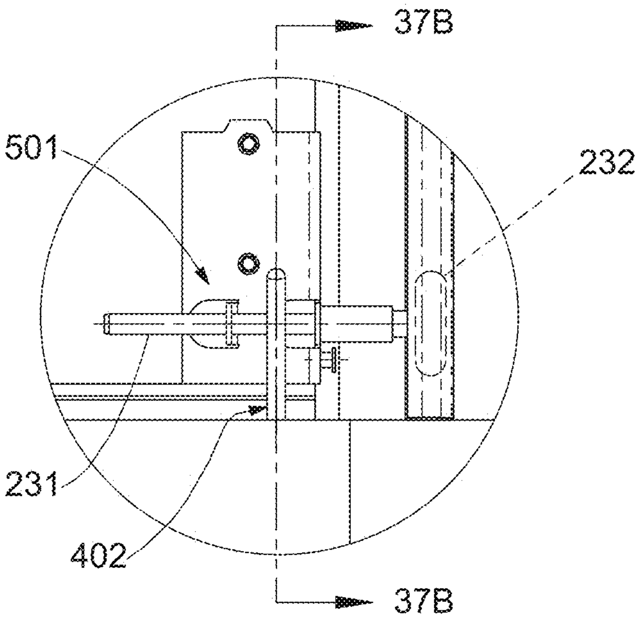
FIG. 37A is an enlarged elevation view of Area 37A in FIG. 37.
Figure 37B:
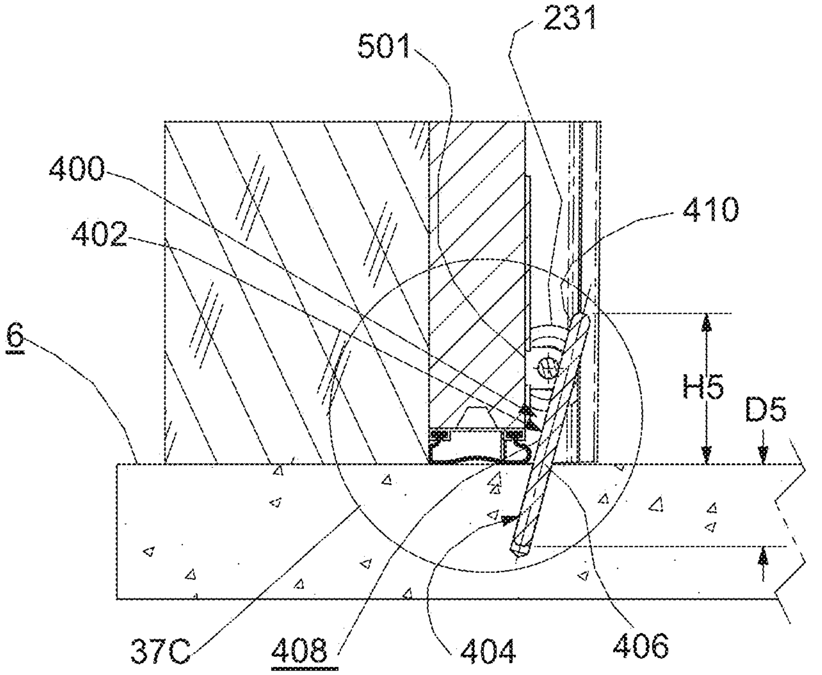
FIG. 37B cross-sectional view of the Area 37A in FIG. 37, taken along Line 37B-37B in FIG. 37A.
Figure 37C:
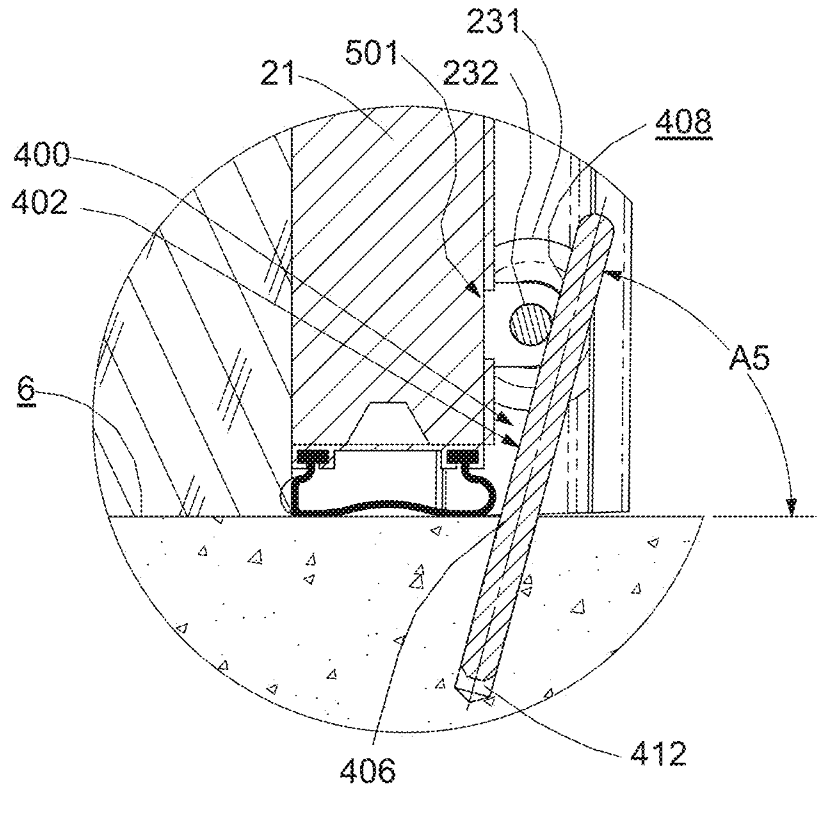
FIG. 37C is an enlarged cross-sectional view of Area 37C in FIG. 37B.
Figure 38:
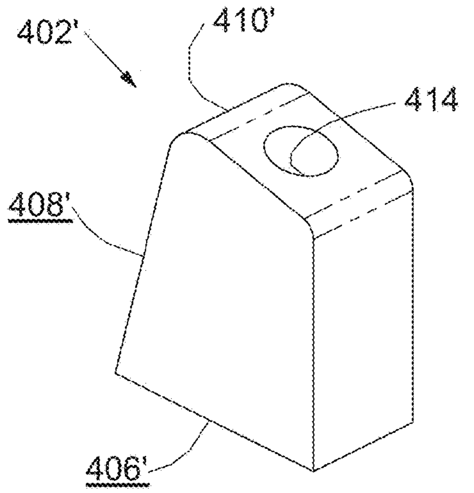
FIG. 38 is a perspective view of an example of a biasing element in accordance with the present disclosure.
Figure 39:
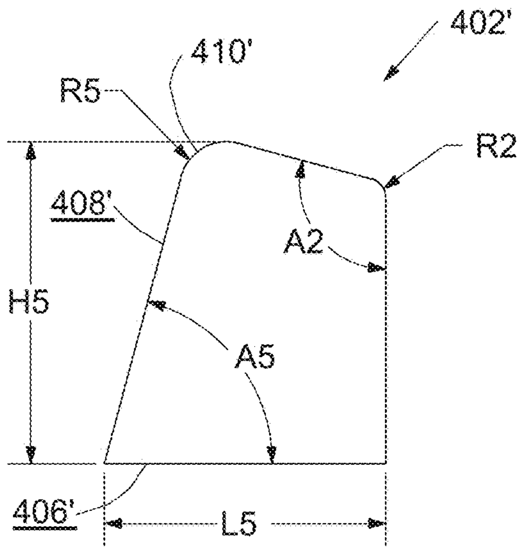
FIG. 39 is a side elevation view of the biasing element of FIG. 38.

Referring to FIGS. 36-36B, the first example of a threshold sealing system 400 includes a threshold biasing element 402 and an anchor 404 configured to secure the threshold biasing element 402 to the floor surface 6 of a building. The threshold biasing element 402 includes a base 406 configured to attach to the floor surface 6 and a biasing surface 408 extending from the base 406 to a distal end 410 at an oblique angle A5 (FIG. 37C). Here, the biasing surface angle A5 may be equal to an angle A1, A2, A3, A4 of the angled contact surfaces discussed above. Accordingly, as discussed in greater detail below, the biasing surface 408 of the threshold biasing element 402 may be configured to bias the bottom of the first door panel 21 at the same rate as the angled-contact surfaces of the brackets 37, 38 discussed above as the door panel assembly 20 is closed. Optionally, the distal end 410 of the biasing surface 408 may include a radius or chamfer for guiding the shaft subassembly 231 onto the biasing surface 408.

In the example of FIGS. 36-36B, the threshold biasing element 402 and the anchor 404 are integrally formed as a unitary component. Here, the threshold biasing element 402 and the anchor 404 include a rigid material having relatively high strength and hardness, such as a steel. Optionally, the biasing element 402 and/or the anchor 404 may include layers or coatings to improve performance of the threshold sealing system 400. For instance, the threshold biasing surface 408 may include a low-friction coating to minimize friction and abrasion between the shaft subassembly 232 and the threshold biasing element 402.

As shown in FIG. 36B, the anchor 404 extends from the base 406 of the threshold biasing element 402. Optionally, the threshold biasing element 402 and the anchor 404 may include a substantially continuous structure such that the threshold biasing element 402 and the anchor 404 have the same cross-sectional profile extending along a common longitudinal axis. For example, the illustrated biasing element 402 and anchor 404 have a cylindrical shape having a constant diameter. By forming the threshold biasing element 402 and the anchor 404 with a continuous shape, a depth D5 of the anchor 404 into the floor surface 6 and/or a height H5 of the biasing surface 408 of the threshold biasing element 402 above the floor surface 6 can be easily adjusted to accommodate different configurations of door panel assemblies 20, tracks 12, and floor surfaces 6 using a single design. Optionally, the anchor 404 may include helical threading such that the biasing element 402 and anchor 404 can be screwed into the floor surface 6. In other examples, the anchor 404 may be a smooth pin configured to be press-fit within the floor surface 6.

In use, the threshold biasing element 402 is implemented by initially forming (e.g., drilling, punching, cutting) a receptacle 412 in the floor surface 6 for receiving the anchor 404. As previously discussed, a depth of the receptacle within the floor surface 6 may be selected depending on the application. For example, heavier door panel assemblies 20 may require a more robust installation requiring the anchor 404 to have a greater depth within the floor surface, or a wider door panel assembly 20 may require the angled biasing surface 408 to extend a greater height H5 from the floor surface 6.

The location of the receptacle 412 is selected such that the biasing surface 408 is positioned beneath the shaft subassembly 232 of the door panel 21 when the door panel assembly 20 is in an unbiased state within the vertical track 11 of the structural support system 10. In other words, the receptacle 412 is positioned a distance from the door frame 2 such that a distal end 410 (i.e., opposite form the base 406) of the biasing surface 408 is positioned a greater horizontal distance from the door frame 2 than the shaft subassembly 232 while the base end (i.e., adjacent to the base 406) is positioned closer to the door frame 2 than the shaft subassembly 232. Thus, when the door panel assembly 20 is in the unbiased state in the vertical track 11, the shaft subassembly 232 will be horizontally positioned (i.e., direction perpendicular to the door frame 2) between the distal end 410 and the base end of the biasing surface 408 above the biasing surface.

As previously provided, the biasing surface 408 is oriented at an oblique angle A5 relative to the base 406 of the threshold biasing element 406. The angle A5 is selected such that the biasing surface 408 receives the shaft subassembly 232 at the distal end 410 of the biasing surface 408 and then biases the shaft subassembly 232 in the horizontal direction towards the door frame 2 as the door panel assembly 20 is lowered towards the floor surface 6. In some examples, the angle A5 of the biasing surface 408 ranges from 60 degrees to 85 degrees relative to the ground surface 6, and more particularly, from 70 degrees to 80 degrees, and even more particularly, from 74 degrees to 76 degrees. Here, a height H5 of the biasing surface 408 is selected such that the distal end 410 of the biasing surface 408 will extend farther from the door frame 2 than the shaft subassembly based on the selected biasing surface angle A5. For example, a biasing surface having an angle A5 ranging from 74 degrees to 76 degrees may have a height H5 of at least 1.5 inches, and more specifically, at least 1.7 inches, to ensure proper engagement between the biasing surface 408 and the shaft subassembly 232 when the door panel assembly 20 is lowered onto the floor surface 6.

Referring to FIGS. 38-41, an alternative example of threshold sealing system 404' including a threshold biasing element 402' and anchor 404' are shown. Unlike the previous example including the integrally-formed threshold biasing element 402 and anchor 404, the example of FIGS. 38-41 includes a threshold biasing element 402' formed as a block and a separate anchor 404' for attaching the threshold biasing element 402' to the floor surface 6. Thus, for clarity, the threshold biasing element 402' may be alternatively referred to as a threshold biasing block 402'.

Figure 40:
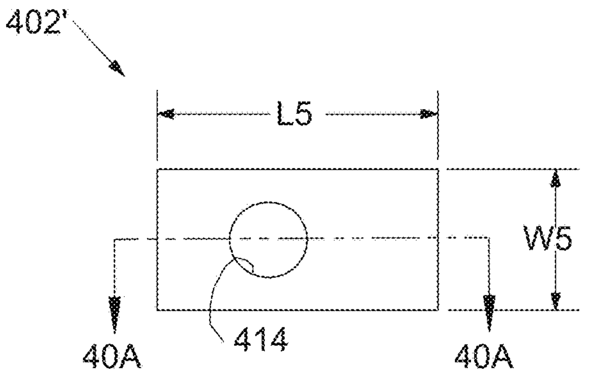
FIG. 40 is a top plan view of the biasing element of FIG. 38.
Figure 40A:
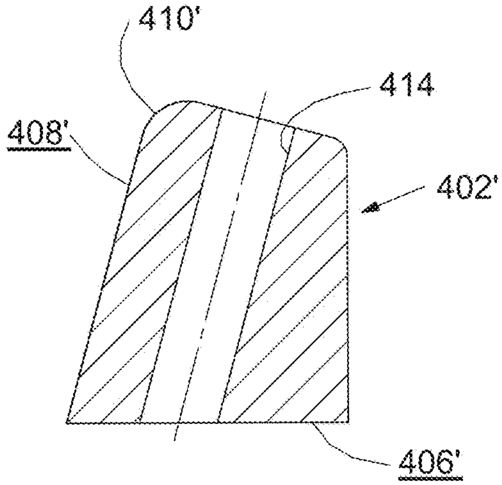
FIG. 40A is a cross-sectional view of the biasing element of FIG. 38, taken along Line 40A-40A of FIG. 40.
Figure 41:
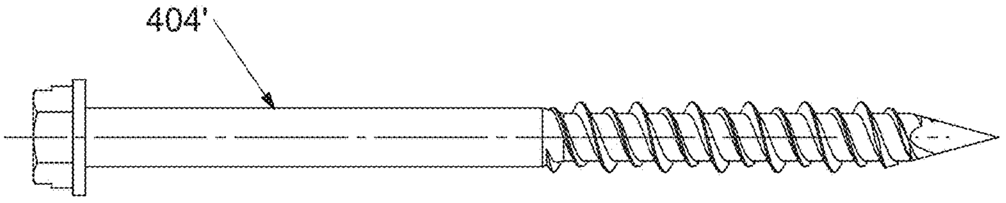
FIG. 41 is a side elevation view of an example of an anchor for the biasing element shown in FIG. 40.

The threshold biasing element 402' includes a flat base 406' and a planar biasing surface 408' extending at the angle A5 from the base 406'. As shown in FIG. 40, the base 406' defines a length L5 and a width W5 of the 402'. The position, angle A5, and height H5 of the biasing surface 408' are selected in the same manner as discussed above with respect to the threshold biasing element 402 in order to ensure engagement between the biasing surface 408' and the shaft subassembly 232 when the door panel is lowered. Optionally, the distal end 410' of the biasing surface 408' may include a chamfer or radius R5 for guiding the shaft subassembly 232 onto the biasing surface 408' when the door panel assembly 20 is lowered.

In the illustrated example, the anchor 404' is formed separately from the threshold biasing element 402'. Here, the threshold biasing element 402' includes an aperture 414 formed through the threshold biasing element 402' parallel to the biasing surface 408'. In other examples, the aperture 414 may extend through the threshold biasing element 402' at other angles, such as perpendicular to the base 406'. The aperture 414 is configured to receive the anchor 404'. The anchor 404' may include a threaded fastener of a desired length sufficient to extend through the aperture 414 and into the floor surface 6. As provided above, a length of the anchor 404' may be selected depending on the size or weight of the door panel assembly 20. While the illustrated example shows the anchor 404' formed separately from the threshold biasing block 402', the anchor 404' may also be integrally formed with the threshold biasing block 402' such that the threshold biasing block 402' is installed on the floor surface 6 as a single piece. When integrally formed, a longitudinal axis of the anchor 404' may extend from the base 406' threshold biasing element 402' at an angle parallel to the biasing surface 408. Alternatively, the anchor 404' may extend perpendicular to the base 406'.

Figure 42:
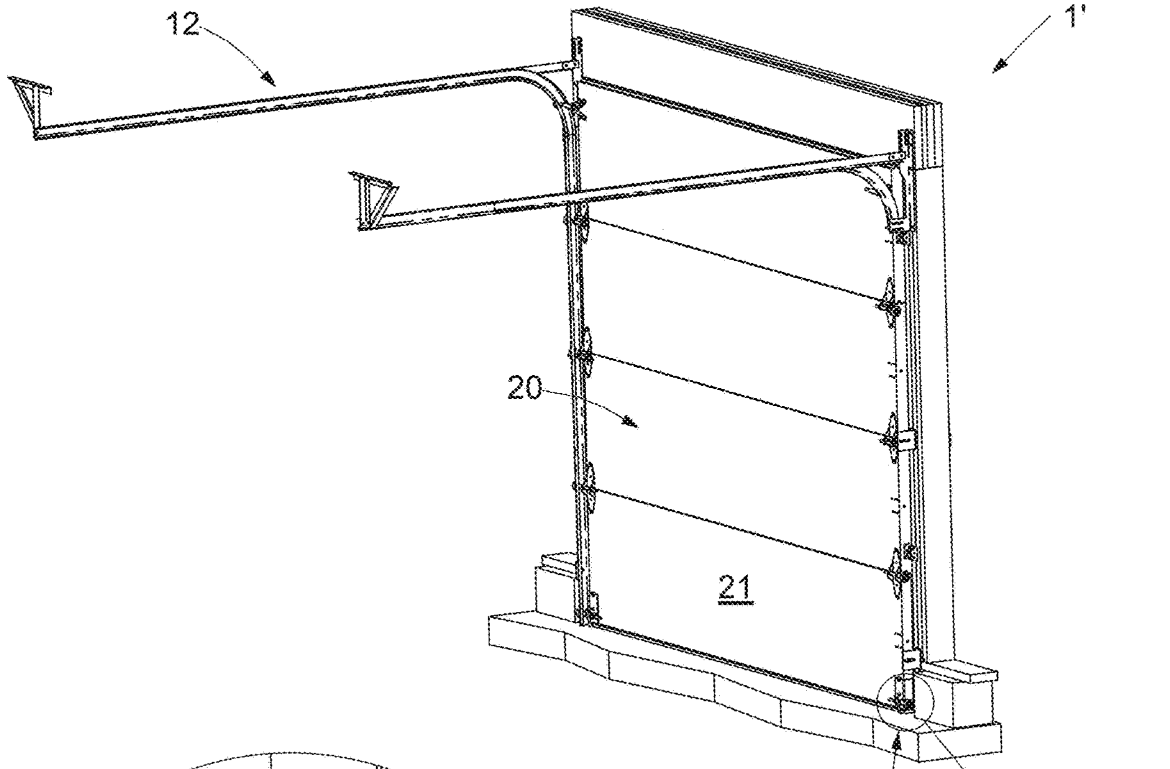
FIG. 42 in a perspective view of an overhead garage door system in accordance with another example of the present disclosure.
Figure 42A:
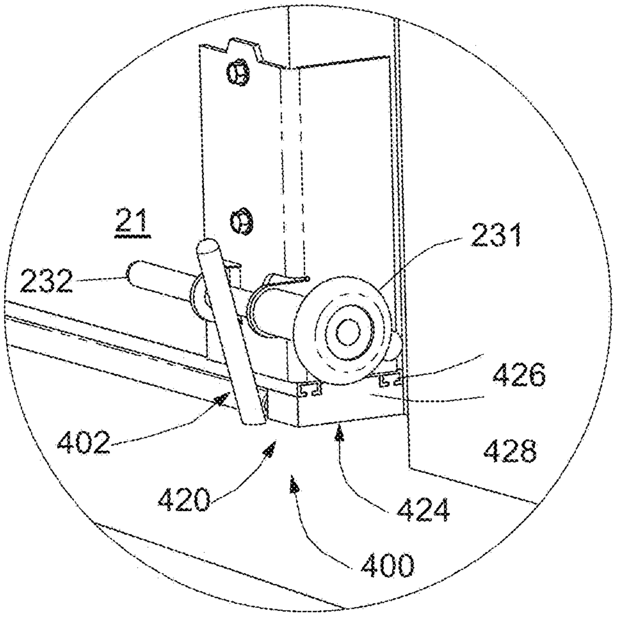
FIG. 42A is an enlarged perspective view of Area 42A in FIG. 42.
Figure 43:
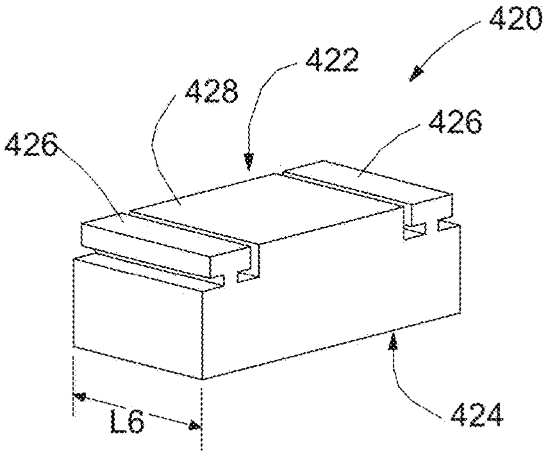
FIG. 43 is a perspective view of an example of a threshold seal of the garage door system of FIG. 42.
Figure 44:
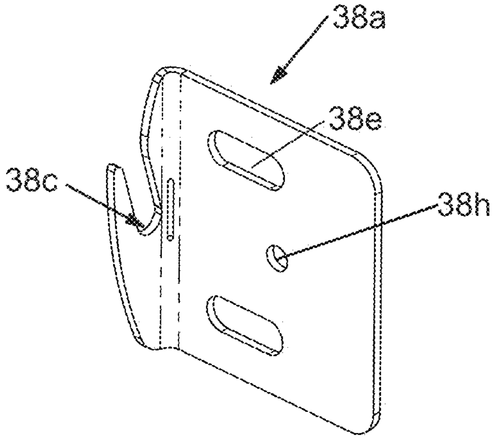
FIG. 44 is a perspective view of an example of door-frame-mounted angled-contact bracket in accordance with the present disclosure.
Figure 45:
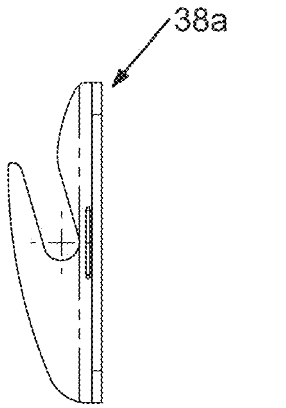
FIG. 45 is a side elevation view of the door-frame-mounted angled-contact bracket of FIG. 44
Figure 46:
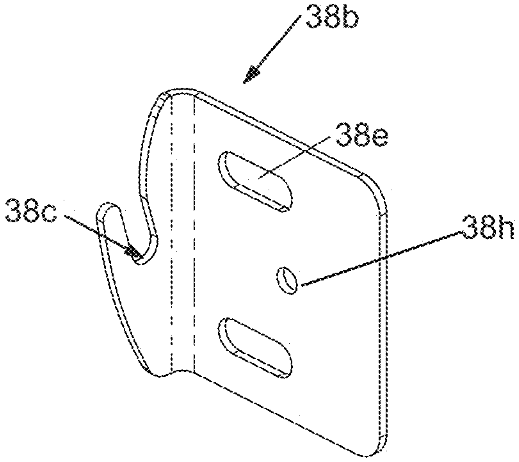
FIG. 46 is a perspective view of another example of door-frame-mounted angled-contact bracket in accordance with the present disclosure.
Figure 47:
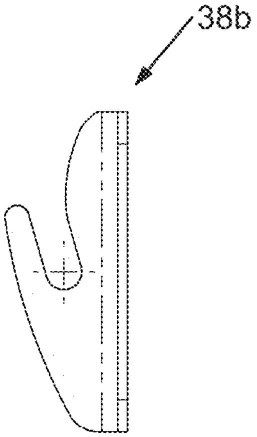
FIG. 47 is a side elevation view of the door-frame-mounted angled-contact bracket of FIG. 46.

Referring to FIGS. 42-43, an example of a threshold seal 420 for use with the threshold sealing systems 400, 400' is provided. The threshold seal 420 includes a coupler 422 disposed on a first side (e.g., top) of the threshold seal 420 and a sealing element 424 attached to the coupler 422 and disposed on an opposite side (e.g., bottom) of the threshold seal 420. As shown in FIG. 43, the coupler 422 includes a pair of elongate, T-shaped fasteners 426 respectively extending along a length L6 of the threshold seal 420 on opposite sides (e.g. front and back) of the coupler 422. The coupler 422 further includes a central rib 428 disposed between the fasteners 426 and extending along the length L6 of the threshold seal 420. As shown in FIG. 42A, the fasteners 426 are configured to be slidingly received within corresponding T-shaped slots attached to the bottom of the bottom door panel 21 while the rib 428 is received within a channel formed between the T-slots of the door panel 21. Accordingly, the threshold seal 420 is operable to be slidingly received within the slots and channel of the door panel 21 to allow the threshold seal 420 to be easily attached and removed from the door panel assembly 20.

The sealing element 424 of the threshold seal 420 includes a compressible elastomeric material, such as a foam material. In the illustrated example, the sealing element 424 is solidly formed (i.e., homogenous) of the elastomeric material. Optionally, the sealing element 424 and the coupler 422 may be integrally formed of the same elastomeric material using a molding or extrusion process. Forming the sealing element 422 and, optionally, the coupler 422 of the elastomeric material provides the threshold seal 420 with improved durability and performance (e.g., sealing) relative to conventional tube-shaped threshold seals, which are subject to cracking due to repeated bending cycles associated with opening and closing the door.

Referring to FIGS. 44-47, additional examples of angled-contact brackets 38*a*, 38*b* are provided. FIGS. 44-47 show examples of angled-contact bracket 38*a*, 38*b* configure for attachment on a first side of a door frame. In contrast to the previous examples of the angled-contact brackets 38, which included mounting slots 38*e* that are configured to extend in a vertical direction relative to the door frame 4, the angled-contact bracket 38*a*, 38*b* shown in FIGS. 44-47 include a plurality of mounting slots 38*e* configured to extend in a horizontal direction relative to the door frame 4 when the angled-contact bracket 38*a*, 38*b* is installed. Accordingly, a vertical position of the angled-contact bracket 38*a* can be set by engaging the angled-contact closing surface 38*c* with a wedge-pin 34*b*, 35*b*, 36*b* (FIGS. 9A-9C) attached to the door frame 4 or a door panel assembly 21, 22, 23, 24. A horizontal position of the angled-contact bracket 38*a*, 38*b* can then be adjusted along the mounting slots 38*e* prior to securing the angled-contact bracket 38*a*, 38*b* to the door frame 4 or door panel assembly 21, 22, 23, 24.

The angled-contact brackets 38*a*, 38*b* also include a mounting hole 38*h* configured to fix a position of the angled-contact bracket 38*a*, 38*b* once the horizontal and vertical position are selected using the angled-contact closing surface 38*c* and the horizontal slots 38*e*. The mounting hole 38*h* within each angled-contact bracket 38*a*, 38*b* allows the user to add one last optional screw fastener to each bracket 38*a*, 38*b* once the final position of the angled-contact bracket 38*a*, 38*b* is established. This final screw fastener serves to reliably lock-down the final and desired position (both vertically and horizontally) of each of the respective angled-contact brackets 38*a*, 38*b* once all the final door adjustments are evaluated, tested and settled upon. This further prevents any shifting or movement of the angled-contact brackets 38*a*, 38*b* should any of the screw fasteners in the mounting slots 38*e* eventually work loose over time, temperature changes, and ongoing repeated stress and use. Reliability of the installed product is therefore increased. This can reduce the potential number of quality issues and "customer call-backs" after each installation.

Changes and modifications in the specifically described examples can be carried out without departing from the principles of the present disclosure which is intended to be limited only by the scope of the appended claims, as interpreted according to the principles of patent law including the doctrine of equivalents.

The invention claimed is:

1. A threshold sealing system for an overhead door panel assembly, the threshold sealing system comprising:

a threshold biasing element including a base configured to attach to a floor surface and a biasing surface extending at a first oblique angle relative to the base, wherein the threshold biasing element has a distal end, and wherein the biasing surface is between the base and the distal end, and wherein the distal end includes a surface that is one selected from the group consisting of (i) chamfered relative to the biasing surface and (ii) rounded relative to the biasing surface; and an anchor configured to secure the base of the threshold biasing element to the floor surface, wherein, with the anchor securing the base to the floor surface, the anchor extends from the base and into the floor surface at a second oblique angle relative to the floor surface.

2. The system of claim 1, wherein the threshold biasing element and the anchor are integrally formed.

3. The system of claim 2, wherein the threshold biasing element and the anchor have a continuous cross-sectional shape.

4. The system of claim 1, wherein the first oblique angle of the biasing surface ranges from 70 degrees to 80 degrees.

5. The system of claim 1, wherein the first oblique angle of the biasing surface ranges from 74 degrees to 76 degrees.

6. The system of claim 1, wherein the biasing surface has a height of at least 1.5 inches.

7. The system of claim 1, wherein the biasing surface has a height of at least 1.7 inches.

8. The system of claim 1, wherein the biasing surface includes a low-friction coating.

9. The system of claim 1, wherein the anchor extends parallel to the biasing surface.

* * * * *